US010547222B2

(12) United States Patent
Saito et al.

(10) Patent No.: US 10,547,222 B2
(45) Date of Patent: Jan. 28, 2020

(54) ELECTRIC MACHINE WITH Q-OFFSET GROOVED INTERIOR-MAGNET ROTOR AND VEHICLE

(71) Applicant: Hitachi Automotive Systems, Ltd., Hitachinaka-shi, Ibaraki (JP)

(72) Inventors: Yasuyuki Saito, Hitachinaka (JP); Tsuyoshi Goto, Hitachinaka (JP); Kenichi Nakayama, Hitachinaka (JP); Noriaki Hino, Hitachi (JP); Shinji Sugimoto, Hitachi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 16/213,462

(22) Filed: Dec. 7, 2018

(65) Prior Publication Data
US 2019/0115796 A1 Apr. 18, 2019

Related U.S. Application Data

(63) Continuation of application No. 15/730,129, filed on Oct. 11, 2017, now Pat. No. 10,177,615, which is a (Continued)

(30) Foreign Application Priority Data

Oct. 16, 2008 (JP) .................................. 2008-266952

(51) Int. Cl.
*H02K 1/27* (2006.01)
*B60L 15/02* (2006.01)
(Continued)

(52) U.S. Cl.
CPC ............ *H02K 1/276* (2013.01); *B60L 15/025* (2013.01); *B60L 15/20* (2013.01); *H02K 1/24* (2013.01);
(Continued)

(58) Field of Classification Search
CPC ..... H02K 1/2766; H02K 1/276; H02K 2213/03
See application file for complete search history.

(56) References Cited

U.S. PATENT DOCUMENTS

| 4,939,398 A | 7/1990 | Lloyd |
| 5,117,553 A | 6/1992 | Kliman |
| (Continued) | | |

FOREIGN PATENT DOCUMENTS

| CN | 100344045 C | 10/2007 |
| CN | 101087079 A | 12/2007 |
| (Continued) | | |

OTHER PUBLICATIONS

Communication pursuant to Article 94(3) EPC issued in counterpart European Application No. 09 820 604.8 dated Jun. 17, 2019 (four (4) pages).

(Continued)

*Primary Examiner* — Dang D Le
(74) *Attorney, Agent, or Firm* — Crowell & Moring LLP

(57) ABSTRACT

A rotating electric machine includes a stator having a stator coil and a rotor provided rotatably around a specific rotation axis with respect to the stator. The rotor includes a plurality of magnets, a plurality of magnetically-assisted salient pole members provided between poles of any adjacent two magnets from among the plurality of magnets, and a magnetoresistance variation unit provided in the magnetically-assisted salient pole member along an axial direction of the rotation axis at a position offset in a circumferential direction of the rotation axis from a q-axis passing through a salient pole center of the magnetically-assisted salient pole member. The amount of offset of the magnetoresistance variation unit from the q-axis varies depending on positions of the magnetically-assisted salient pole members so that torque fluctuations cancel each other when power is applied.

6 Claims, 43 Drawing Sheets

Related U.S. Application Data continuation of application No. 15/046,813, filed on Feb. 18, 2016, now Pat. No. 9,812,913, which is a continuation of application No. 13/124,502, filed as application No. PCT/JP2009/067795 on Oct. 14, 2009, now Pat. No. 9,300,176.

(51) Int. Cl.
| | |
|---|---|
| H02K 7/00 | (2006.01) |
| B60L 15/20 | (2006.01) |
| H02K 1/24 | (2006.01) |
| B60K 1/02 | (2006.01) |
| B60K 6/26 | (2007.10) |
| B60K 6/445 | (2007.10) |
| H02K 29/03 | (2006.01) |
| B60L 15/00 | (2006.01) |

(52) U.S. Cl.
CPC .......... *H02K 1/2766* (2013.01); *H02K 7/006* (2013.01); *B60K 1/02* (2013.01); *B60K 6/26* (2013.01); *B60K 6/445* (2013.01); *B60L 15/007* (2013.01); *B60L 2210/10* (2013.01); *B60L 2210/40* (2013.01); *B60L 2220/14* (2013.01); *B60L 2240/421* (2013.01); *B60L 2240/423* (2013.01); *B60L 2240/429* (2013.01); *B60L 2240/443* (2013.01); *B60L 2240/547* (2013.01); *B60L 2240/549* (2013.01); *B60L 2270/142* (2013.01); *B60L 2270/145* (2013.01); *H02K 29/03* (2013.01); *H02K 2201/06* (2013.01); *Y02T 10/6217* (2013.01); *Y02T 10/6239* (2013.01); *Y02T 10/641* (2013.01); *Y02T 10/643* (2013.01); *Y02T 10/7077* (2013.01); *Y02T 10/7216* (2013.01); *Y02T 10/7241* (2013.01); *Y02T 10/7275* (2013.01)

(56) References Cited

U.S. PATENT DOCUMENTS

| | | | |
|---|---|---|---|
| 5,159,220 A | 10/1992 | Kliman | |
| 5,223,759 A | 6/1993 | Shimoda et al. | |
| 5,369,325 A | 11/1994 | Nagate et al. | |
| 5,508,576 A | 4/1996 | Nagate et al. | |
| 5,679,995 A | 10/1997 | Nagate et al. | |
| 5,838,086 A | 11/1998 | Cuenot et al. | |
| 6,087,752 A | 7/2000 | Kim et al. | |
| 6,208,054 B1 | 3/2001 | Tajima et al. | |
| 6,340,847 B1 | 1/2002 | Kawabata et al. | |
| 6,353,275 B1 | 3/2002 | Nishiyama et al. | |
| 6,597,079 B2* | 7/2003 | Miyashita | H02K 1/276 |
| | | | 310/156.48 |
| 6,741,002 B2 | 5/2004 | Nishiyama et al. | |
| 6,784,585 B2 | 8/2004 | Shah et al. | |
| 6,864,191 B2 | 3/2005 | Yoon | |
| 6,876,117 B2 | 4/2005 | Tajima et al. | |
| 6,967,424 B2 | 11/2005 | Popov | |
| 7,550,891 B2 | 6/2009 | Kim | |
| 7,605,510 B2 | 10/2009 | Okama et al. | |
| 7,768,171 B2 | 8/2010 | Taniguchi et al. | |
| 7,847,456 B2 | 12/2010 | Kori et al. | |
| 7,923,881 B2* | 4/2011 | Ionel | H02K 21/46 |
| | | | 310/156.53 |
| 7,923,882 B2 | 4/2011 | Kalluf et al. | |
| 7,932,658 B2 | 4/2011 | Ionel | |
| 7,960,886 B2 | 6/2011 | Miura et al. | |
| 8,102,091 B2* | 1/2012 | Ionel | H02K 1/276 |
| | | | 310/156.53 |
| 8,179,010 B2 | 5/2012 | Ogami et al. | |
| 8,227,952 B2 | 7/2012 | Shichijoh et al. | |
| 8,247,940 B2 | 8/2012 | Hino et al. | |
| 8,587,175 B2 | 11/2013 | Yamaguchi et al. | |
| 8,643,239 B2 | 2/2014 | Takemoto et al. | |
| 9,041,269 B2* | 5/2015 | Kato | H02K 1/146 |
| | | | 310/156.53 |
| 9,300,176 B2* | 3/2016 | Saito | B60L 50/61 |
| 9,812,913 B2* | 11/2017 | Saito | B60L 50/61 |
| 10,177,615 B2* | 1/2019 | Saito | B60L 50/16 |
| 2002/0047432 A1 | 4/2002 | Miyashita et al. | |
| 2004/0217667 A1 | 11/2004 | Popov | |
| 2004/0251763 A1 | 12/2004 | Tamaki et al. | |
| 2004/0256940 A1 | 12/2004 | Tsuruta et al. | |
| 2005/0110356 A1 | 5/2005 | Imamura et al. | |
| 2005/0121990 A1 | 6/2005 | Kaneko | |
| 2005/0179334 A1 | 8/2005 | Yoshinaga | |
| 2005/0200223 A1 | 9/2005 | Tajima et al. | |
| 2006/0244335 A1 | 11/2006 | Miyazaki et al. | |
| 2006/0279158 A1 | 12/2006 | Kim | |
| 2007/0126305 A1 | 6/2007 | Okuma et al. | |
| 2007/0205689 A1 | 9/2007 | Nemoto et al. | |
| 2007/0284961 A1 | 12/2007 | Takahashi et al. | |
| 2008/0007131 A1 | 1/2008 | Cai et al. | |
| 2008/0218022 A1 | 9/2008 | Lee et al. | |
| 2008/0224558 A1 | 9/2008 | Ionel | |
| 2008/0278017 A1 | 11/2008 | Taniguchi et al. | |
| 2008/0284269 A1 | 11/2008 | Tajima et al. | |
| 2009/0174276 A1 | 7/2009 | Tajima et al. | |
| 2009/0224627 A1 | 9/2009 | Hino et al. | |
| 2009/0230802 A1 | 9/2009 | Kamiya et al. | |
| 2009/0261679 A1 | 10/2009 | Sakai et al. | |
| 2010/0001606 A1 | 1/2010 | Ogami et al. | |
| 2010/0001607 A1 | 1/2010 | Okuma et al. | |
| 2010/0156228 A1 | 6/2010 | Kalluf et al. | |
| 2010/0176682 A1 | 7/2010 | Kori et al. | |
| 2010/0181864 A1 | 7/2010 | Miura et al. | |
| 2010/0244609 A1 | 9/2010 | Takahata et al. | |
| 2011/0285216 A1 | 11/2011 | Kurronen | |
| 2012/0019089 A1 | 1/2012 | Takemoto et al. | |
| 2013/0093284 A1 | 4/2013 | Utaka | |
| 2013/0119812 A1* | 5/2013 | Takizawa | H02K 1/276 |
| | | | 310/156.53 |

FOREIGN PATENT DOCUMENTS

| | | |
|---|---|---|
| CN | 101283499 A | 10/2008 |
| EP | 1 376 831 A2 | 1/2004 |
| EP | 1 942 572 A1 | 7/2008 |
| JP | 8-205499 A | 8/1996 |
| JP | 2000-134841 A | 5/2000 |
| JP | 2000-316242 A | 11/2000 |
| JP | 2002-223538 A | 8/2002 |
| JP | 2004-159492 A | 6/2004 |
| JP | 2004-343886 A | 12/2004 |
| JP | 2005-176424 A | 6/2005 |
| JP | 2005-218228 A | 8/2005 |
| JP | 2006-115613 A | 4/2006 |
| JP | 2007-97387 A | 4/2007 |
| JP | 2007-181254 A | 7/2007 |
| JP | 2007-330060 A | 12/2007 |
| JP | 2008-206308 A | 9/2008 |
| JP | 2008-220053 A | 9/2008 |
| JP | 2008-312316 A | 12/2008 |

OTHER PUBLICATIONS

International Search Report dated Jan. 19, 2010 (two (2) pages).
Chinese Office Action with English Translation dated Jan. 23, 2013 (seventeen (17) pages).
Japanese Office Action dated Feb. 5, 2013 (one (1) sheet).
Machine translation of JP2008206308 A.
Machine translation of JP2008220053 A.
Machine translation of JP2008312316 A.
Jacek F. Gieras, Permanent Magnet Motor Technology: Design and Applications, 2009, CRC, Third Edition, Ch. 5.
Machine translation for JP 2006-115613A, Magnetic Plate & its Manufacturing Method, Rotor, & Motor.
Machine translation for JP 2005-176424A, Rotor for Dynamo Electric Machine.
Chinese-language Office Action issued in counterpart Chinese Application No. 201410665937.0 dated Jul. 20, 2016 (6 pages).

(56) References Cited

OTHER PUBLICATIONS

Extended European Search Report issued in counterpart European Application No. 09820604.8 dated Nov. 3, 2016 (eight (8) pages).
Indian Examination Report issued in counterpart Indian Application No. 2735/DELNP/2011 dated Feb. 21, 2017 (8 pages).

* cited by examiner

ELECTRIC MACHINE WITH Q-OFFSET GROOVED INTERIOR-MAGNET ROTOR AND VEHICLE

CROSS REFERENCE TO RELATED APPLICATIONS

This application is a continuation of U.S. application Ser. No. 15/730,129, filed Oct. 11, 2017, which is a continuation of U.S. application Ser. No. 15/046,813, filed Feb. 18, 2016, which is a continuation of U.S. application Ser. No. 13/124,502, filed Apr. 15, 2011, issued on Mar. 29, 2016 as U.S. Pat. No. 9,300,176, which is a National Stage of PCT International Application No. PCT/JP2009/067795, filed Oct. 14, 2009, which claims priority from Japanese Patent Application No. 2008-266952, filed on Oct. 16, 2008, the disclosures of which are expressly incorporated by reference herein.

TECHNICAL FIELD

The present invention relates to a rotating electric machine and an electric vehicle equipped with the rotating electric machine.

BACKGROUND ART

Motors for driving used in electric vehicles and hybrid vehicles are required to provide significant power output so that permanent magnet motors including a rare earth element that retains intense energy are generally used. The motors for driving use, from among such permanent magnet motors, embedded-type magnet motors, which can satisfy the requirement to provide a large torque at low speeds and a wide rotation speed range.

Torque fluctuations of a motor are causes of noises and vibrations. In particular, in the case of electric vehicles, there arises the problem that the torque fluctuations make the ride uncomfortable at low speeds. Conventional motors generally adopt a countermeasure to provide skew in order to reduce the torque fluctuations. For example, there is known a motor in which an electromagnetic steel sheet provided with grooves is arranged on the side of outer periphery of a magnet embedded in a rotor and the grooves are arranged as being displaced in a direction along the periphery of the rotary shaft one portion from another.

CITATION LIST

Patent Literature

[Patent Literature 1] JP 2005-176424 A

SUMMARY OF INVENTION

Technical Problem

In the case of the motor described above that is provided with grooves on the side of outer periphery of the magnet, the grooves are arranged at positions where magnetic fluxes flow in each of cases when power is applied and when power is not applied. As a result, a problem arises. For example, if the grooves are provided at positions such that fluctuations when power is on are decreased, cogging torque is increased, and on the other hand, if the grooves are provided at positions such that the cogging torque is reduced, the torque fluctuations when power is applied are increased.

An object of the present invention is to improve the performance (for example, efficiency, reliability, cost performance, or productivity) of a motor.

Solution to Problem

A rotating electric machine according to a first aspect of the present invention includes a stator having a stator coil and a rotor provided rotatably around a specific rotation axis with respect to the stator. The rotor includes a plurality of magnets, a plurality of magnetically-assisted salient pole members provided between poles of any adjacent two magnets from among the plurality of magnets, and a magnetoresistance variation unit provided in the magnetically-assisted salient pole member along an axial direction of the rotation axis at a position offset in a circumferential direction of the rotation axis from a q-axis passing through a salient pole center of the magnetically-assisted salient pole member. The amount of offset of the magnetoresistance variation unit from the q-axis varies depending on positions of the magnetically-assisted salient pole members so that torque fluctuations cancel each other when power is applied.

According to a second aspect of the present invention, it is preferred in the rotating electric machine according to the first aspect that the magnetoresistance variation unit is a magnetic air gap.

According to a third aspect of the present invention, it is preferred in the rotating electric machine according to the second aspect that the circumferential positions of the magnets in the rotor are constant regardless of the positions in the axial direction.

According to a fourth aspect of the present invention, in the rotating electric machine according to the second aspect, the rotor may be divided into a plurality of axial-direction split cores that are provided along the axial direction and each of which has the magnet, the magnetically-assisted salient pole member, and the magnetic air gap. It is preferred that the circumferential positions of the magnets in the axial-direction split cores are constant regardless of the positions in the axial direction.

According to a fifth aspect of the present invention, in the rotating electric machine according to the fourth aspect, the rotor may include a plurality of core groups each consisting of a plurality of the axial-direction split cores that have substantially the same positions of the magnetic air gaps in the circumferential direction. It is preferred that a sum of thicknesses of the plurality of axial-direction split cores constituting the core group in the axial direction is constant for each of the plurality of core groups.

According to a sixth aspect of the present invention, in the rotating electric machine according to the second aspect, the magnetic air gap may be a concave formed on a surface of the rotor.

According to a seventh aspect of the present invention, it is preferred in the rotating electric machine according to the sixth aspect that the concave has a width angle in the circumferential direction that is within the range of ¼ to ½ times a pitch angle between any adjacent two of teeth provided in the stator.

According to an eighth aspect of the present invention, in the rotating electric machine according to the second aspect, the magnetic air gap may be a hole formed on a surface of the rotor.

According to a ninth aspect of the present invention, it is preferred in the rotating electric machine according to the eighth aspect that the hole is formed integratedly with a hole in which the magnet is provided.

According to a tenth aspect of the present invention, it is preferred in the rotating electric machine according to the first aspect that the plurality of magnets is arranged in the circumferential direction such that a direction of magnetization of each magnet is in a radial direction of the rotor that is perpendicular to the axial direction and an orientation of magnetization of each magnet is alternately reversed.

According to an eleventh aspect of the present invention, in the rotating electric machine according to the tenth aspect, each of the magnets may constitute a magnet group consisting of a plurality of magnets having substantially the same orientation of magnetization.

According to a twelfth aspect of the present invention, in the rotating electric machine according to the second aspect, the magnetically-assisted salient pole member may be provided with a plurality of the magnetic air gaps.

According to a thirteenth aspect of the present invention, in the rotating electric machine according to the second aspect, the magnetic air gaps may be arranged asymmetrically with respect to the q-axis passing through the salient pole center and symmetrically with respect to a d-axis passing through a magnetic pole center of the magnet.

According to a fourteenth aspect of the present invention, in the rotating electric machine according to the second aspect, the magnetic air gaps may be arranged symmetrically with respect to the q-axis passing through the salient pole center and asymmetrically with respect to a d-axis passing through a magnetic pole center of the magnet.

According to a fifteenth aspect of the present invention, in the rotating electric machine according to the first aspect, the rotor may include a plurality of rotor cores each including a laminate of electromagnetic steel sheets each provided with a hole or recess that constitutes a magnetic air gap.

According to a sixteenth aspect of the present invention, it is possible in the rotating electric machine according to the fifteenth aspect that each of the rotor cores has different position of the magnetic air gap depending on the position in the axial direction by offsetting the electromagnetic steel sheets in the circumferential direction by a unit of magnetic pole pitch of the magnet.

According to a seventeenth aspect of the present invention, in the rotating electric machine according to the second aspect, the rotor may include a first skew structure in which the magnets are arranged offset in the circumferential direction corresponding to the axial positions of the magnets and a second skew structure in which the magnetic air gaps are arranged offset in the circumferential direction corresponding to the axial positions of the magnetic air gaps.

According to an eighteenth aspect of the present invention, it is preferred in the rotating electric machine according to the first aspect that the stator coil is wound by distributed winding.

An electric vehicle according to a nineteenth aspect of the present invention includes a rotating electric machine according to the first aspect; a battery that supplies direct current power; and a conversion unit that converts the direct current power of the battery into an alternating current power and supplies the alternating current power to the rotating electric machine, and utilizes a torque of the rotating electric machine as a driving force.

Advantageous Effect of the Invention

According to the present invention, the performance (for example, efficiency, reliability, cost performance, or productivity) of a motor can be improved.

DESCRIPTION OF EMBODIMENTS

Hereafter, an embodiment of the present invention is explained referring to the attached drawings.

The rotating electric machine according to the present embodiment can suppress both cogging torque when power is not applied and torque fluctuations when power is applied as will be explained below so that a reduction in size, a reduction in cost and reduction in torque fluctuations can be achieved. As a result, the rotating electric machine according to the present embodiment is suitable as a motor for driving an electric vehicle and an electric vehicle that produces low vibration and low noises and hence giving comfortable ride quality can be provided. The rotating electric machine can be applied to a genuine electric vehicle that is driven only by a rotating electric machine and to a hybrid electric vehicle that is driven by both an engine and a rotating electric machine. Hereafter, explanation is focused on the hybrid electric vehicle.

First Embodiment

Figure 1:
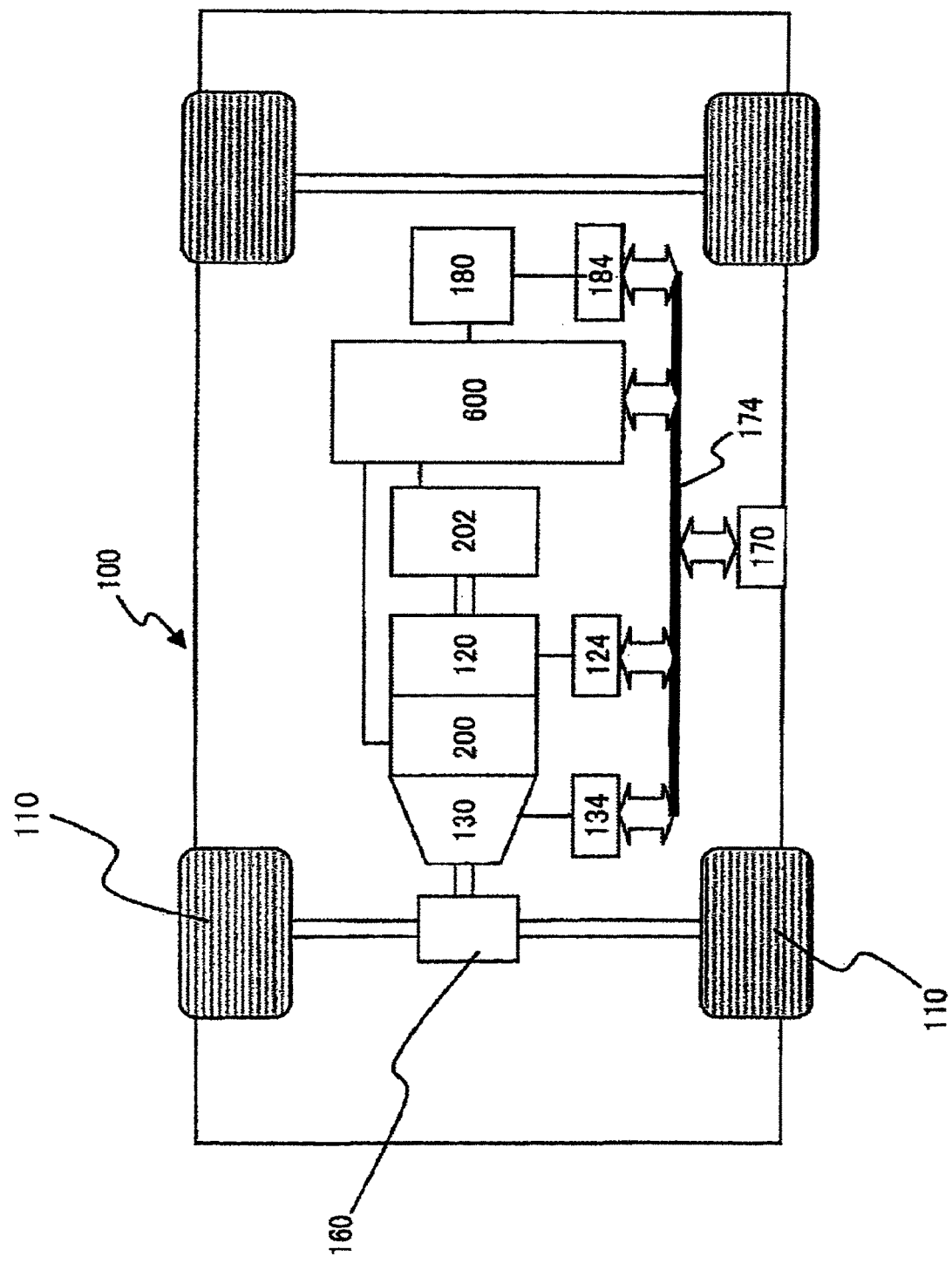
FIG. 1 shows a schematic construction of a hybrid electric vehicle having mounted thereon a rotating electric machine according to one embodiment of the present invention.

FIG. 1 presents a schematic diagram showing the construction of a hybrid electric vehicle having mounted thereon a rotating electric machine according to an embodiment of the present invention. A vehicle 100 has mounted thereon an engine 120 and a first rotating electric machine 200, a second rotating electric machine 202, and a battery 180. The battery 180 supplies direct current power to the rotating electric machines 200 and 202 when driving forces of the rotating electric machines 200 and 202 are required and the battery 180 receives direct current power from the rotating electric machines 200 and 202 upon regenerative driving. Transfer of direct current power between the battery 180 and the rotating electric machines 200 and 202 is conducted through a power converter unit 600. Though not shown, the vehicle has mounted thereon a battery that supplies low voltage power (for example, 14-volt power) and supplies direct current power to a control circuit, which is explained hereinbelow.

The rotation torques by the engine 120 and the rotating electric machines 200 and 202 are transmitted to a front wheels 110 through a transmission 130 and a differential gear 160. The transmission 130 is controlled by a transmission control unit 134 and the engine 120 is controlled by an engine control unit 124. The battery 180 is controlled by a battery control unit 184. The transmission control unit 134, the engine control unit 124, the battery control unit 184, the power converter unit 600, and an integrated control unit 170 are connected to each other through communication line 174.

The integrated control unit 170 receives state information indicating a state of each of the control units from the control devices downstream of the integrated control unit 170, i.e., the transmission control unit 134, the engine control unit 124, the power converter unit 600, and the battery control unit 184 through the communication line 174. The integrated control unit 170 calculates a control command for each of the control devices based on the state information. The calculated control commands are transmitted to the respective control units through the communication circuit 174.

The battery 180, which is at high voltage, comprises a secondary battery such as a lithium ion battery or a nickel-metal hydride battery and outputs direct current power at high voltage in the range of 250 V to 600 V or higher. The battery control unit 184 outputs information on a state of discharge of the battery 180 and information on a state of each unit cell of the battery included in the battery 180 to the integrated control unit 170 through the communication line 174.

The integrated control unit 170 determines whether or not charge of the battery 180 is necessary based on the state information from the battery control unit 180 and outputs an instruction to perform power-generating operation to the power converter unit 600 when the charge of the battery 180 is determined to be necessary. The integrated control unit 170 in the main performs management of output torques of the engine 120 and the rotating electric machines 200 and 202, calculation of an integrated torque and a distribution ratios of torques from the output torque of the engine 120 and the output torques of the rotating electric machines 200 and 202, and transmission of control commands based on results of the calculation to the transmission control unit 134, the engine control unit 124, and the power converter unit 600. The power converter unit 600 controls the rotating electric machines 200 and 202 to generate the torque output or generated power energy as commanded based on the torque command from the integrated control unit 170.

The power converter unit 600 is provided with a power semiconductor that constitutes an inverter for driving the rotating electric machines 200 and 202. The power converter unit 600 controls a switching operation of the power semiconductor based on the command from the integrated control unit 170. The rotating electric machines 200 and 202 are operated as electric machines or alternators by the switching operation of the power semiconductor.

When the rotating electric machines 200 and 202 are operated as electric machines, direct current power from the high voltage battery 180 is supplied to direct current terminals of the inverter in the power converter unit 600. The power converter unit 600 converts supplied direct current power into three-phase alternating current power by controlling the switching operation of the power semiconductor and supplies the obtained alternating current power to the rotating electric machines 200 and 202. On the other hand, when the rotating electric machines 200 and 202 are operated as alternators, the rotors of the rotating electric machines 200 and 202 are driven and rotated by rotating torque applied from outside to generate three-phase alternating current power in stator windings of the rotating electric machines 200 and 202. The generated three-phase alternating current power is converted into direct current power by the power converter unit 600. The obtained direct current power is supplied to the high voltage battery 180 to effect charging.

Figure 2:
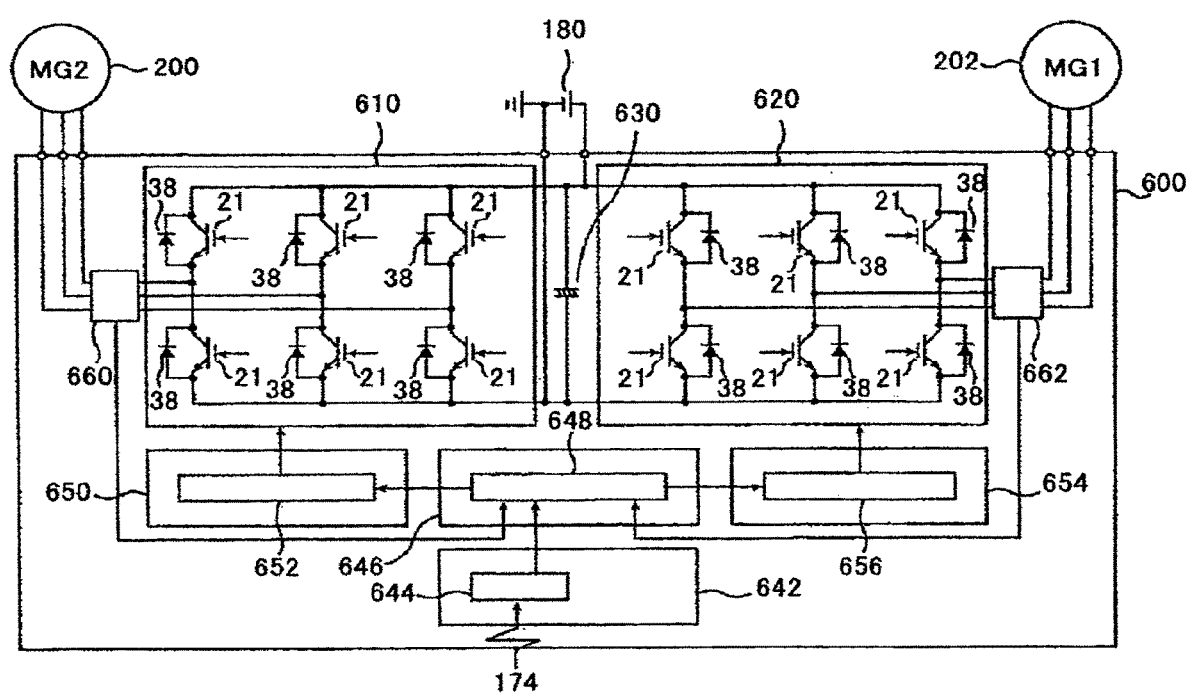
FIG. 2 presents a circuit diagram of the power conversion apparatus 600 shown in FIG. 1.

FIG. 2 presents a circuit diagram of the power converter unit 600 shown in FIG. 1. The power converter unit 600 is provided with a first inverter unit for the rotating electric machine 200 and a second inverter unit for the rotating electric machine 202. The first inverter unit includes a power module 610, a first drive circuit 652 that controls the switching operation of each power semiconductor 21 in the power module 610, and a current sensor 660 that detects current in the rotating electric machine 200. The drive circuit 652 is provided on a drive circuit board 650. On the other hand, the second inverter unit includes a power module 620, a second drive circuit 656 that controls the switching operation of each power semiconductor 21 in the power module 620, and a current sensor 662 that detects current in the rotating electric machine 202. The drive circuit 656 is provided on a drive circuit board 654. A control circuit 648 provided on a control circuit board 646, a capacitor module 630, and a transmitting and receiving circuit 644 implemented in a connector board 642 are used in common by the first and the second inverter units.

The power modules 610 and 620 operate in response to corresponding drive signals output from the drive circuits 652 and 656, respectively. The power modules 610 and 620 convert direct current power supplied from the battery 180 into three-phase alternating current power and supplies the obtained power to stator coils, which are armature coils of the corresponding rotating electric machines 200 and 202, respectively. The power modules 610 and 620 convert the alternating current power induced in the stator coils of the rotating electric machines 200 and 202 into direct current power and then supply the resultant direct current power to the high voltage battery 180.

The power modules 610 and 620 include a three-phase bridge circuit as shown in FIG. 2. Series circuits corresponding to the three-phases are each electrically connected in parallel between the positive electrode side and the negative electrode side of the battery 180. Each of the series circuits includes a power semiconductor 21 constituting an upper arm and a power semiconductor 21 constituting a lower arm. The power semiconductors 21 are connected to each other in series. The power module 610 and the power module 620 have substantially the same circuit construction as shown in FIG. 2. Here, the power module 610 is explained on behalf of the both.

In the present embodiment, IGBT (Insulated Gate Bipolar Transistor) 21 is used as the power semiconductor for switching. IGBT 21 includes three electrodes, i.e., a collector electrode, an emitter electrode, and a gate electrode. Between the collector electrode and the emitter electrode of IGBT 21 is electrically connected a diode 38. The diode 38 includes two electrodes, i.e., a cathode and an anode. The cathode and anode are electrically connected to the collector electrode and emitter electrode, respectively, of IGBT 21 so that a direction of from the emitter electrode to the collector electrode of the IGBT 21 is a forward direction.

Also, MOSFET (Metal Oxide Semiconductor Field-Effect Transistor) may be used as the power semiconductor for switching. MOSFET includes three electrodes, i.e., a drain electrode, a source electrode, and a gate electrode. Since MOSFET includes a parasite diode between the source electrode and the drain electrode so that a direction of from the drain electrode to the source electrode is a forward direction, it is not necessary that MOSFET includes the diode 38 as shown in FIG. 2.

The arms for respective phases each include the source electrode of IGBT 21 and the drain electrode of IGBT 21 electrically connected to each other in series. In the present embodiment, only a single IGBT is shown for each of the upper and lower arms for each phase. In actuality, a plurality of IGBTs is electrically connected in parallel since current capacity to be controlled is huge. Hereafter, a single power semiconductor is described in order to make explanation simpler.

In the example shown in FIG. 2, each of the upper and lower arms for each phase includes three IGBTs. The drain electrode of IGBT 21 in each upper arm for each phase and the source electrode of IGBT 21 in each lower arm for each phase are electrically connected to the positive electrode side and the negative electrode side, respectively, of the battery 180. Middle points of respective arms for each phase (a connection part between the source electrode of the upper arm side IGBT and the drain electrode of the lower arm side IGBT) are electrically connected to the armature coils (stator coils) of the corresponding phase of the corresponding rotating electric machines 200 and 202.

The drive circuits 652 and 656 constitute respective drive units for controlling the corresponding power modules 610 and 620 and generate drive signals for driving IGBTs 21 based on the control signals output from the control circuit 648. The drive signals generated in the drive circuits 652 and 656 are output to the gate of each power semiconductor in the power modules 610 and 620. The drive circuits 652 and 656 are each provided with six integrated circuits that generate drive signals supplied to the respective gates of the upper and lower arms for each phase. The six integrated circuits are formed as one block.

The control circuit 648 constitutes the control unit in each of the power modules 610 and 620. The control circuit 648 comprises a microcomputer that calculates control signals (control values) for operating (turning on or off) the plurality of power semiconductors for switching. Torque command signals (torque command values) from a superordinate control unit, sensor outputs from the current sensors 660 and 662, and sensor outputs from the rotation sensors mounted on the rotating electric machines 200 and 202 are input to the control circuit 648. The control circuit 648 calculates control values based on the input signals and outputs control signals for controlling the switching timing to the drive circuits 652 and 656.

The transmitting and receiving circuit 644 implemented on the connector board 624 is to connect the power converter unit 600 and an outer control unit, and transmits and receives information with other units through the communication line 174 as shown in FIG. 1. The capacitor module 630 constitutes a smoothing circuit for suppressing a fluctuation in direct current voltage generated by the switching operation of IGBT 21 and is electrically connected in parallel to the terminal on the direct current side in the first power module 610 and the second power module 620.

Figure 3:
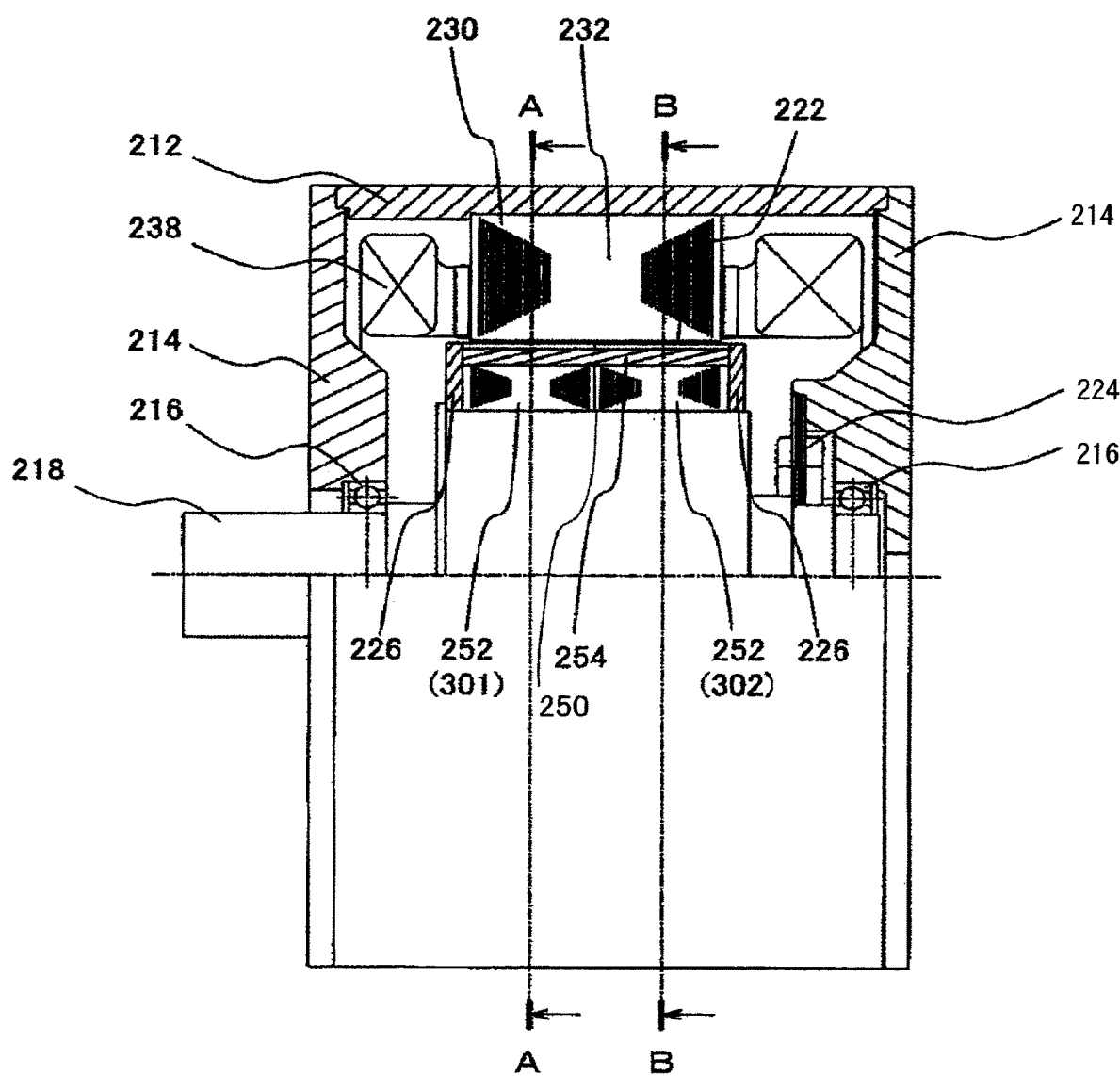
FIG. 3 presents a cross-sectional view of the rotating electric machine 200 or 202 shown in FIG. 1.

FIG. 3 presents a cross-sectional view of the rotating electric machine 200 or 202 shown in FIG. 1. The rotating electric machines 200 and 202 have substantially the same structures. Hereafter, explanation is made taking the structure of the rotating electric machine 200 as a representative example. The structure explained hereafter does not have to be adopted in both of the rotating electric machines 200 and 202 but it will be sufficient if it is adopted at least one of them.

Inside a housing 212, there is held the stator 230. The stator 230 includes the stator core 232 and the stator coil 238. The rotor 250 is rotatably held inside the stator core 232 with an air gap 222. The rotor 250 includes the rotor core 252, permanent magnets 254, and nonmagnetic wear plates 226. The rotor core 252 is fixed to a shaft 218. The housing 212 has a pair of end brackets 214 each provided with a bearing 216. The shaft 218 is rotatably held by these bearings 216.

As shown in FIG. 3, the shaft 218 is provided with a resolver 224 that detects the positions of the poles of the rotor 250 and rotation speed of the rotor 250. An output from the resolver 224 is introduced into the control circuit 648 shown in FIG. 2. The control circuit 648 outputs the control signals to the drive circuit 652 based on the introduced output. The drive circuit 652 outputs the drive signals to the power module 610 based on the control signals. The power module 610 performs switching operation based on the control signals to convert the direct current power supplied from the battery 180 into three-phase alternating current power. The three-phase alternating current power is supplied to the stator coil 238 and a rotating magnetic field is generated in the stator 230. The frequency of the three-phase alternating current is controlled based on the detected value by the resolver 224. Also, the phases of the three-phase alternating current are controlled based on the detected value by the resolver 224.

Figure 4A:
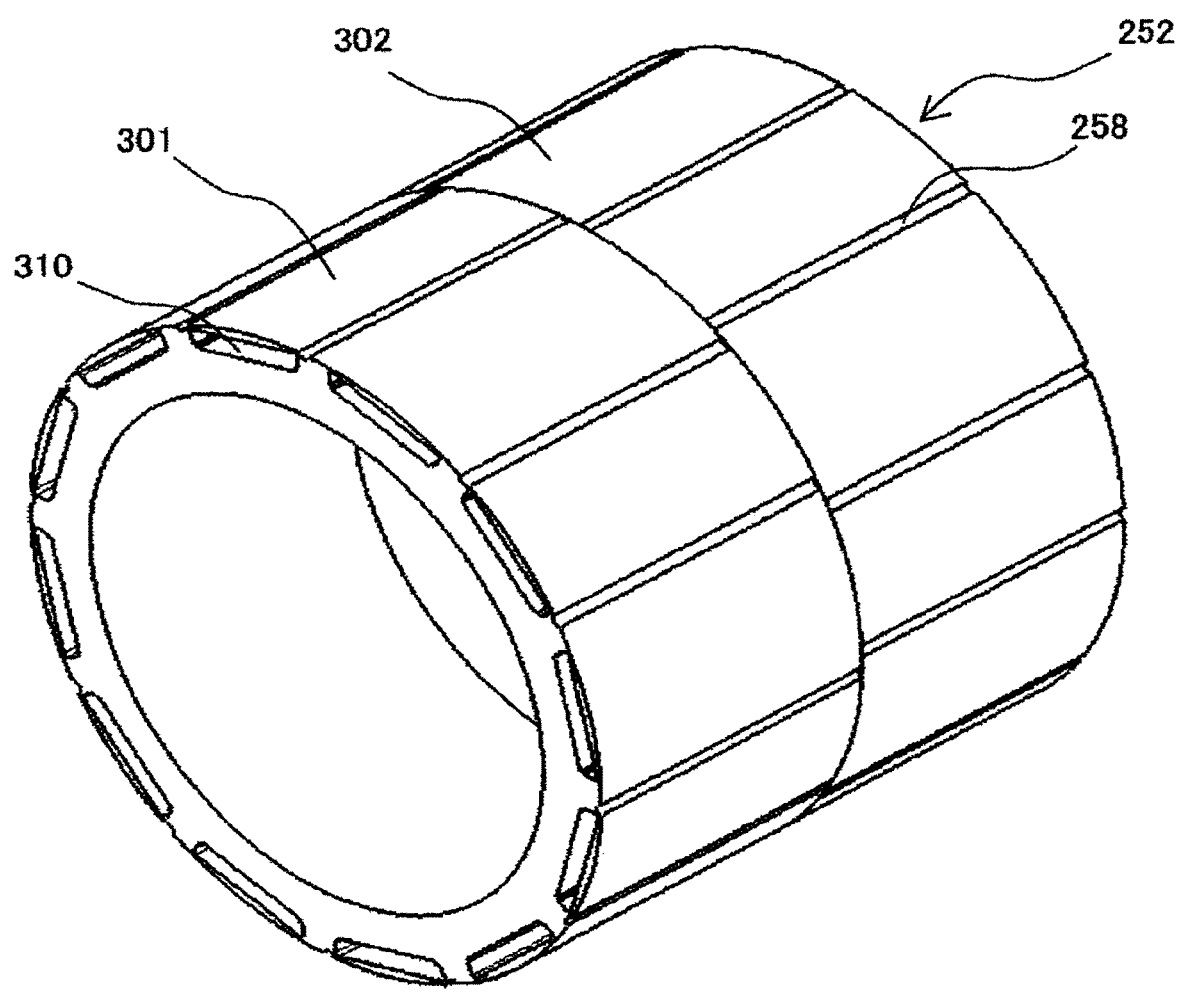
FIG. 4(a) presents a perspective view of the rotor core 252 shown in FIG. 3.

FIG. 4(*a*) presents a perspective view of the rotor core 252 of the rotor 250. The rotor core 252 includes two cores 301 and 302 as shown in FIG. 4(*b*). The length H2 of the core 302 along its axial direction is set to be substantially the same as the length H1 of the core 301 along its axial direction. FIGS. 5(*a*) and 5(*b*) show the stator 230 and the rotor 250 in cross-section. FIG. 5(*a*) presents a cross-sectional view along the A-A line passing through a part of the core 301 (see, FIG. 3). FIG. 5(*b*) presents a cross-sectional view along the B-B line passing through a part of the core 302 (see, FIG. 3). In FIGS. 5(*a*) and 5(*b*), depiction of the housing 212, the shaft 218, and the stator coil 238 is omitted.

On the inner periphery side of the stator core 232, there are uniformly arranged a number of slots 24 and teeth 236 all around. In FIGS. 5(*a*) and 5(*b*), not all of the slots and teeth have been allotted reference numerals but only some of the teeth and slots have been allotted reference numerals on behalf of the whole. In the slot 24, a slot insulator (not shown) is provided and a plurality of phase winding wires of u-phase to w-phase is fitted. In the present embodiment, distributed winding is adopted as the method of winding the stator coil 238.

The distributed winding is a method of winding a coil wire by which the wire is wound around the stator core 232 such that the phase winding wire is accommodated in two slots that are remotely arranged over a plurality of slots 24 intervening therebetween. In the present embodiment, the distributed winding is adopted as the method of wire winding, so that the formed distribution of magnetic flux is nearly sinusoidal, with the result that reluctance torque can be easily obtained. Therefore, control of the rotation speed over a wide range of the number of rotations ranging from low rotation speed to high rotation speed can be achieved by utilizing field weakening control and reluctance torque. The distributed winding is suitable for obtaining motor characteristics adapted for electric vehicles.

Each of the cores 301 and 302 of the rotor core 252 is provided with holes 310 in each of which a rectangular magnet is to be inserted. The permanent magnets 254 are introduced into the holes 310 and fixed thereto with an adhesive or the like. The widths of the holes 310 in the circumferential direction are set to be larger than the widths of the permanent magnets 254 in the circumferential direction. On both sides of the permanent magnets 254 are formed magnetic air gaps 257. The magnetic air gaps 257 may be filled with the adhesive. Alternatively, the magnetic air gaps 257 may be filled with forming resins together with the permanent magnets 254, which will then be integrally fixed. The permanent magnets 254 operate as field poles of the rotor 250.

The directions of magnetization of the permanent magnets 254 are set along the radial direction of the rotor core 252 and reversed every field pole. That is, assuming that the surface of a permanent magnet 254*a* on the stator side is an N pole and a surface of the permanent magnet 254*a* on the axis side is an S pole, a surface of an adjacent permanent magnet 254*b* on the stator side is an S pole and a surface of the permanent magnet 254*b* on the axis side is an N pole. The permanent magnets 254*a* and 254*b* are arranged alternately in the circumferential direction. In the present embodiment, twelve of such permanent magnets 254 are arranged at regular intervals. Thus, the rotor 250 has twelve poles.

The permanent magnets 254 may either be embedded in the rotor core 252 after magnetization or be inserted in the rotor core 252 before magnetization and then magnetized by applying thereto a strong magnetic field. Since the permanent magnets 254 after the magnetization are strong magnets, if the permanent magnets 254 are magnetized before they are fixed to the rotor 250, strong attractive forces are generated between the rotor core 252 and the permanent magnets 254 when the permanent magnets 254 are fixed and the resulting centripetal forces prevent the operation for producing the rotor. In addition, dust such as iron powder may adhere to the permanent magnets 254 due to the strong attractive forces. Therefore, the method in which magnetization is performed after the permanent magnets 254 have been inserted into the rotor core 252 is more productive than otherwise.

The permanent magnets 254 may include sintered magnets containing neodymium or samarium, ferrite magnets, bond magnets containing neodymium, and so on. The permanent magnets 254 have a residual magnetic flux density of approximately 0.4 to 1.3 T.

Figure 5A:
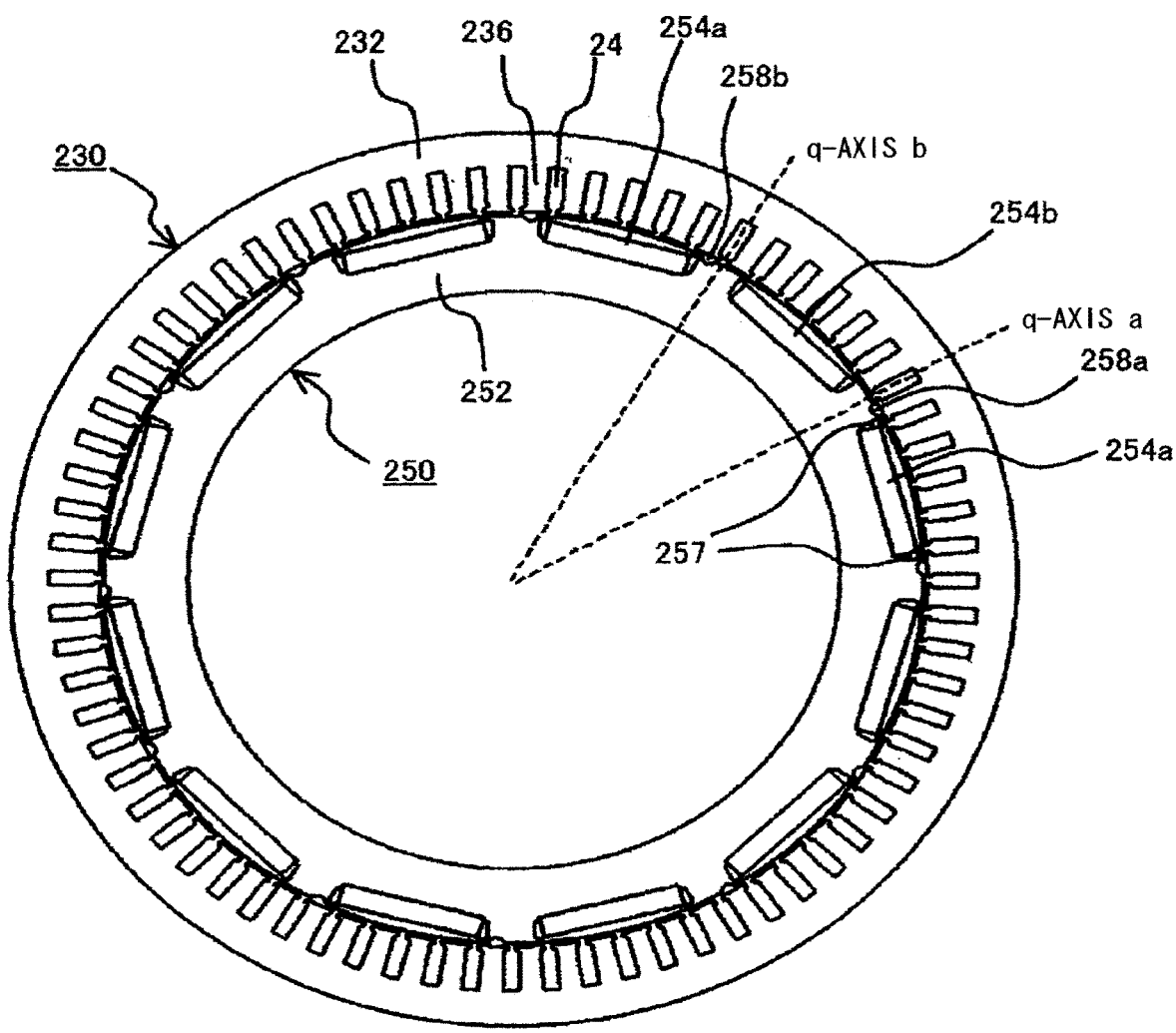
FIG. 5(a) presents a cross-sectional view of the stator 230 and the rotor 250 along the A-A line of FIG. 3.
Figure 6A:
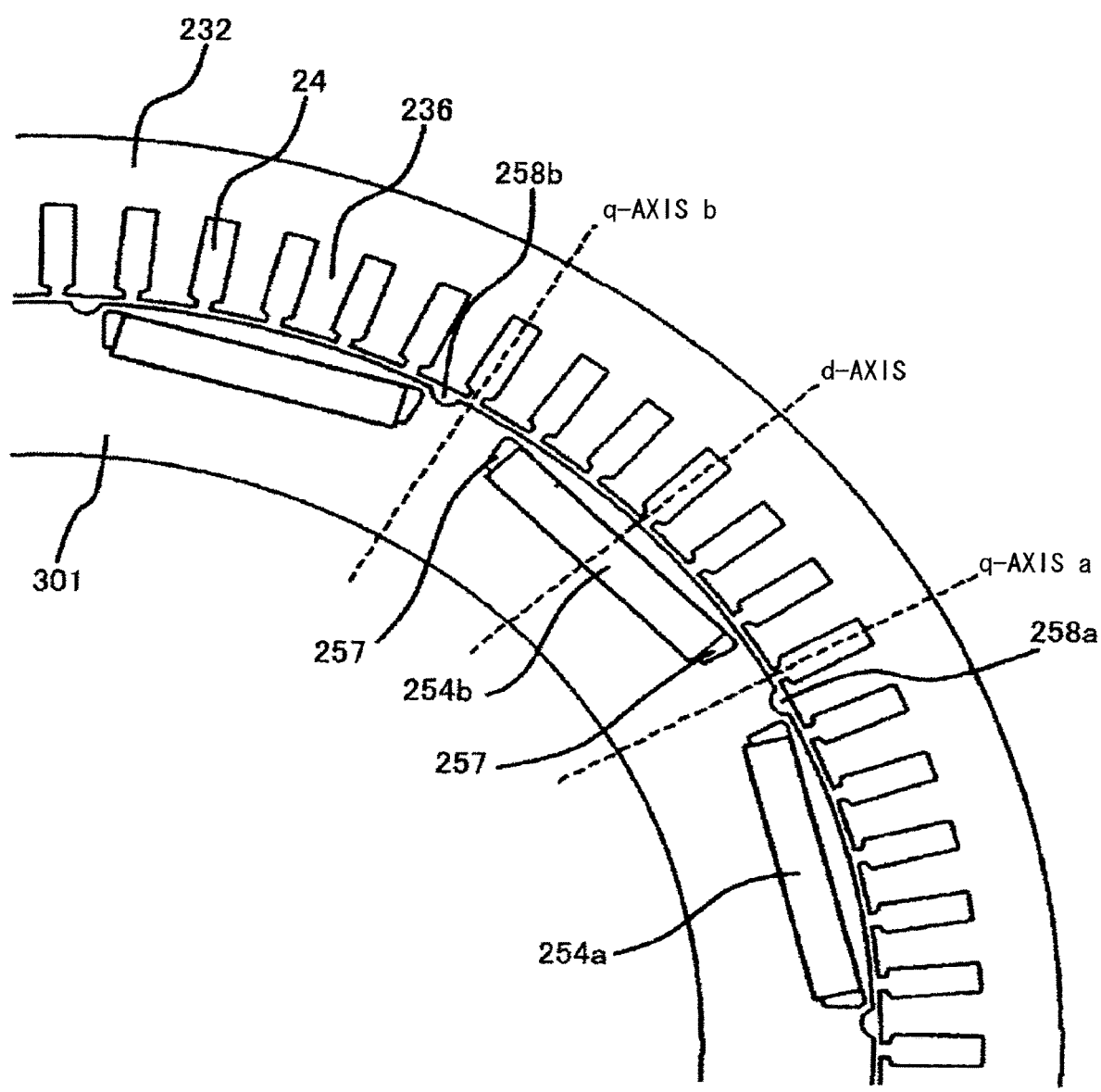
FIG. 6(a) presents an enlarged cross-sectional view near the permanent magnet 254b along the A-A line of FIG. 3.

FIG. 6(a) presents an enlarged view of a part of the cross-sectional view shown in FIG. 5(a). The core 301 of the rotor core 252 is provided with grooves that constitute magnetic air gaps 258 on a surface of the rotor 250 in addition to the magnetic air gaps 257 formed on both the sides of the permanent magnets 254. The magnetic air gaps 257 are provided to reduce cogging torque and the magnetic air gaps 258 are provided to reduce torque fluctuations when power is applied. Assuming that as seen from the inner periphery of the rotor 250, a central axis between the permanent magnet 254a and a next magnet on the left side of the permanent magnet 254a is named q-axis a and a central axis between the permanent magnet 254b and a next magnet on the left side of the permanent magnet 254b is named q-axis b, a magnetic air gap 258a is arranged offset to the right with respect to the q-axis a and a magnetic air gap 258b is arranged offset to the left with respect to the q-axis b. The magnetic air gap 258a and the magnetic air gap 258b are arranged symmetric with respect to a d-axis, which is a central axis of magnetic poles.

Figure 5B:
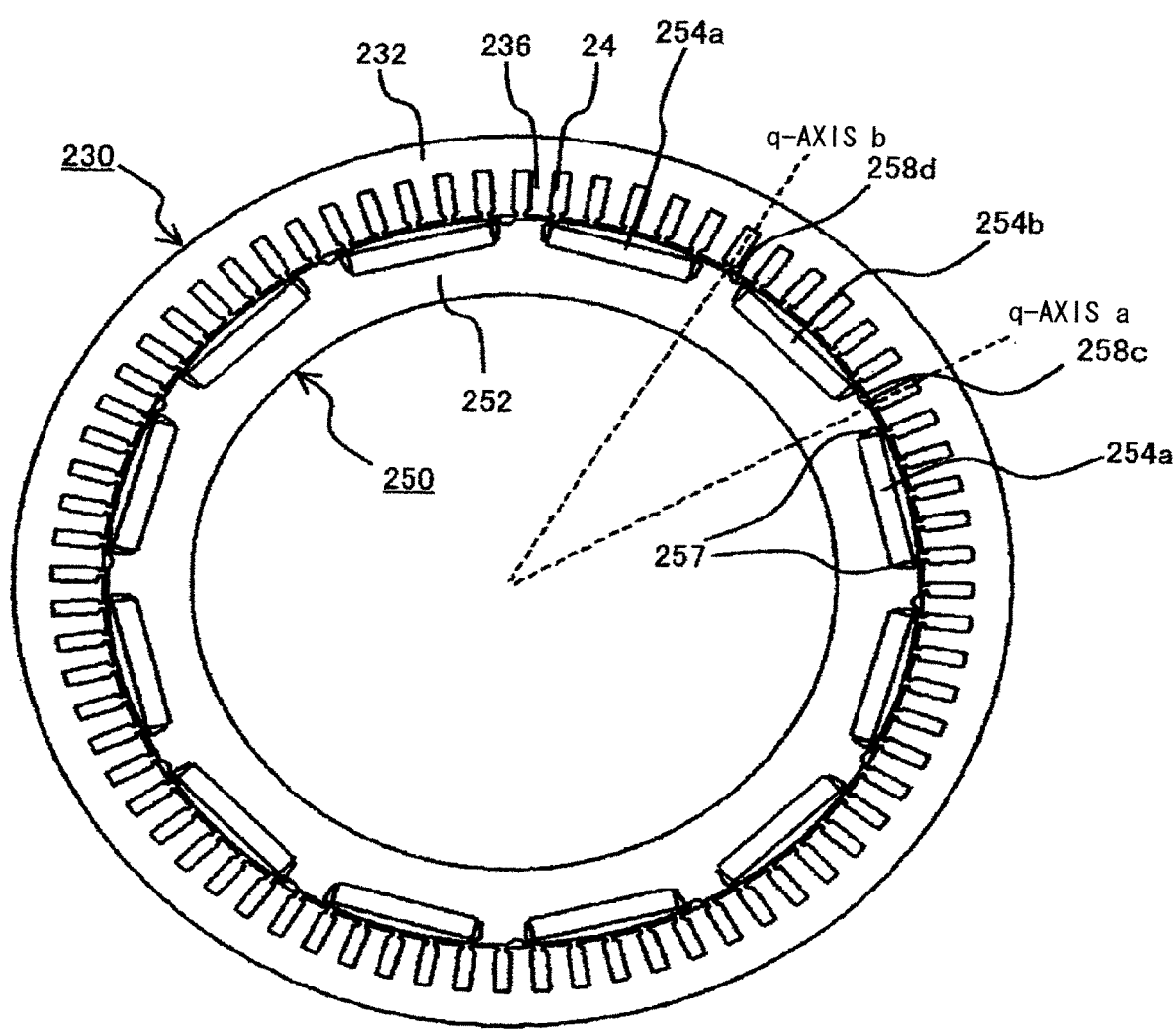
FIG. 5(b) presents a cross-sectional view of the stator 230 and the rotor 250 along the B-B line of FIG. 3.
Figure 6B:
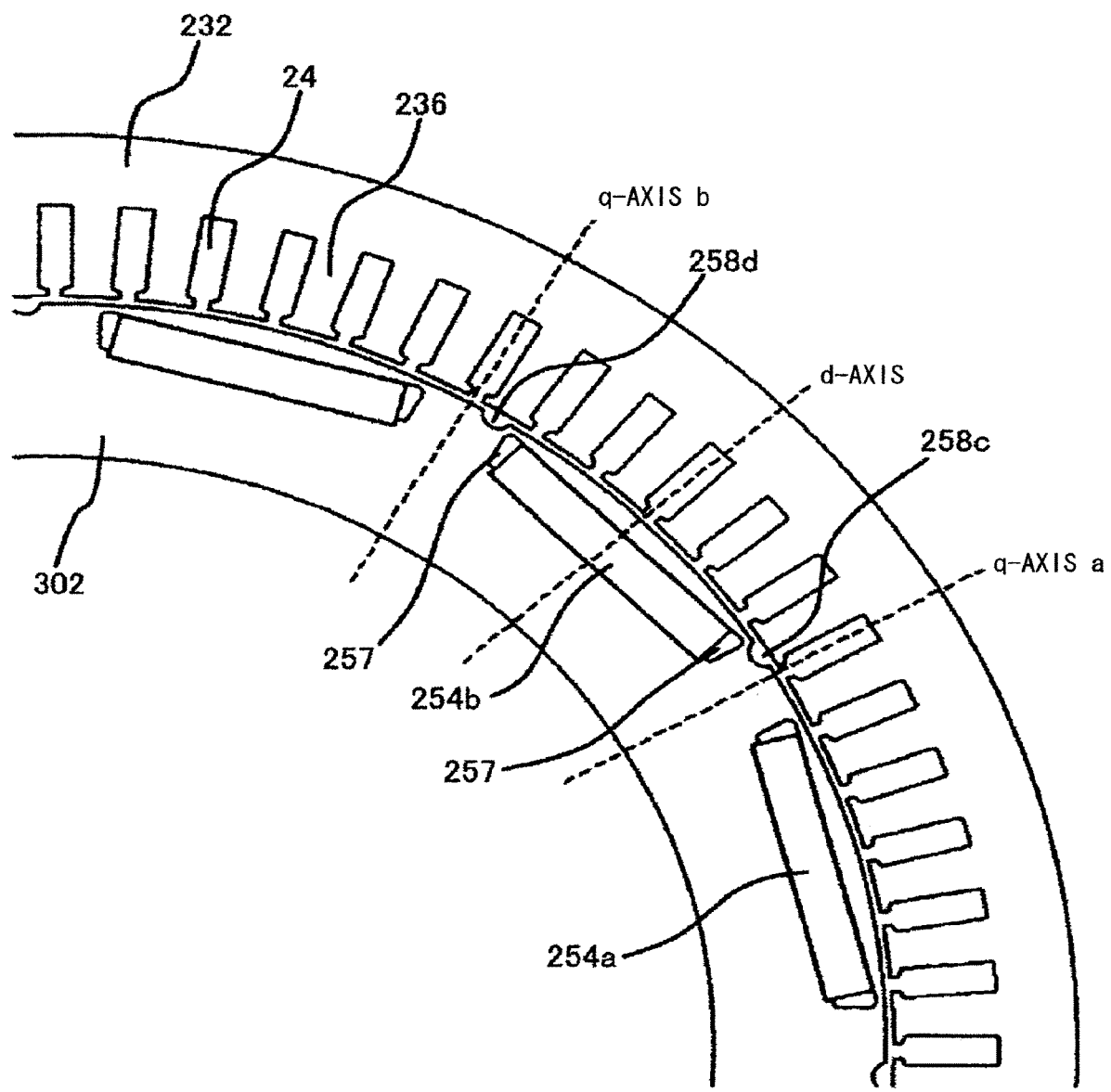
FIG. 6(b) presents an enlarged cross-sectional view near the permanent magnet 254b along the B-B line of FIG. 3.

On the other hand, FIG. 6(b) is an enlarged view of a part of the cross-sectional view shown in FIG. 5(b). The core 302 of the rotor core 252 is formed of magnetic air gaps 258c and 258d instead of the magnetic air gaps 258a and 258b. As seen from the inner periphery of the rotor 250, the magnetic air gap 258c is arranged offset to the left with respect to the q-axis a and the magnetic air gap 258d is arranged offset to the right with respect to the q-axis b. From FIGS. 5(a), 5(b), 6(a), and 6(b), it can be seen that the cross-sectional shapes of the cores 301 and 302 are the same except that the positions at which the magnetic air gaps 258a and 258b and the magnetic air gaps 258c and 258d are different, respectively.

The magnetic air gaps 258a and 258d are arranged at positions offset from each other by 180 degrees in electric angle and the magnetic air gaps 258b and 258c are arranged at positions offset from each other by 180 degrees in electric angle. That is, the core 302 can be formed by rotating the core 301 by one pitch of magnetic poles. As a result, the core 301 and the core 302 can be produced using the same mold so that their production cost can be decreased. The circumferential positions of the holes 310 of the cores 301 and 302 correspond to each other without any offset. As a result, the permanent magnet 254 fitted in each hole 310 constitute an integrated magnet penetrating each of the cores 301 and 302 without being divided in the axial direction. Of course, a plurality of divided magnets 254 may be arranged as being stacked in the axial direction of the hole 310.

When a rotating magnetic field is generated in the stator 230 by the three-phase alternating current, the rotating magnetic field interacts with the permanent magnets 254a and 254b of the rotor 250 to generate a magnet torque. The rotor 250 is affected by a reluctance torque in addition to the magnet torque.

Figure 7:
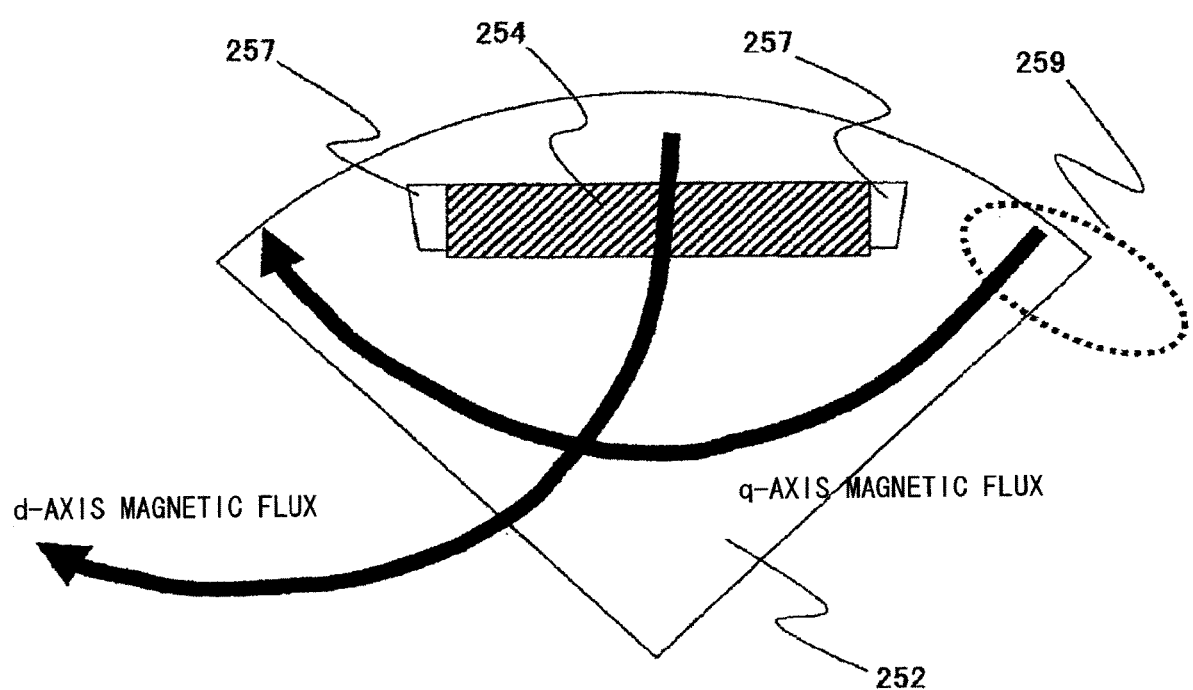
FIG. 7 presents an illustration diagram of reluctance torque.

FIG. 7 presents a diagram illustrating a reluctance torque. Generally, an axis along which magnetic flux passes through the center of a magnet is called a d-axis and an axis along which magnetic flux passes one interpolar position to another interpolar position is called a q-axis. The part of the core that is present at the center between the poles of the magnet is called an assisted salient pole member 259. The permeability of the permanent magnet 254 provided in the rotor 250 is approximately the same as that of air, so that when viewed from the side of the stator, the d-axis member is magnetically concave and the q-axis member is magnetically convex. Therefore, the part of the core in the q-axis part is called salient pole. The reluctance torque is generated by a difference in readiness of transmission of magnetic flux along the axis between the d-axis and the q-axis, i.e., by a salient pole ratio.

As mentioned above, the rotating electric machine to which the present embodiment is applied is one that utilizes both a magnet torque and an assisted salient pole reluctance torque. Both the magnet torque and the reluctance torque each generate torque fluctuations. The torque fluctuations include a fluctuation component that is generated when power is not applied and a fluctuation component that is generated when power is applied. The fluctuation component that is generated when power is not applied is generally called cogging torque. When the rotating electric machine is actually used in a loaded state, there are generated combined torque fluctuations consisting of the cogging torque and the fluctuation component when power is applied.

Most conventional methods for reducing the torque fluctuations of such a rotating electric machine relate to a reduction in cogging torque only but disclose nothing about a reduction in torque fluctuations occurring when power is applied. However, in many cases, noises of the rotating electric machine occur not in an unloaded state but in a loaded state. That is, it is important to reduce torque fluctuations in a loaded state in order to reduce noises of the rotating electric machine. Any countermeasure that relates to cope with the cogging torque only is insufficient.

Now, the method of reducing torque fluctuations according to the present embodiment is explained.

Figure 8A:
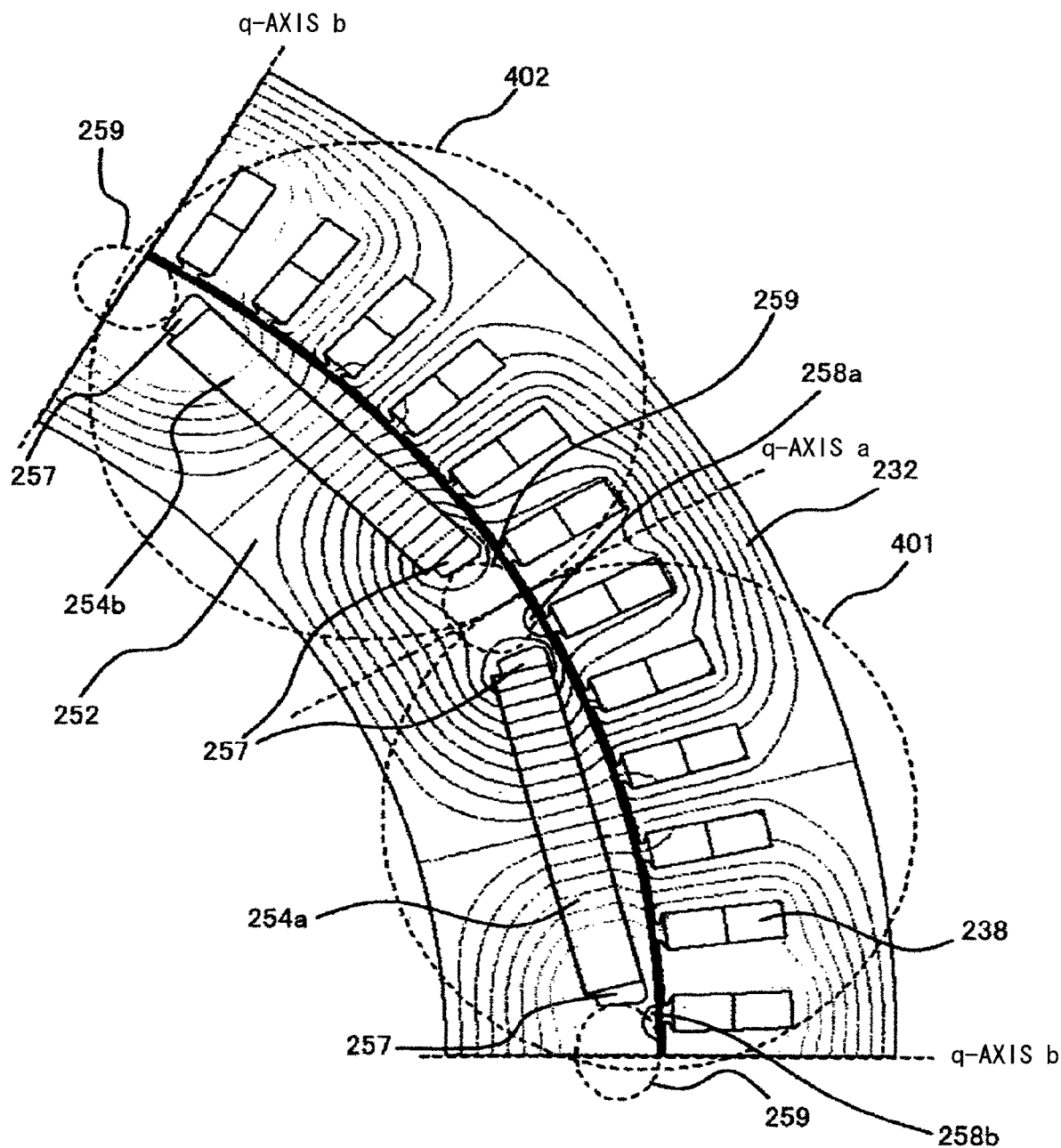
FIG. 8(a) shows distribution of magnetic fluxes on the A-A cross-section when power is not applied.

First, influence of the magnetic air gap 258 when power is not applied. FIG. 8(a) shows a result of simulation of distribution of magnetic flux when current is not flown in the stator coil 238, that is, distribution of magnetic flux by the permanent magnet 254. FIG. 8(a) shows two poles, i.e., a region 401 constituted by the permanent magnet 254a and a region 402 constituted by the permanent magnet 254b. That is, the above-mentioned result is a result of simulation of the rotating electric machine in which the region 401 and the region 402 are arranged alternately in the circumferential direction, showing an A-A cross-section. Since the rotating electric machine according to the present embodiment includes 12 poles, the regions 401 and 402 each include 6 poles, which are alternately arranged in the circumferential direction. For each pole, the magnetic air gaps 258a and 258b are in the assisted salient pole member 259 in the region 401 but the assisted salient pole member 259 in the region 402 includes no magnetic air gap 258.

When power is applied, the magnetic flux by the permanent magnet 254 is short-circuiting the magnet ends. Therefore, no magnetic flux at all passes along the q-axis. It can be seen that substantially no magnetic flux passes through portions of the magnetic air gaps 258a and 258b provided at positions slightly offset from the magnetic air gaps 257 in the magnet ends. The magnetic flux passing the stator core 232 passes a part of the core on the side of the stator in the permanent magnet 254 to reach the teeth 236. As a result, the magnetic air gaps 258a and 258b give substantially no influence on the magnetic flux when power is not applied that relates to cogging torque. From this, it follows that the magnetic air gaps 258a and 258b give no influence on the cogging torque.

Figure 8B:
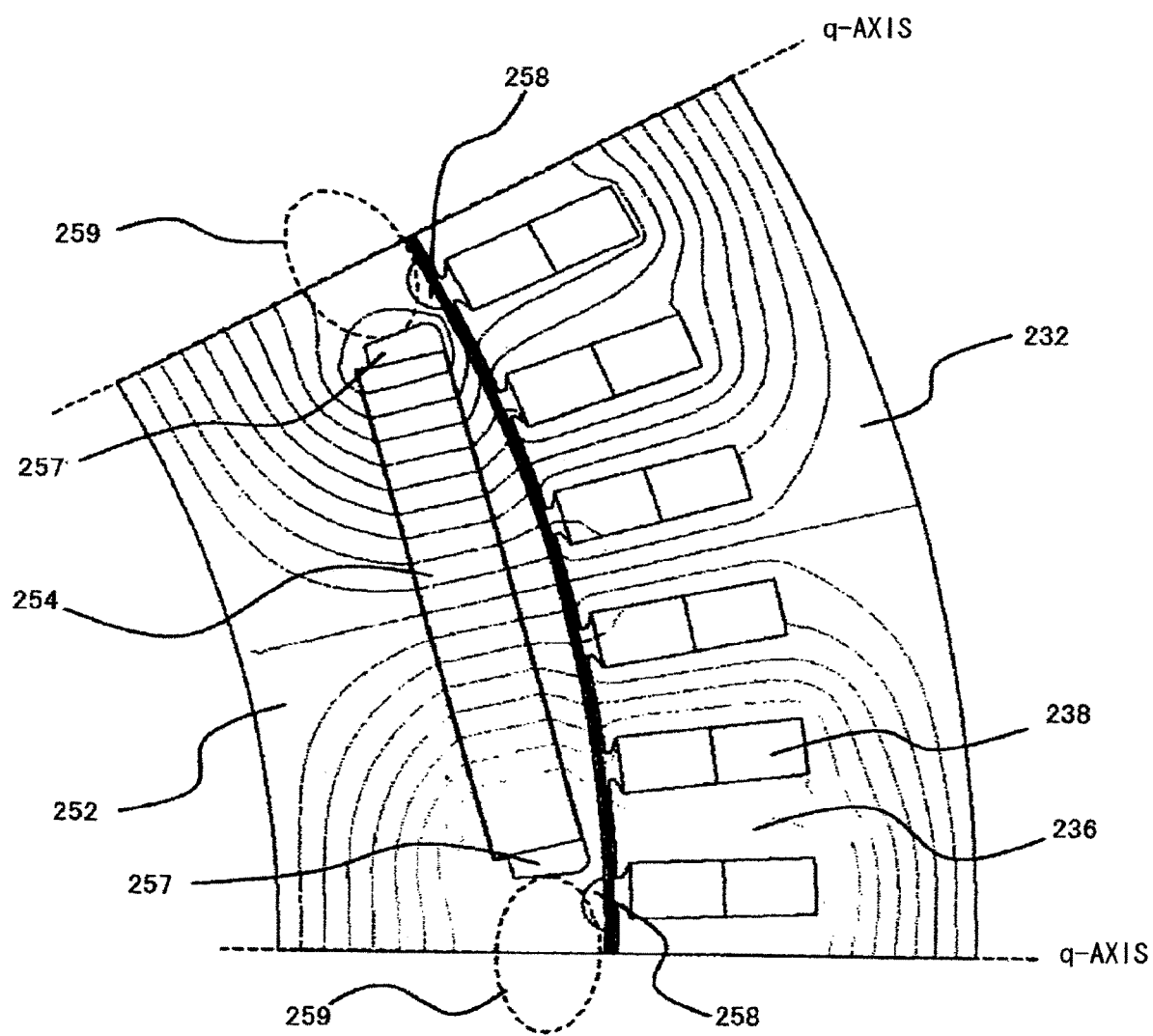
FIG. 8(b) shows distribution of magnetic fluxes of the rotating electric machine only in the region 401.
Figure 8C:
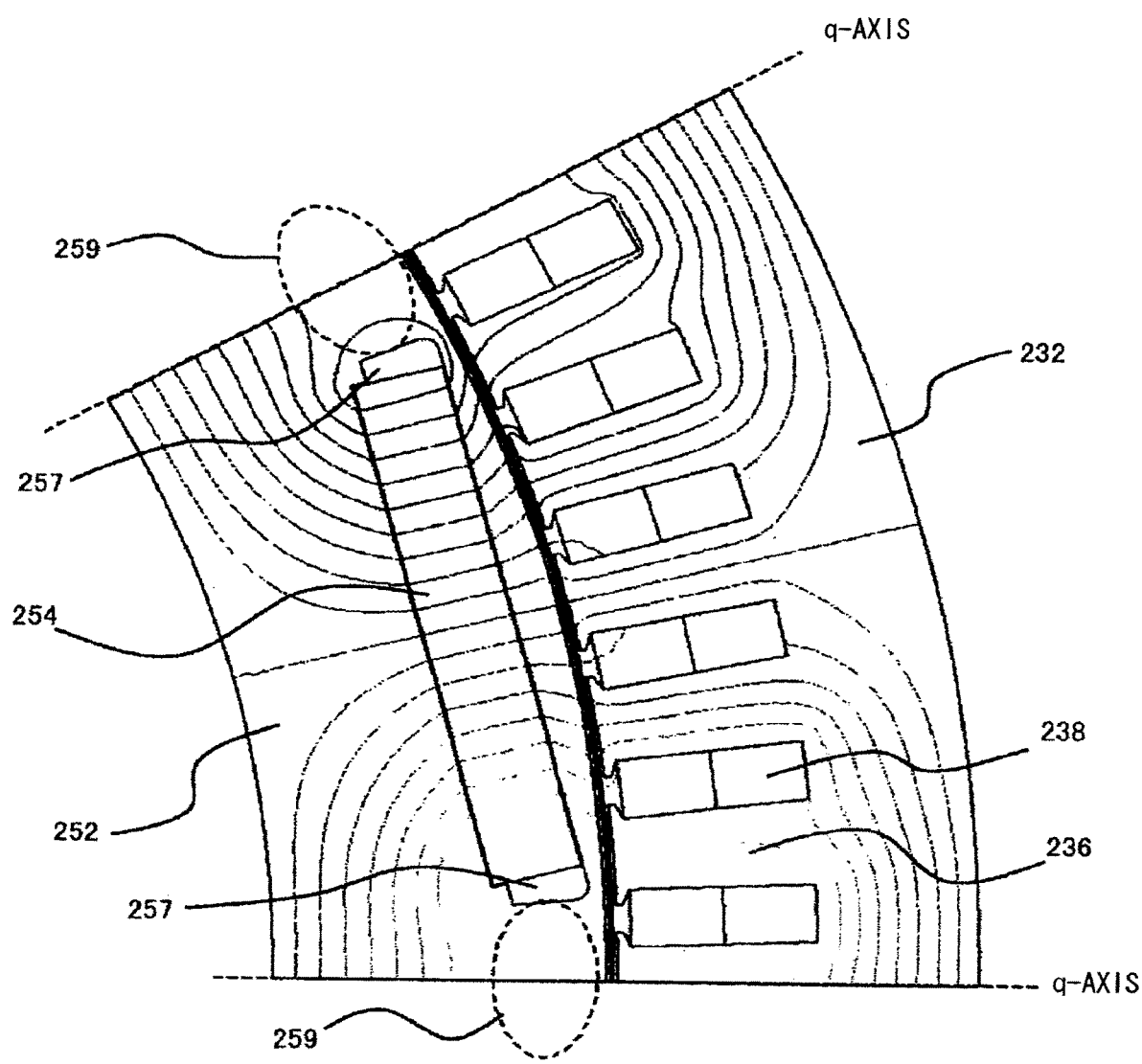
FIG. 8(c) shows distribution of magnetic fluxes of the rotating electric machine only in the region 402.

FIG. 8(b) shows the result of simulation on the region 401 only and FIG. 8(c) shows the result of simulation on the region 402 only. FIG. 8(b) shows a rotating electric machine that includes twelve poles each consisting of the region 401 only arranged in the circumferential direction and is constructed such that the direction of magnetization of the permanent magnet 254 of each pole is reversed pole by pole.

FIG. 8(c) shows a rotating electric machine that includes twelve poles each consisting of the region 402 only arranged in the circumferential direction and is constructed such that the direction of magnetization of the permanent magnet 254 of each pole is reversed pole by pole. FIGS. 8(b) and 8(c) each show similar magnetic flux distribution to that shown in FIG. 8(a), with no magnetic flux passing along the q-axis.

Figure 9A:
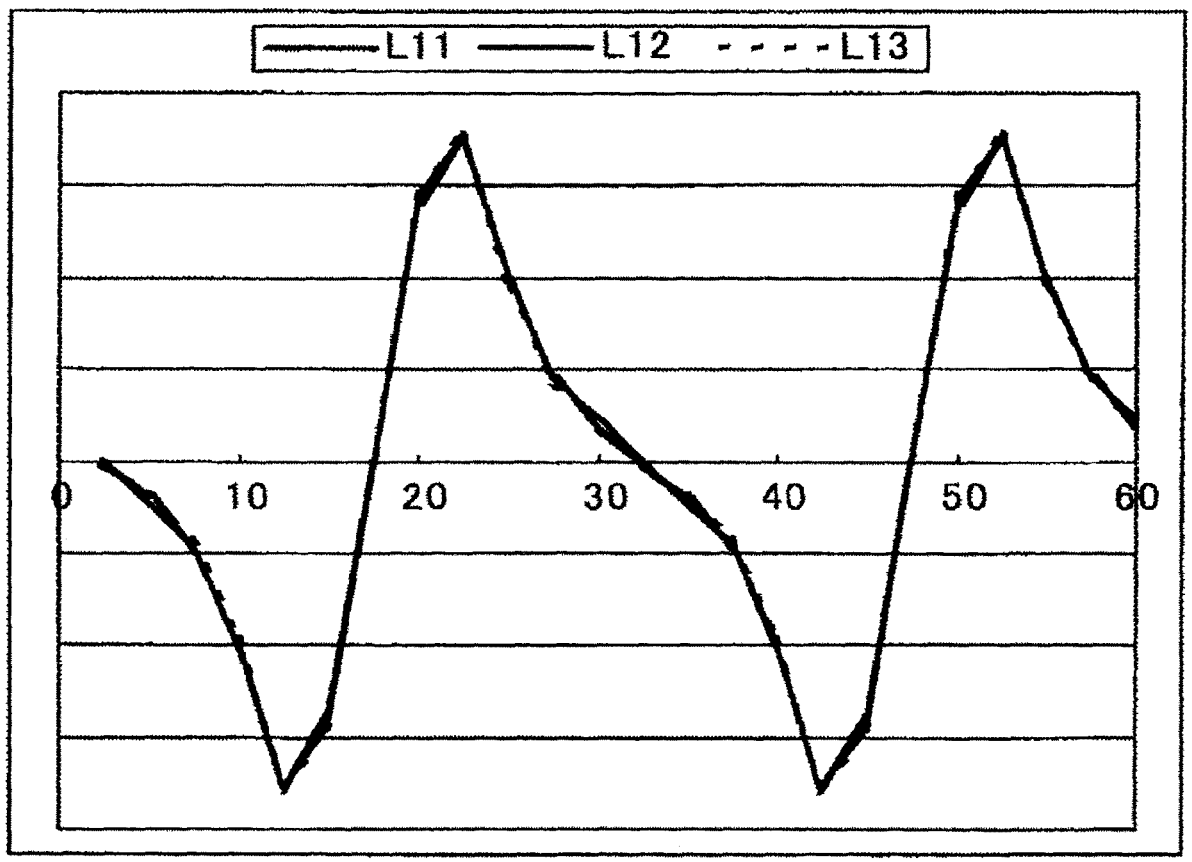
FIG. 9(a) shows the wave form of cogging torque when power is not applied.
Figure 9B:
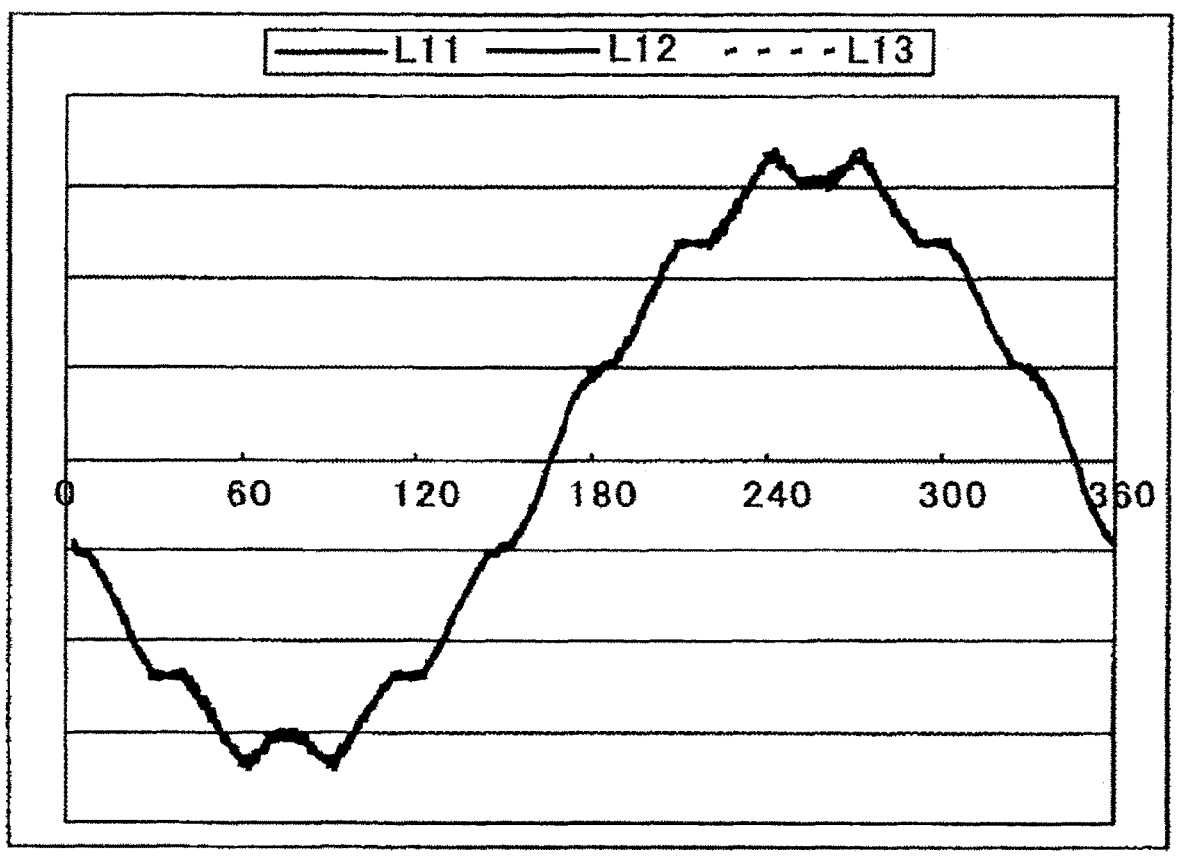
FIG. 9(b) shows the wave form of induced line voltage when power is not applied.

FIG. 9(a) shows the waveform of cogging torque. FIG. 9(b) shows a waveform of induced line voltage that occurs on the side of the stator when the rotor 250 rotates. The horizontal axis shows the rotation angle of the rotor in electric angle. Line L11 shows the case of the rotor shown in FIG. 8(a) in which the region 401 having the magnetic air gaps 258 and the region 402 having no magnetic air gap 258 are alternately arranged. Line 12 shows the rotating electric machine shown in FIG. 8(b) in which only the region 401 having the magnetic air gaps 258 is arranged. Line 13 shows the case of the rotating electric machine shown in FIG. 8(c) in which only the region 402 having no magnetic air gap 258 is arranged. The result shown in FIG. 9(a) indicates that presence or absence of the magnetic air gaps 258 gives substantially no influence on the cogging torque.

The induced voltage is a voltage generated when the magnetic flux of the rotating rotor 250 forms flux linkage with the stator coil 238. As shown in FIG. 9(b), it is understood that the induced voltage waveform is not influenced by the presence or absence of the magnetic air gaps 258. The induced voltage indicates reflection of the magnetic flux of a magnet in the result of simulations shown in FIGS. 8(a), 8(b), and 8(c). That the induced voltage is not changed means that the magnetic air gaps 258 give substantially no influence on the magnetic flux of the magnet.

Figure 10A:
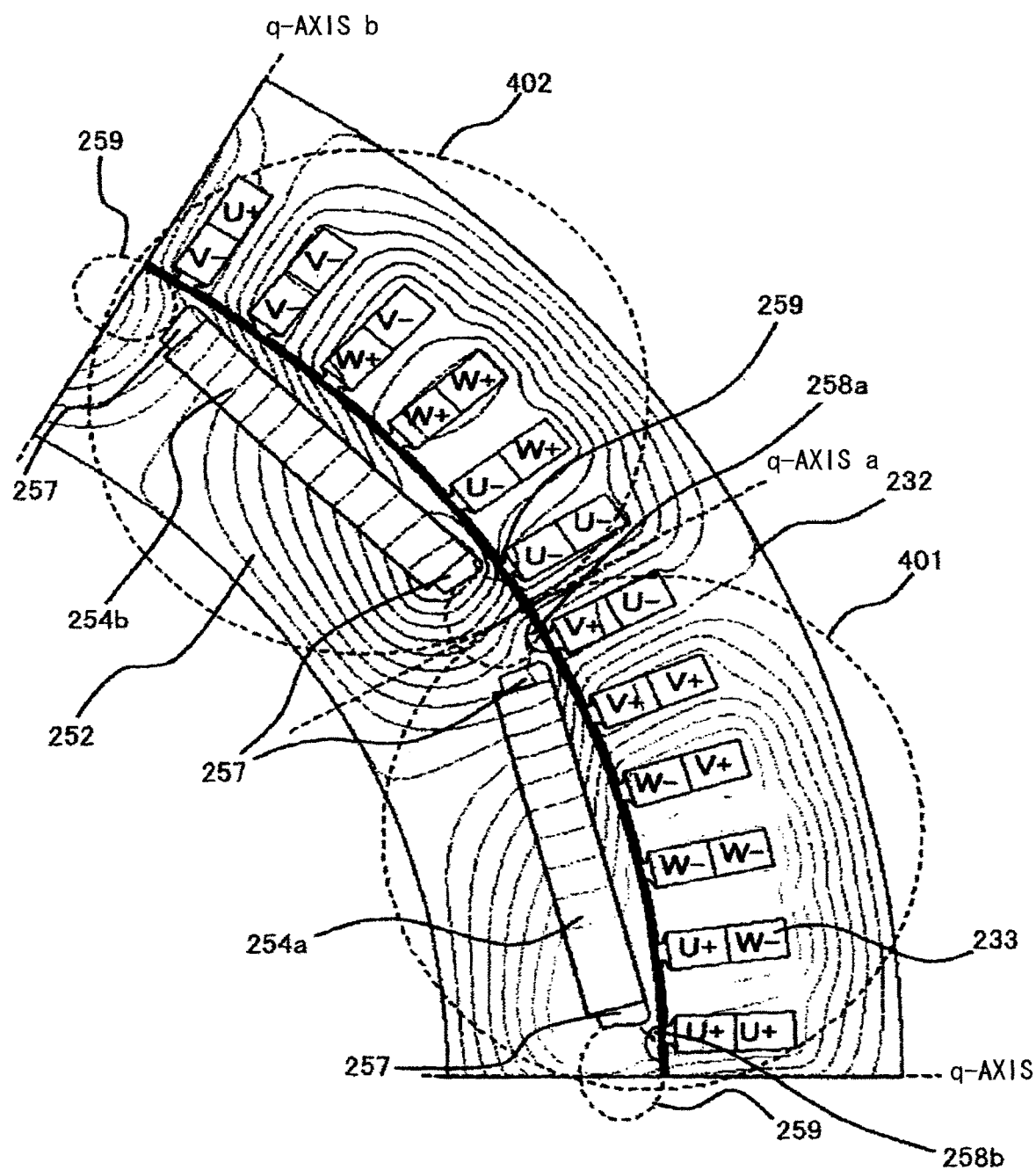
FIG. 10(a) shows distribution of magnetic fluxes on the A-A cross-section when power is applied.
Figure 10B:
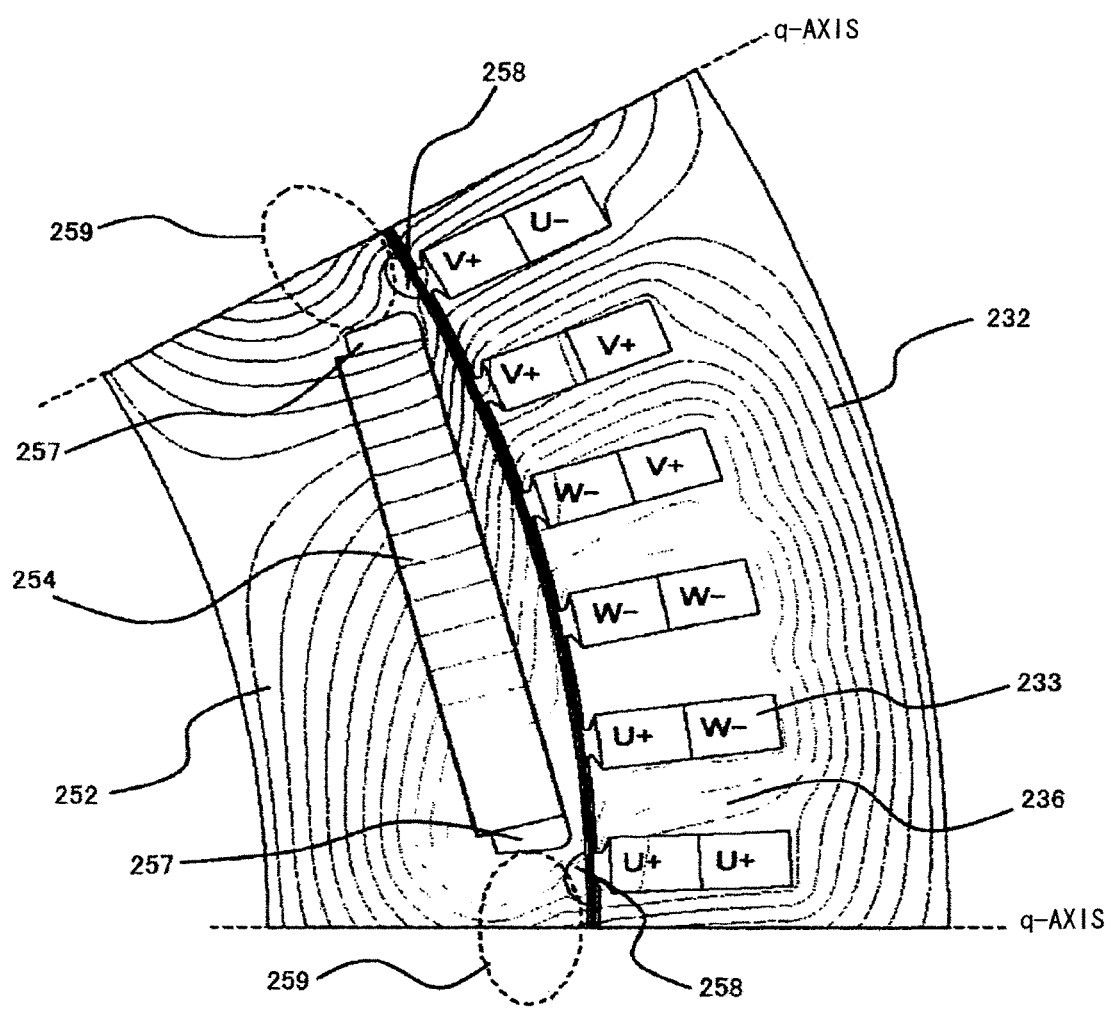
FIG. 10(b) shows distribution of magnetic fluxes of the rotating electric machine only in the region 401.
Figure 10C:
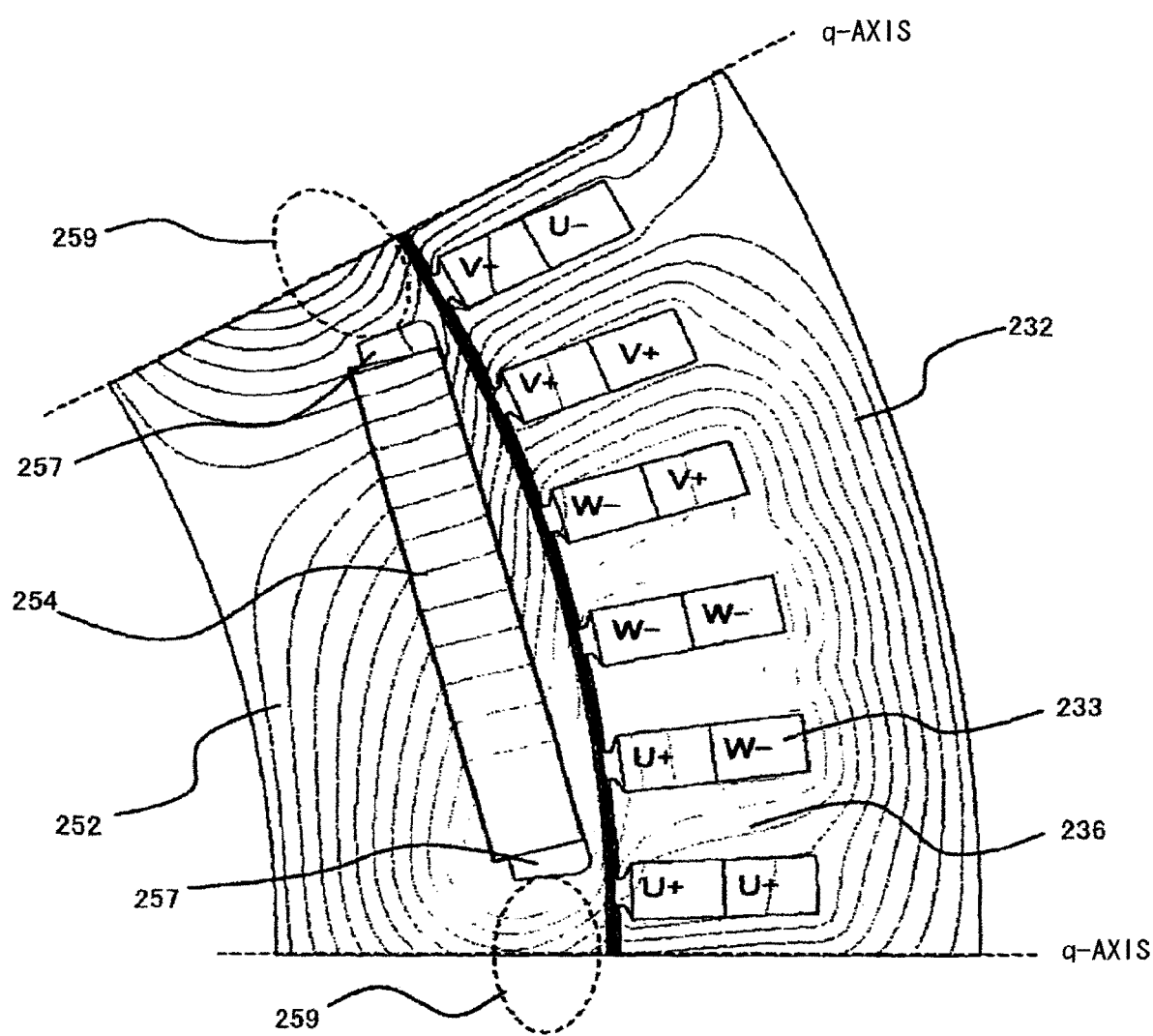
FIG. 10(c) shows distribution of magnetic fluxes of the rotating electric machine only in the region 402.

Now, influences of the magnetic air gap 258 when power is applied are explained. FIGS. 10(a), 10(b), and 10(c) each show the result of simulation of magnetic flux distribution when power is applied to the stator coil 238. FIG. 10(a) shows the result of simulation on the rotating electric machine similar to one shown in FIG. 8(a). FIG. 10(b) shows the result of simulation on the rotating electric machine similar to one shown in FIG. 8(b). FIG. 10(c) shows the result of simulation on the rotating electric machine similar to one shown in FIG. 8(c). The rotating electric machine according to the present embodiment is a motor including 6 slots per pole. A coil 233 of the stator coil 238 provided in the slot 24 of the stator coil 232 is branched into two layers in the direction of the depth of the slot. The coil 233 arranged on the bottom side of the slot is a short pitch winding that is inserted into the rotor side of the slot 24 skipping over six slots consisting of first to fifth slots assuming that the next slot is taken as first slot. The sort pitch winding is featured in that it can reduce harmonics in the magnetomotive force of the stator, shorten the coil end, and reduce copper loss. The winding for reducing harmonics can minimize sixth-order torque fluctuations specific to three-phase motors and substantially only nearly twelfth components remain.

Referring to FIGS. 10(a), 10(b) and 10(c), the magnetic flux flows along the q-axis in any of the simulation results. This is because the current in the stator 230 forms a magnetic flux in the q-axis. Comparing FIGS. 10(a) and 10(b) with FIG. 10(c) in which no magnetic air gap 258 is present, it can be seen that in FIGS. 10(a) and 10(b), the magnetic air gap 258 changes the flow of magnetic flux of the assisted salient pole member 259. Therefore, the magnetic air gap 258 that is present in the assisted salient pole member 259 gives magnetic influences only when power is applied.

Figure 11A:
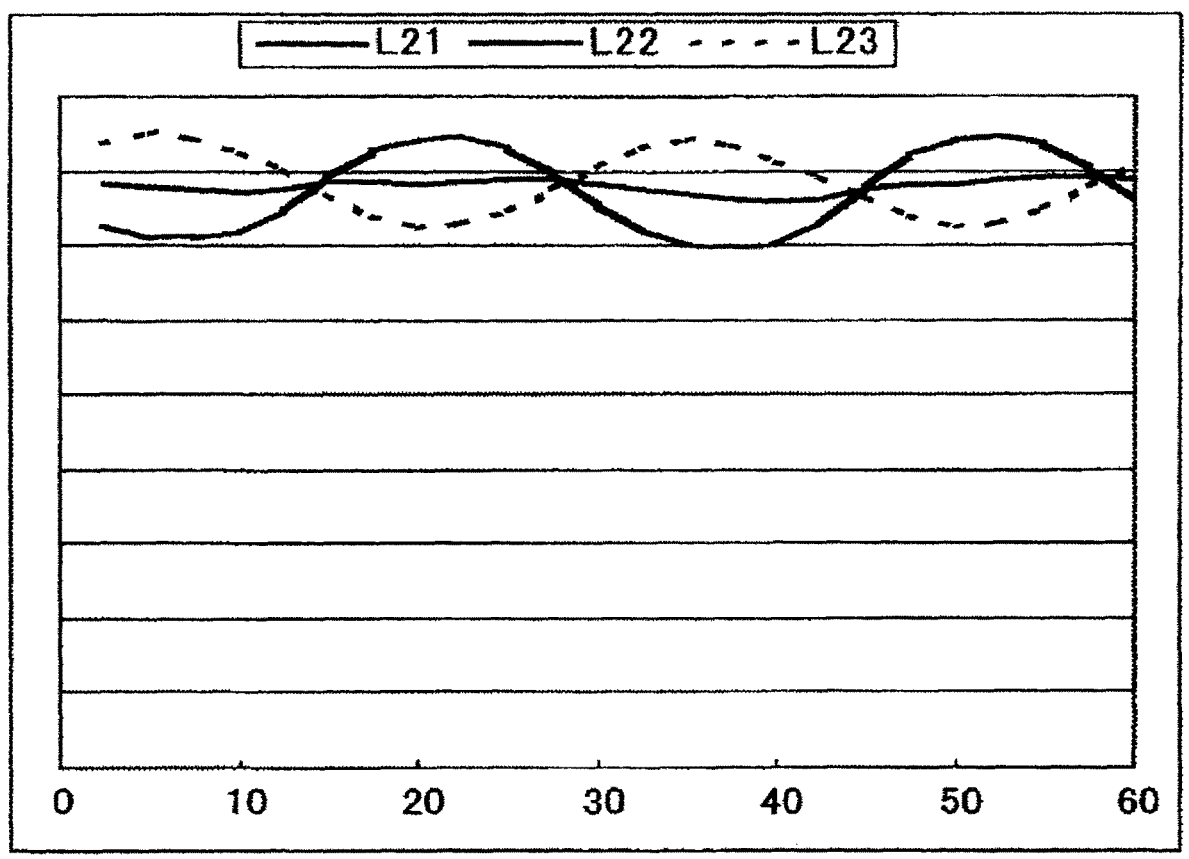
FIG. 11(a) shows the wave form of torque fluctuations when power is applied.
Figure 11B:
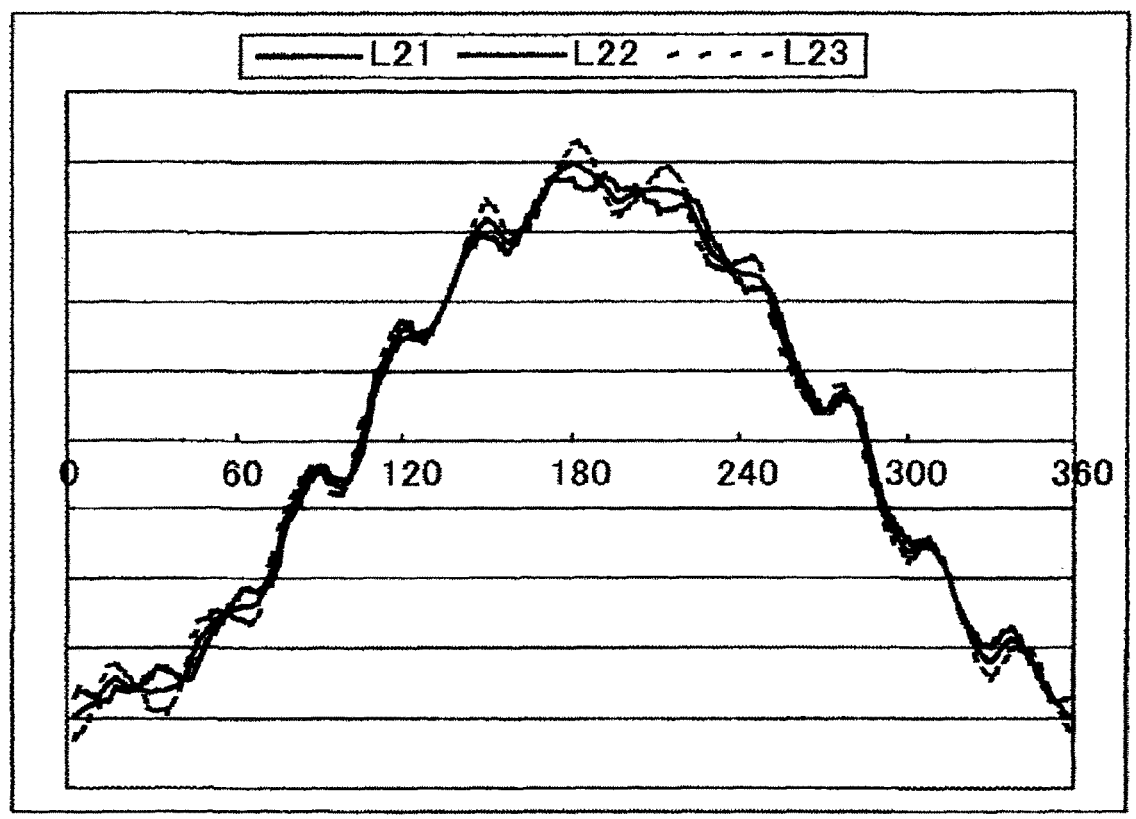
FIG. 11(b) shows the wave form of line voltage when power is applied.

FIG. 11(a) shows the torque waveform when power is applied and FIG. 11(b) shows the waveform of line voltage when power is applied. The horizontal axis indicates the rotation angle of the rotor in electric angle. Line L21 indicates the case of the rotor shown in FIG. 10(a) in which the region 401 having the magnetic air gaps 258 and the region 402 having no magnetic air gap 258 are alternately arranged. Line 22 shows the rotating electric machine shown in FIG. 10(b) in which only the region 401 having the magnetic air gaps 258 is arranged. Line 23 shows the case of the rotating electric machine shown in FIG. 10(c) in which only the region 402 having no magnetic air gap 258 is arranged.

FIG. 11(a) indicates that in the rotating electric machine according to the present embodiment, twelfth-order torque fluctuation component, i.e., component of 30 degrees period in electric angle is dominant but sixth-order component is almost null. Both L21 and L22 have changed waveforms of torque fluctuations as compared with the torque fluctuations L23 in the case where the magnetic air gap 258 is not formed, that is only the region 402 is present. This indicates that the magnetic flux when power is applied is influenced by the magnetic air gap 258. Further, the torque fluctuations L22 of the rotating electric machine including only the region 401 and the torque fluctuations L23 of the rotating electric machine including only the region 402 are approximately opposite in phase to each other. As shown in FIG. 10(a), the rotating electric machine according to the present embodiment has a construction in which the region 401 and the region 402 are alternately arranged and as indicated by the torque fluctuations L21, sum of the torque fluctuations that is received by the rotor in whole is a mean value of the torque fluctuations L22 and the torque fluctuations L23.

As mentioned above, in the present embodiment, provision of the magnetic air gaps 258a and 258b enables reduction of torque fluctuations when power is applied. To obtain such an effect, it is preferred that the width angles (angles in the circumferential direction) of the grooves that constitute the magnetic air gaps 258 are set to be within the range of ¼ to ½ of the pitch angle of the teeth 236. Two or more types of the magnetic air gaps 258 may be used to form the assisted salient pole member 259. Thereby, it is becomes more freely to reduce torque fluctuations so that reduction of fluctuations can be performed more precisely.

A further feature is that as the torque is not decreased more than the case where no magnetic air gap is provided. In the case of the structure called "skew" conventionally adopted to reduce torque fluctuations, skewing results in a decrease in torque, which prevents size reduction. However, the present embodiment is featured that not only it is possible to reduce the torque fluctuations when power is applied independently of the cogging torque but also the torque itself is not decreased. This is because the torque fluctuations in the case of the original groove-less rotor dominantly include the twelfth-order component. It is effective that the stator coil is made of a short pitch winding.

Figure 4B:
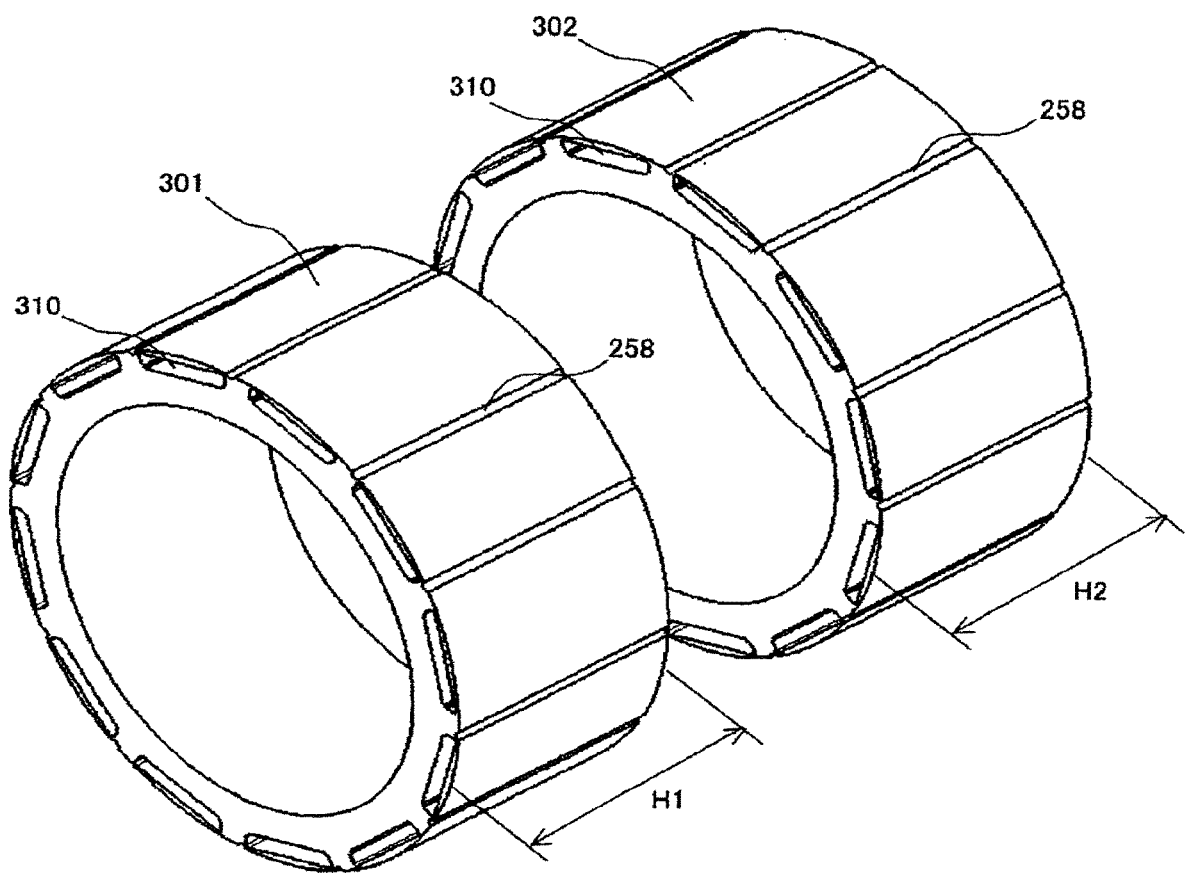
FIG. 4(b) presents an exploded perspective view of the rotor core 252 shown in FIG. 3.

Also, it can be seen that the voltage when power is applied is influenced by presence or absence of the magnetic air gap 258 as shown in FIG. 11(b). In this case, there occurs a potential difference between the winding of each phase of the stator coil 238 facing the rotor 250 in the region 401 and the winding of each phase of the stator coil 238 facing the rotor 250 in the region 402, so that when the windings separately for each phase are connected in parallel, circulation current flows to increase loss. As shown in FIG. 6, the rotating electric machine according to the present embodiment has the core 302 formed by rotating the core 301 by one pitch of magnetic pole and the axial lengths of the cores 301 and 302 are set to substantially the same as shown in FIG. 4(b). As a result, the voltage that occurs in the winding of each phase of the stator coil 238 facing each pole can be made substantially the same, so that substantially no circulation current flows. However, when windings of respective phases of the stator coil 238 facing the rotor 250 in the regions 401 and 402 are connected to each other in series, substantially no circulation current flows, so that a construction with only the core 301 or 302 may also be adopted.

As mentioned above, if the magnetic air gaps 258a and 258b are formed, this does not give any influence on the cogging torque when power is applied. Therefore, the cogging torque can be reduced separately from the reduction of the torque fluctuations when power is applied, by applying a method of reducing the cogging torque as conventionally used. In the present embodiment, reduction of cogging torque is achieved by adopting the following construction.

Figure 12:
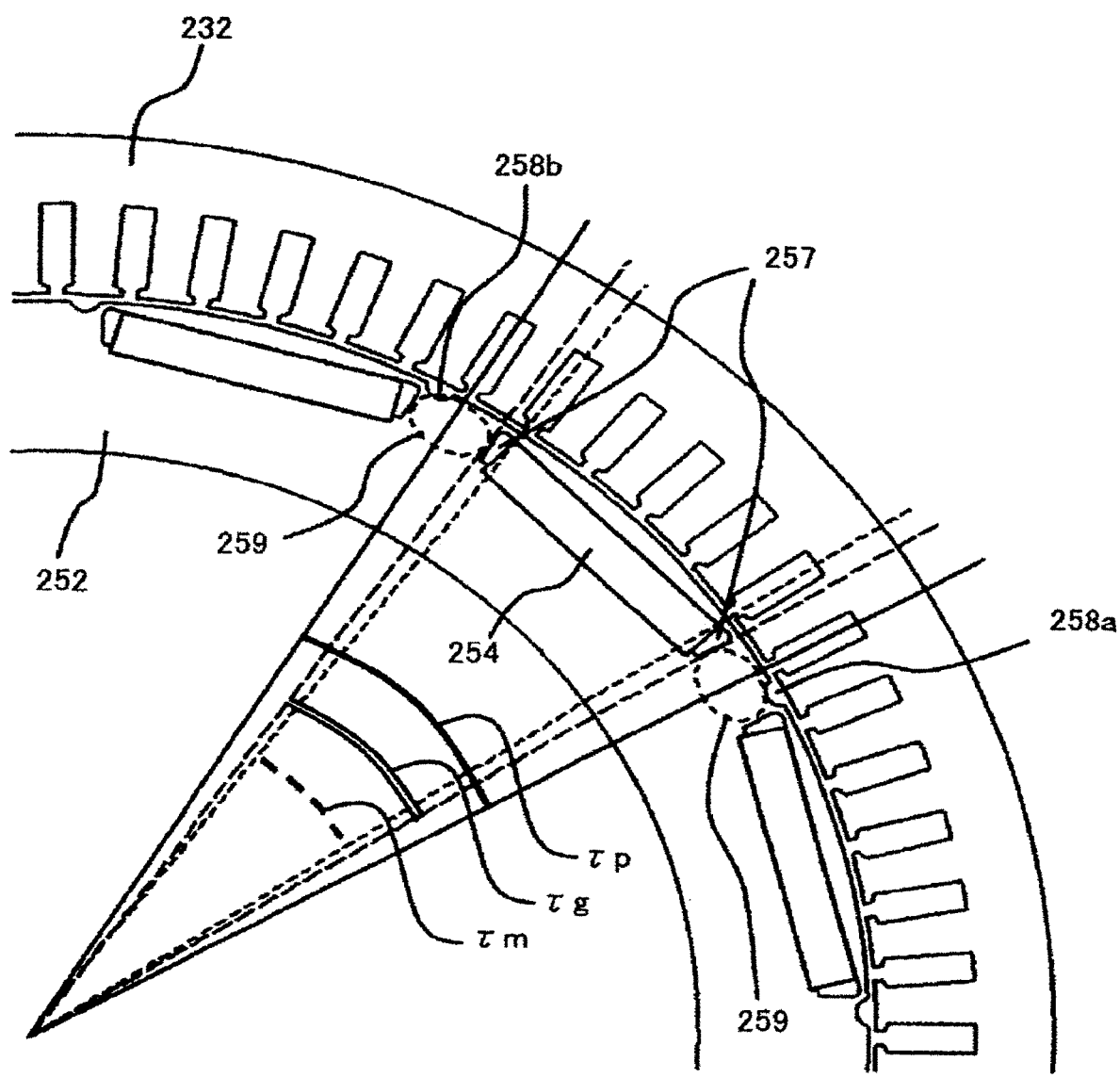
FIG. 12 presents a cross-sectional view illustrating a reduction in cogging torque, showing a part of each of the stator core 232 and the rotor 250.
Figure 13:
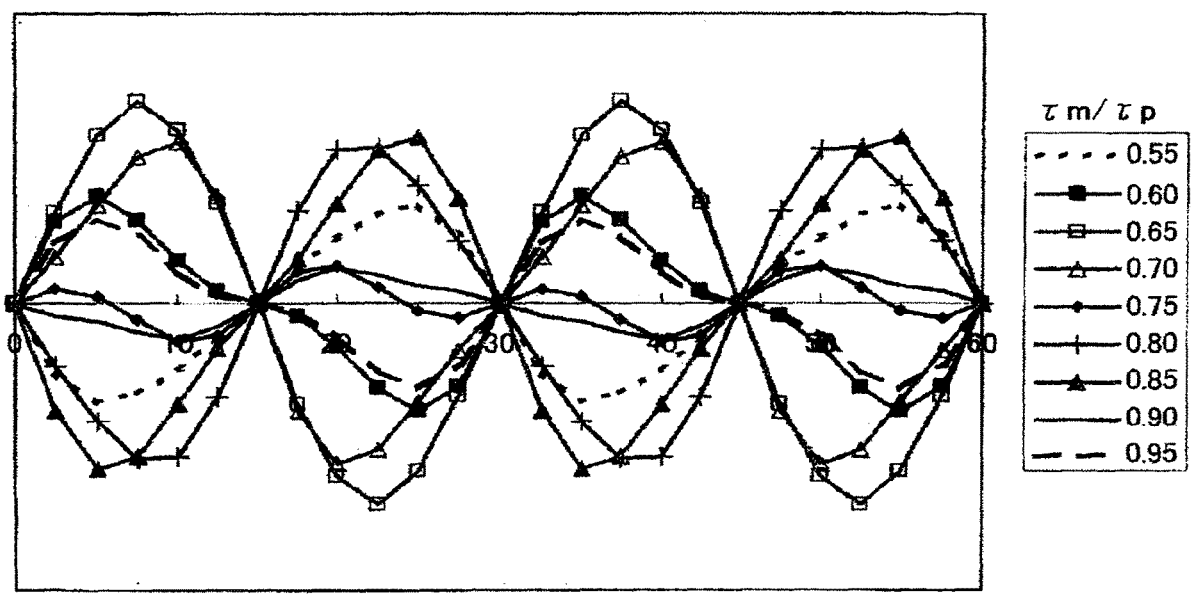
FIG. 13 presents a diagram showing relationship between the ratio of magnetic pole radian $\tau m/\tau p$ and cogging torque.

FIGS. 12 and 13 present diagrams illustrating the method of reducing cogging torques. FIG. 12 presents a cross-sectional view showing the rotor 250 and a part of the stator core 232. In FIG. 12, $\tau p$ indicates pole pitch of the permanent magnet 254 and $\tau m$ indicates width angle of the permanent magnet 254. On the other hand, $\tau g$ indicates an angle for the permanent magnet 254 and the magnetic air gaps 257 on both sides thereof, i.e., a width angle of the hole 310 shown in FIG. 4. By adjusting ratios of these angles $\tau m/\tau p$ and $\tau g/\tau p$, cogging torques can be reduced. In the present embodiment, $\tau m/\tau p$ is called magnet pole radian and $\tau g/\tau p$ is called magnet hole pole radian.

FIG. 13 presents a diagram showing relationship between the ratio of $\tau m/\tau p$ and cogging torque. The result shown in FIG. 13 relates to the case where $\tau m=\tau g$ and the permanent magnet 254 and the magnetic air gap 257 are in the form of arc concentric to the outer periphery of the rotor 250. In the case where rectangular magnets are used as in the present embodiment, optimum values are somewhat varied. However, needless to say, the same idea is used. In FIG. 13, the horizontal axis indicates amplitude of cogging torque and the horizontal axis indicates rotation angle of the rotor 250 in electric angle. The magnitude of amplitude of fluctuations varies depending on the magnitude of the ratio $\tau m/\tau p$. When $\tau m=\tau g$, selecting $\tau m/\tau p$ at about 0.75, the cogging torque can be reduced. The tendency that the cogging torque is not changed by the magnetic air gaps 258 shown in FIG. 9(a) makes it possible to apply ratio of the width of magnet to the pitch of pole $\tau m/\tau p$, to any where similarly. As a result, by designing the shape of the rotor 250 to be one shown in FIG. 5 under the above-mentioned conditions, both the cogging torque and the torque fluctuations when power is applied can be reduced.

In the example shown in FIG. 13, explanation has been made assuming $\tau m=\tau g$. However, to efficiently utilize the reluctance torque which is an effect of the assisted salient pole member 259, the magnet hole pole radian $\tau g/\tau p$ may advantageously be set to about 0.5 to about 0.9, preferably about 0.7 to about 0.8.

Figure 14:
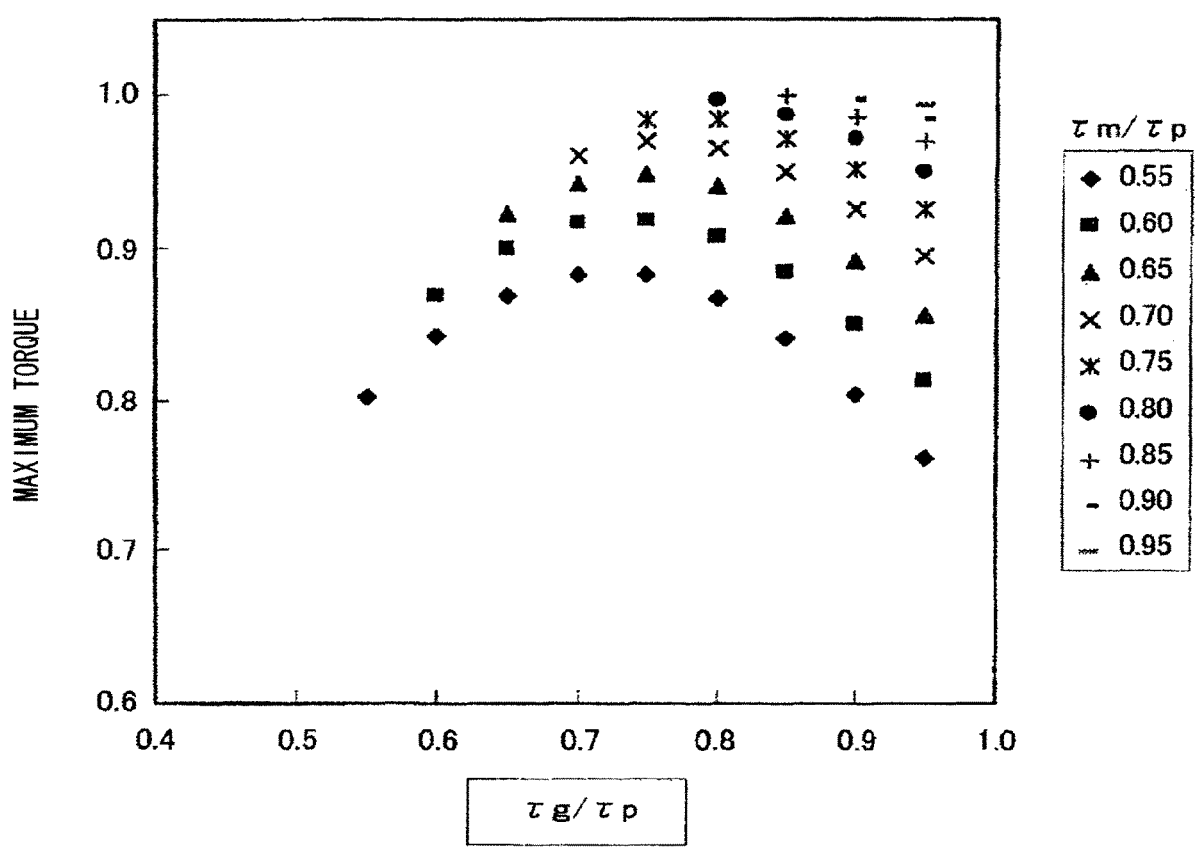
FIG. 14 presents a diagram showing maximum torque when magnetic pole radian ratios $\tau m/\tau p$ and $\tau g/\tau p$ are changed.

FIG. 14 is an example of calculation of maximum torque when the magnet pole radian $\tau m/\tau p$ and the magnet hole pole radian $\tau g/\tau p$ are varied. Similarly to FIG. 13, the permanent magnet 254 and the magnetic air gap 257 are in the form of a sector concentric to the outer periphery of the rotor 250. The horizontal axis indicates the magnet hole pole radian $\tau g/\tau p$. That this value is 0.7 indicates that the ratio of the assisted salient pole member 259 to the interpolar pitch is 0.3. Here, the magnet width $\tau m$ cannot be made larger than the opening angle $\tau m$ of the magnet hole, and hence, there is obtained: $\tau g \tau m$. An increase in $\tau m$ results in an increase in width of the permanent magnet 254, so that torque increases accordingly. On the other hand, when $\tau m$ is constant, $\tau g$ has an optimal value; when $\tau g/\tau p$ is about 0.7 to about 0.8, the maximum torque is largest. This is because the size of the assisted salient pole member 259 has an appropriate value and if $\tau g$ is made too large or too small as compared with that value, reluctance torque becomes too small. When $\tau m$ is larger than 0.75, $\tau m=\tau g$ is desirable so that the assisted salient pole member 259 can be as large as possible.

As mentioned above, the reluctance torque can be most efficiently utilized when $\tau g/\tau p$ is set to about 0.7 to about 0.8 and the permanent magnet 254 can be made smaller. When a rare earth sintered magnet is used as the permanent magnet 254, it is required to use a most efficient amount of magnet since such a magnet is very expensive as compared with other materials. Since the permanent magnet 254 is reduced in size, the induced voltage by the magnetic flux of the permanent magnet 254 can be reduced, so that the rotating electric machine can be rotated at higher speeds. Therefore, the rotating electric machine that utilizes reluctance torque as in the present embodiment is generally used in electric vehicles.

Second Embodiment

Figure 15A:
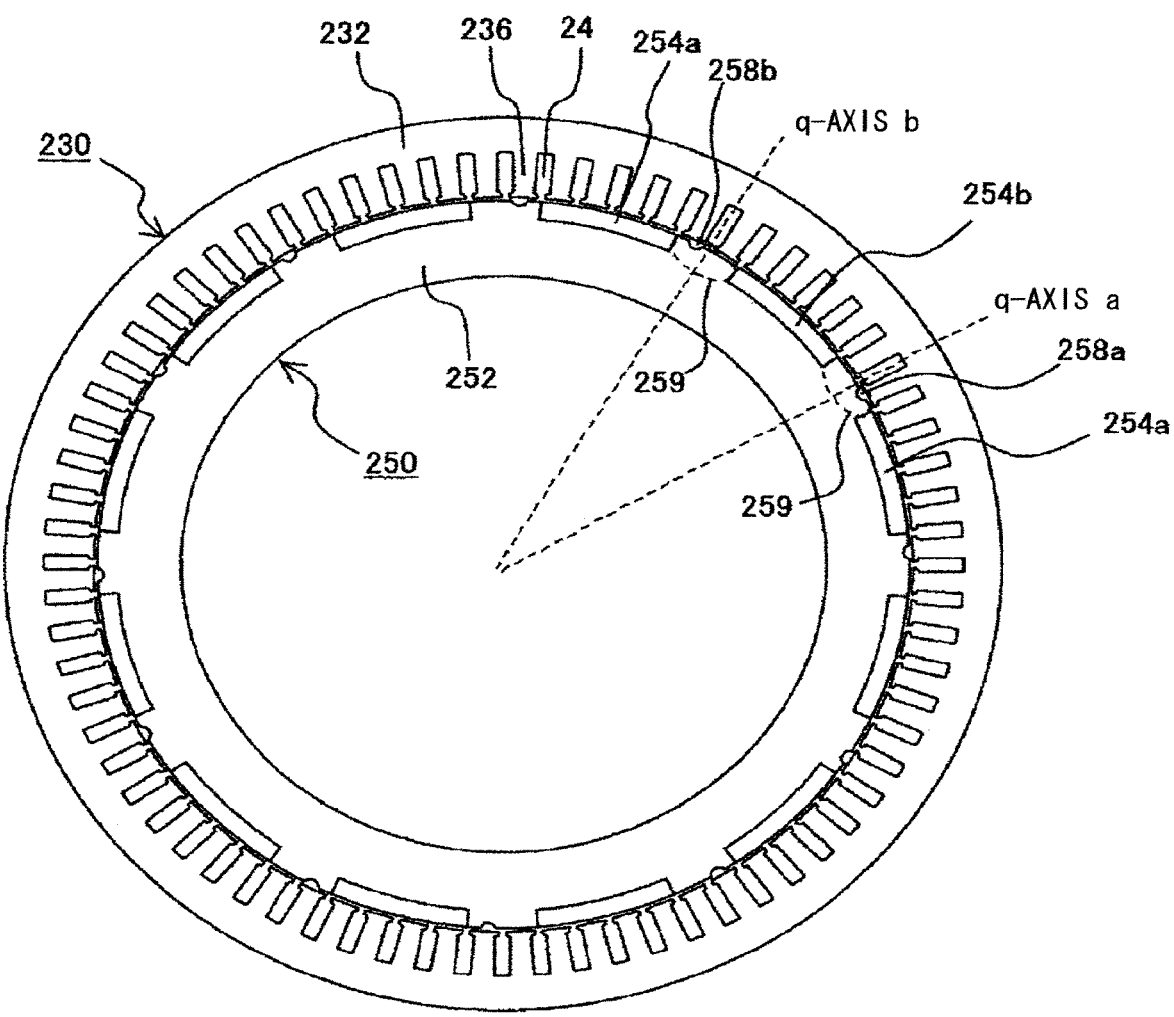
FIG. 15(a) shows cross-sections of the stator 230 and the rotor 250 of the surface-magnet type rotating electric machine according to another embodiment of the present invention.
Figure 15B:
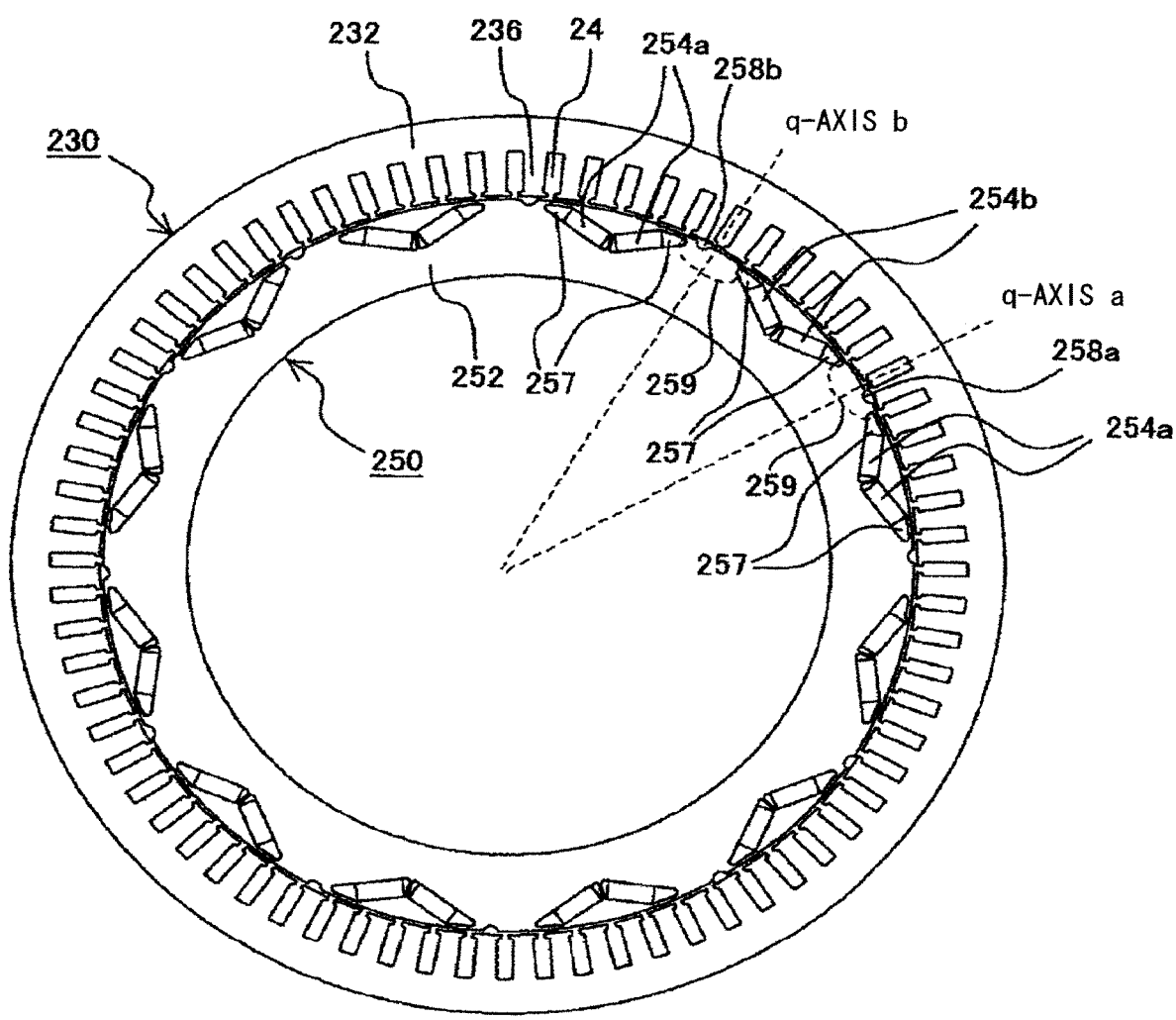
FIG. 15(b) shows cross-sections of the stator 230 and the rotor 250 of the type of rotating electric machine in which a plurality of magnets is arranged in a V-shape configuration according to another embodiment of the present invention.

FIGS. 15(a) and 15(b) show a rotor according to another embodiment of the present invention. The present embodiment is the same as the first embodiment excepting what is explained hereafter.

FIG. 15(a) shows a rotor of the surface magnet type and FIG. 15(b) shows a rotor in which a plurality of magnets is arranged in a V-shape. In either type of the rotor, the assisted salient pole member 259 is between any two adjacent permanent magnets 254 and the magnetic air gap 258 is arranged in the assisted salient pole member 259. Assuming that as seen from the inner periphery of the rotor 250, a central axis between the permanent magnet 254a and a next magnet on the left side of the permanent magnet 254a is named q-axis a and a central axis between the permanent magnet 254b and a next magnet on the left side of the permanent magnet 254b is named q-axis b, the magnetic air gap 258a is arranged offset to the right with respect to the q-axis a and the magnetic air gap 258b is arranged offset to the left with respect to the q-axis b. The magnetic air gap 258a and the magnetic air gap 258b are arranged symmetric with respect to a d-axis, which is a central axis of the magnetic pole. FIGS. 15(a) and 15(b) show A-A cross-sections of the rotor. Similarly to the above-mentioned embodiment, the B-B cross-section has a shape formed by rotating the shape of the A-A cross-section by one pitch of magnetic pole. As explained above referring to FIGS. 8(a), 8(b), and 8(c), the reduction of the torque fluctuations in the present embodiment is not affected by the magnetic flux of the magnet, so that it does not depend on the shape of the magnet.

Third Embodiment

Figure 16:
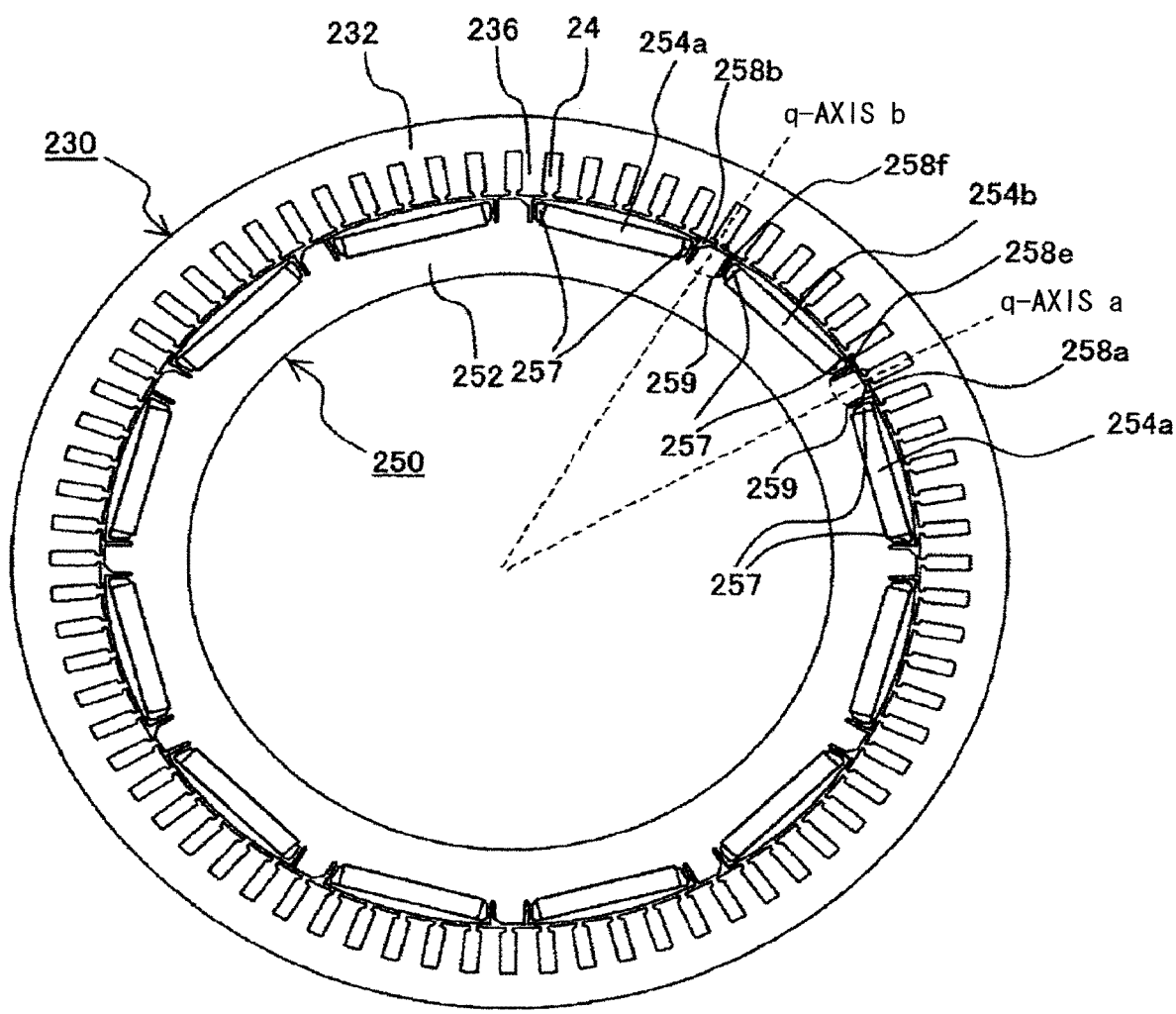
FIG. 16 shows cross-sections of the stator 230 and the rotor 250 according to another embodiment of the present invention.

FIG. 16 illustrates achievement of reduction of torque fluctuations by providing two magnetic air gaps 258 for each assisted salient pole member 259 according to the present embodiment.

This shape is as follows. Assuming that as seen from the inner periphery of the rotor 250, a central axis between the permanent magnet 254a and a next magnet on the left side of the permanent magnet 254a is named q-axis a and a central axis between the permanent magnet 254b and a next magnet on the left side of the permanent magnet 254b is named q-axis b, the magnetic air gap 258a on the right side with respect to the q-axis a is larger and the magnetic air gap 258e on the left side with respect to the q-axis b is smaller. The magnetic air gap 258b on the right side with respect to the q-axis b is larger and the magnetic air gap 258f on the left side with respect to the q-axis b is smaller. The magnetic air gaps 258a and 258b and the magnetic air gaps 258e and 258f are arranged symmetric with respect to a d-axis, which is a central axis of the magnetic pole. FIG. 16 shows an A-A cross-section of the rotor. Similarly to the above-mentioned embodiment, the B-B cross-section has a shape formed by rotating the shape of the A-A cross-section by one pitch of magnetic pole. Other details than the above-mentioned are the same as the first embodiment.

Fourth Embodiment

Figure 17A:
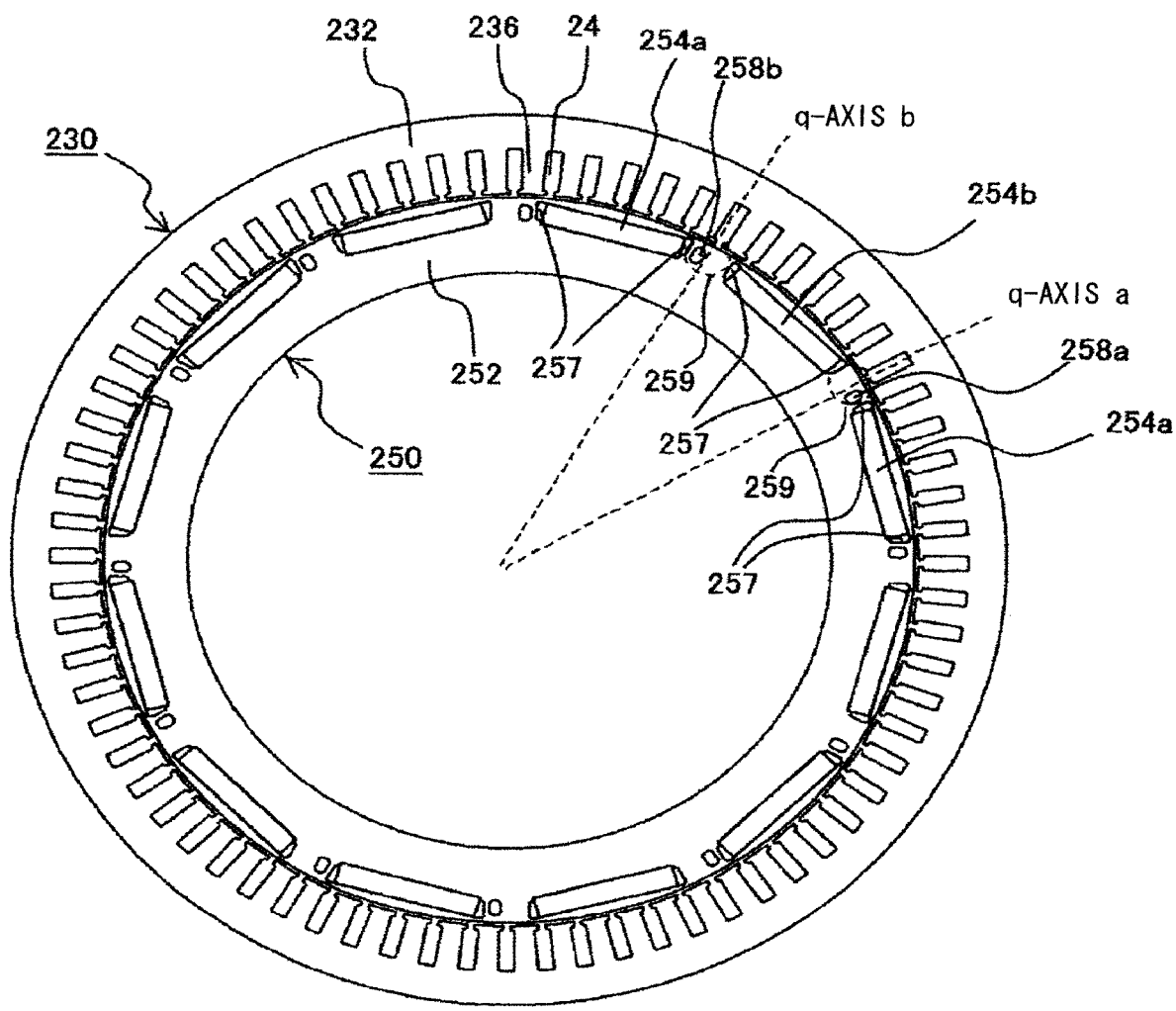
FIG. 17(a) shows cross-sections of the stator 230 and the rotor 250 according to another embodiment.
Figure 17B:
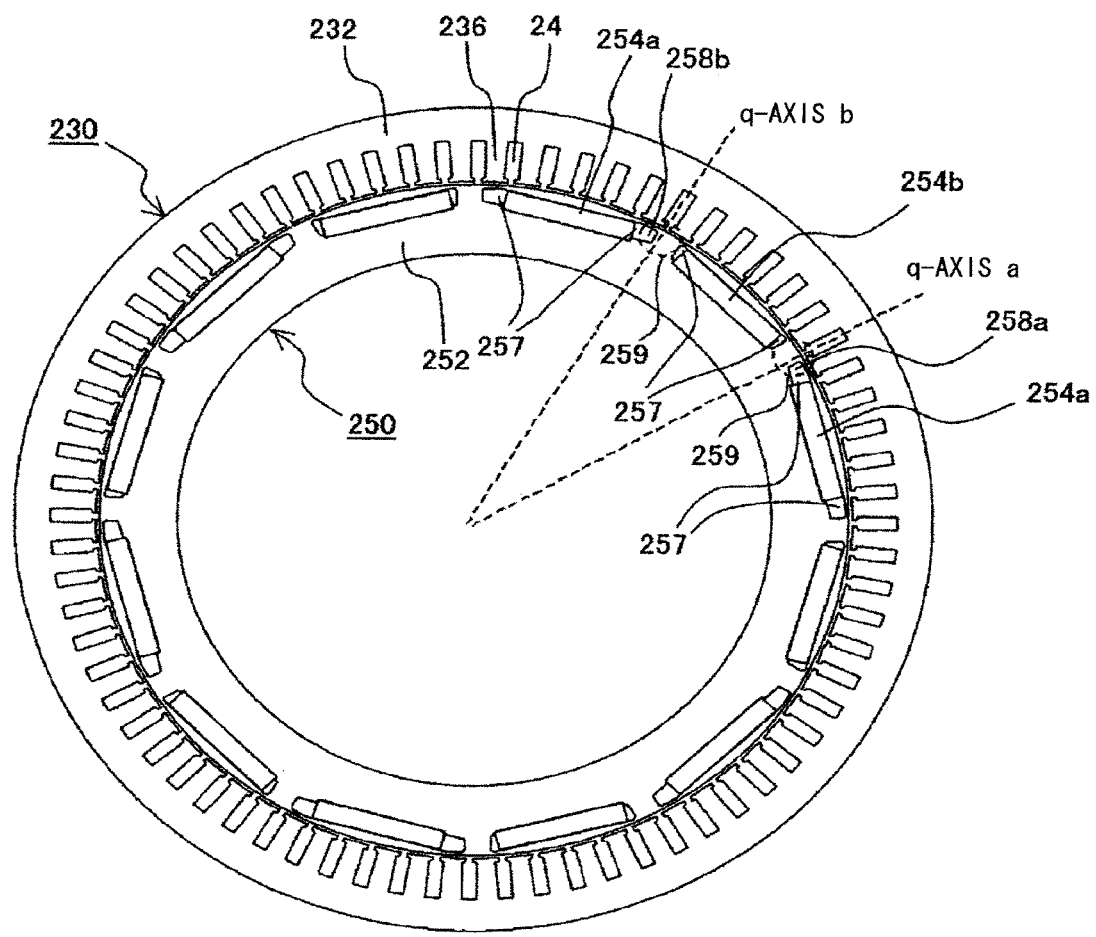
FIG. 17(b) shows cross-sections of the stator 230 and the rotor 250 according to another embodiment.
Figure 17C:
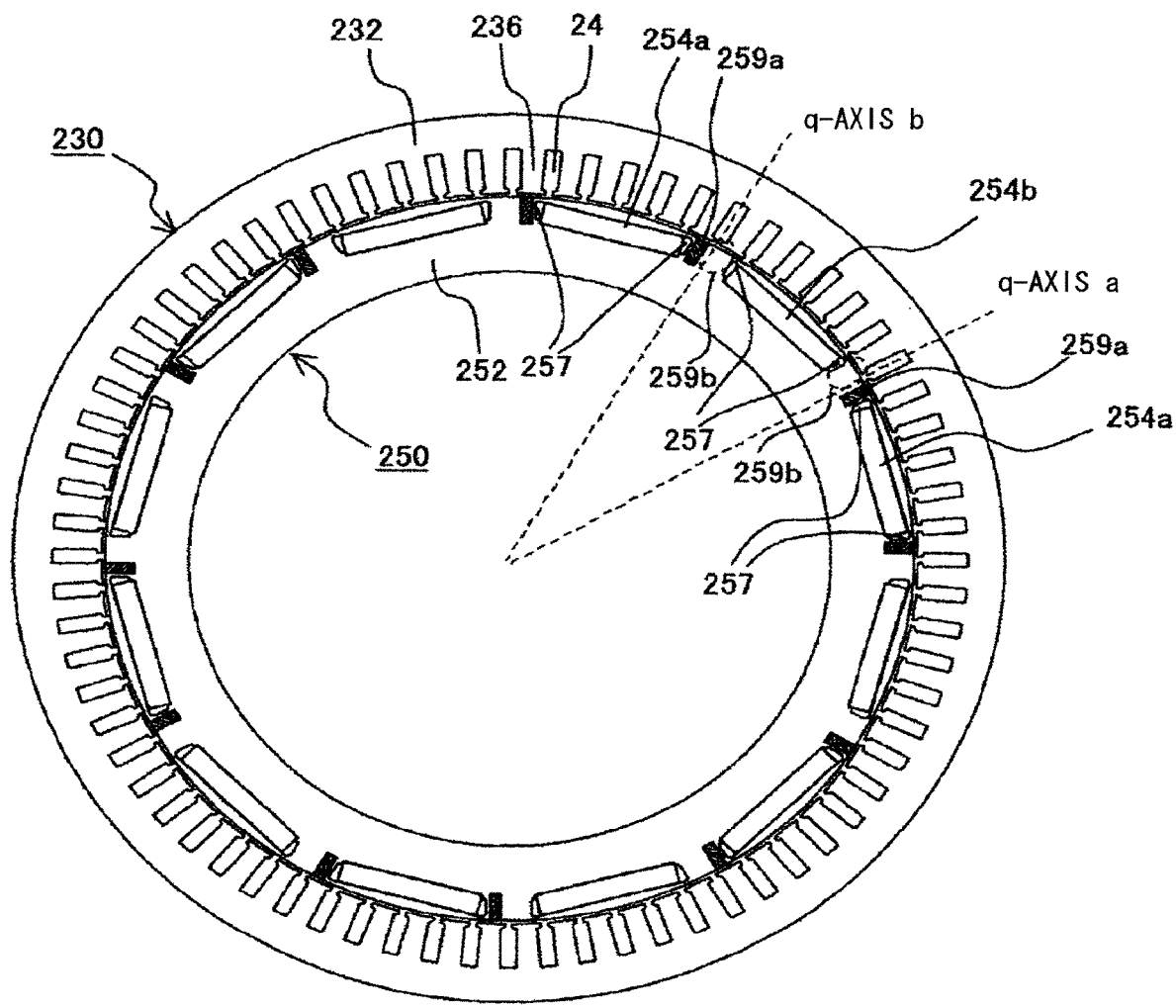
FIG. 17(c) shows cross-sections of the stator 230 and the rotor 250 according to another embodiment.

In the examples shown in FIGS. 5(a), 5(b), 15(a), 15(b), and 16, the magnetic air gap 258 is constituted by a groove provided in an outer periphery of the rotor 250. However, the magnetic air gap 258 may be constituted by a hole in the assisted salient pole member 259 as shown in FIG. 17(a). The magnetic air gap 257 and the magnetic air gap 258 may be integrated as shown in FIG. 17(b). The magnetic air gap 258 may be achieved by providing the assisted salient pole member 259 with a region that has a different permeability than the rest as shown in FIG. 17(c). In FIG. 17(c), the permeability of the assisted salient pole member 259a is set to be lower than that of the assisted salient pole member 259b. Other details than the above-mentioned are the same as the first embodiment.

Fifth Embodiment

Figure 18:
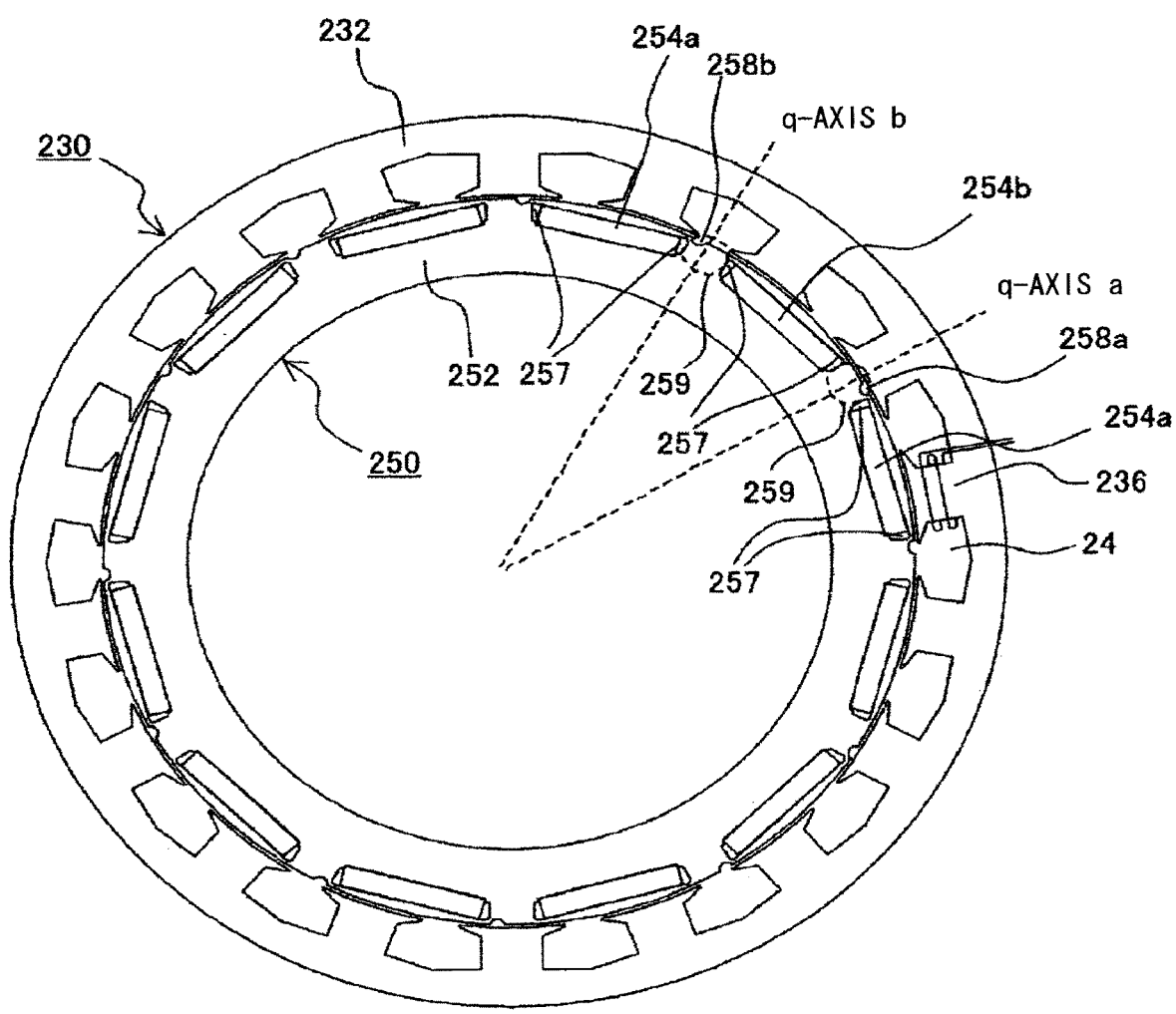
FIG. 18 presents cross-sectional view of the stator 230 and the rotor 250 according to another embodiment in a rotating electric machine with concentrated winding.

FIG. 18 illustrates the case where the stator coil 238 shown in FIGS. 5(a) and 5(b) is made of the concentrated winding type. The torque fluctuations in the present embodiment depends on the shape of the rotor 250 and hence the torque fluctuations can be reduced in the case of the concentrated winding type, which is a different winding method on the stator side, similarly to what is described above. Other details than the above-mentioned are the same as the first embodiment.

Sixth Embodiment

Figure 19A:
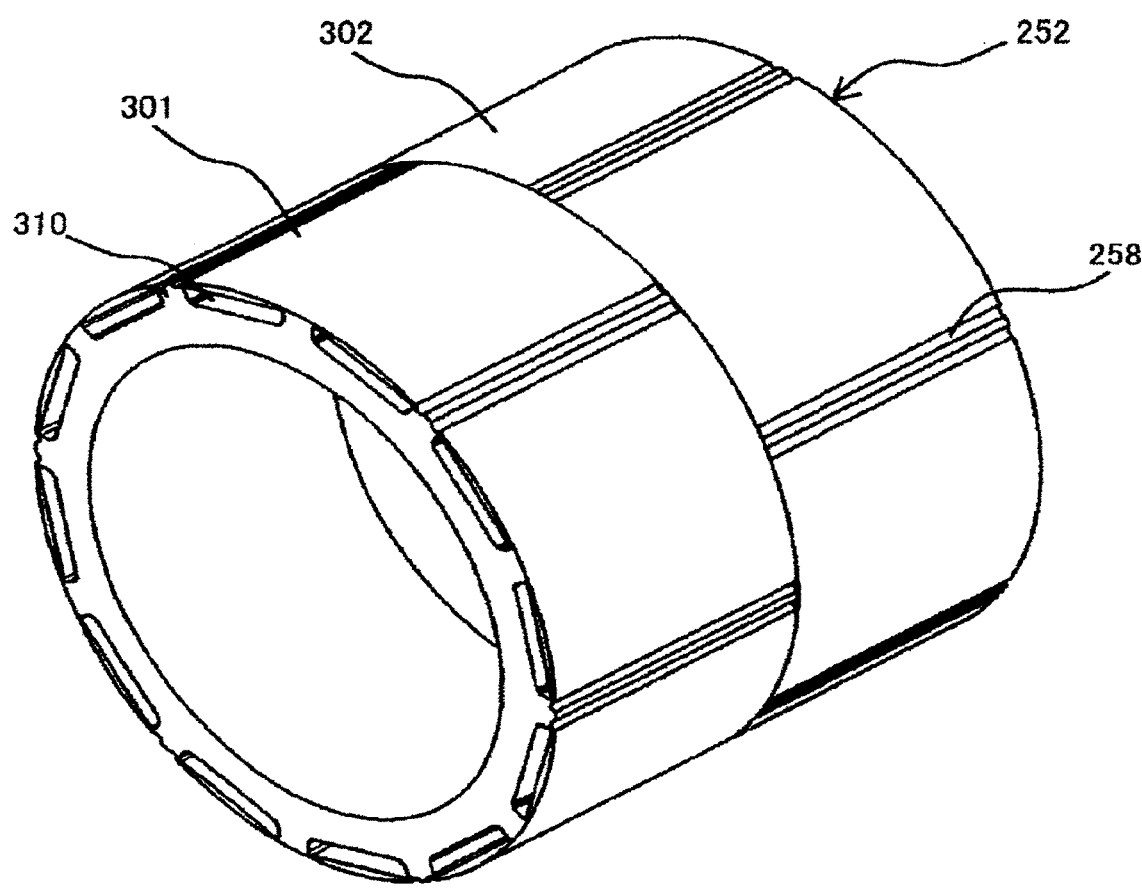
FIG. 19(a) presents a perspective view of the rotor core 252 according to another embodiment of the present invention.

FIG. 19(a) presents a perspective view showing the rotor core 252 of the rotor 250 according to another embodiment of the present invention. Other details than the above-mentioned are the same as the first embodiment.

Figure 19B:
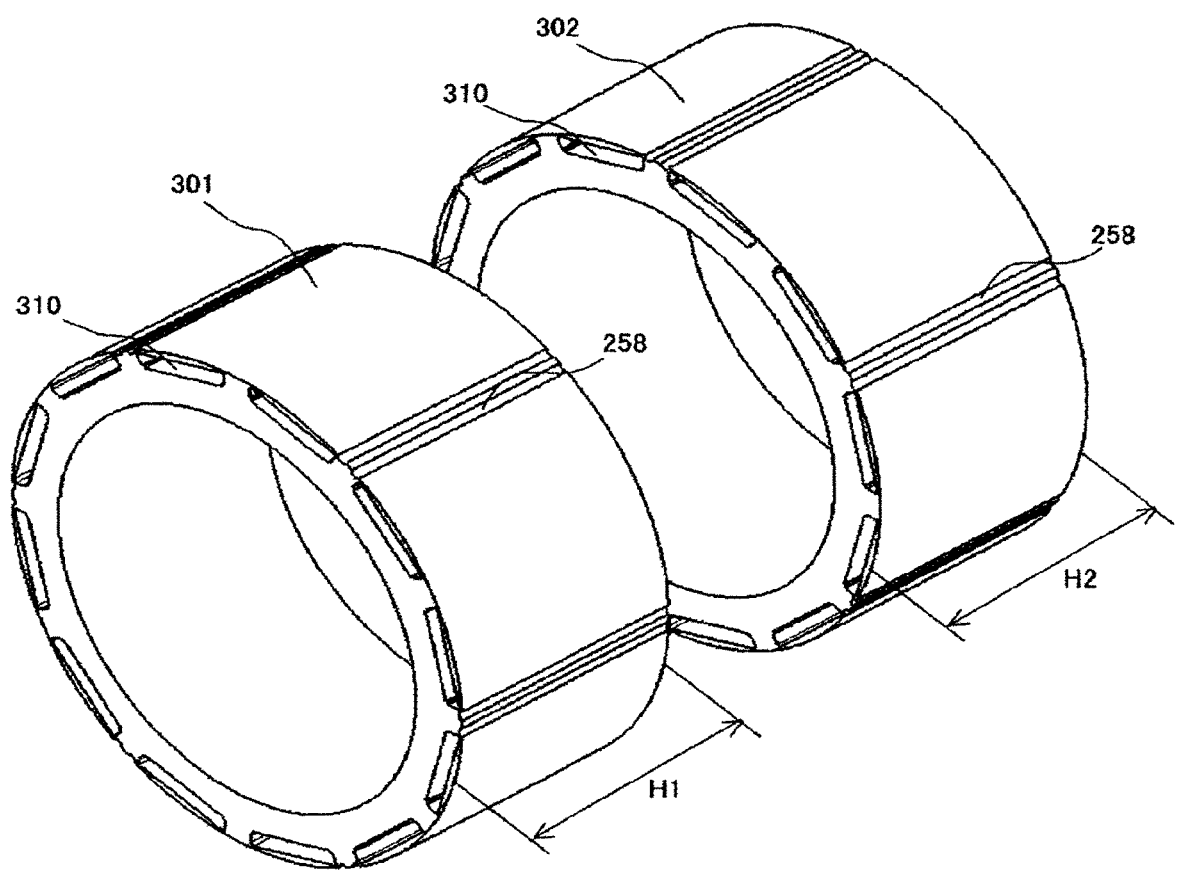
FIG. 19(b) presents an exploded perspective view of the rotor core 252 according to another embodiment of the present invention.
Figure 20A:
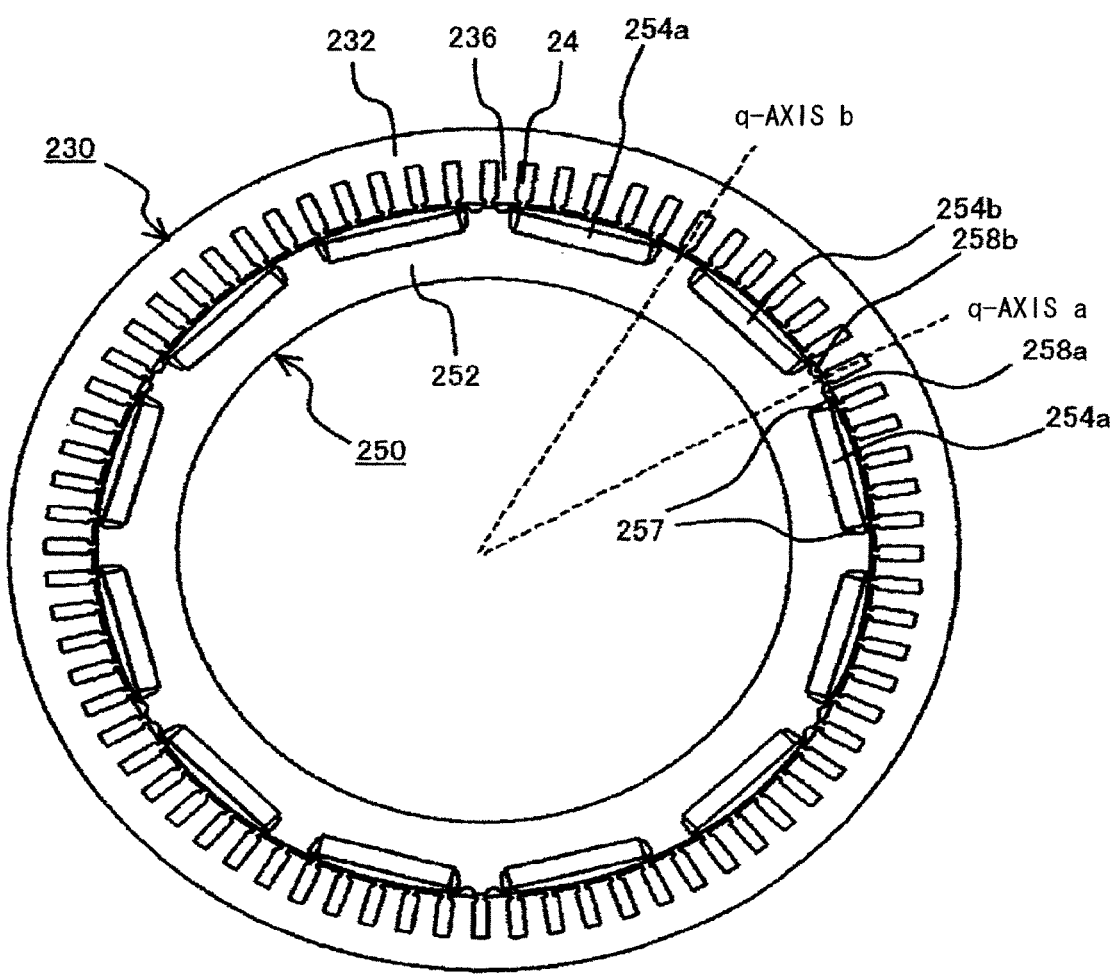
FIG. 20(a) presents cross-sectional view of the stator 230 and rotor 250 along A-A line that passes a part of the core 301.
Figure 20B:
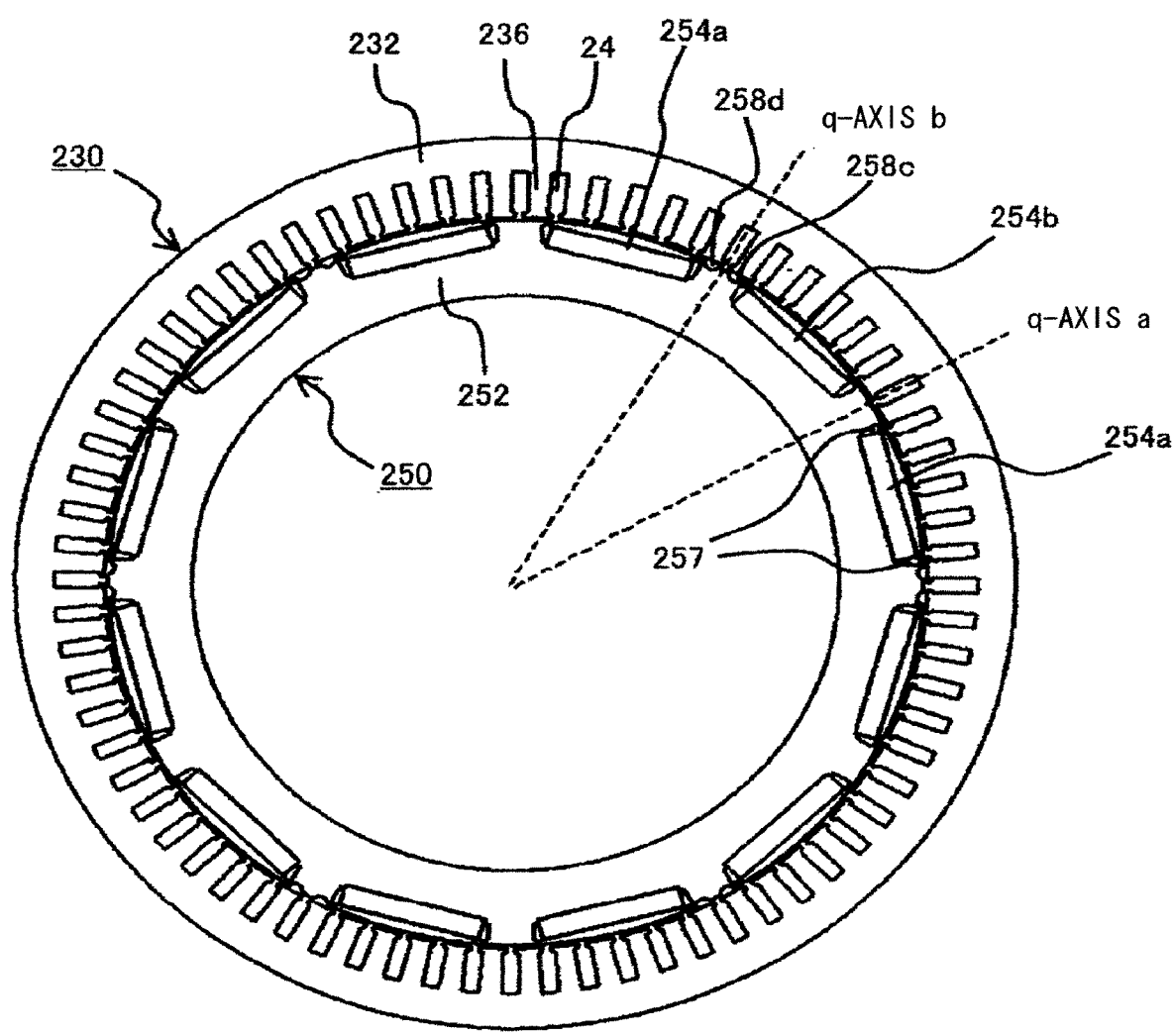
FIG. 20(b) presents cross-sectional view of the stator 230 and rotor 250 along A-A line that passes a part of the core 302.

The rotor core 252 includes two cores 301 and 302 as shown in FIG. 19(b). The length H2 of the core 302 in the axial direction is set to be approximately the same as the length H1 of the core 301 in the axial direction. FIGS. 20(a) and 20(b) each present a cross-sectional view of the stator 230 and the rotor 250. FIG. 20(a) presents an A-A cross-sectional view passing a part of the core 301 (see FIG. 3), and FIG. 20(b) presents an B-B cross-sectional view passing a part of the core 302 (see FIG. 3). In FIGS. 20(a) and 20(b), depiction of the housing 212, the shaft 218, and the stator coil 238 is omitted.

On the inner periphery side of the stator core 232, there are uniformly arranged a number of slots 24 and teeth 236 all around. In FIG. 20, not all the slots and teeth are allotted reference numerals but only some of the teeth and slots are allotted reference numerals on behalf of the whole. In the slot 24, a slot insulator (not shown) is provided and a plurality of phase winding wires of u-phase to w-phase is fitted. In the present embodiment, distributed winding is adopted as the method of winding the stator coil 238.

Each of the cores 301 and 302 of the rotor core 252 is provided with holes 310 in each of which a rectangular magnet is to be inserted. The permanent magnets 254 are introduced into the holes 310 and fixed thereto with an adhesive or the like. The widths of the holes 310 in the circumferential direction are set to be larger than the widths of the permanent magnets 254 in the circumferential direction. On both sides of the permanent magnets 254 are formed magnetic air gaps 257. The magnetic air gaps 257 may be filled with the adhesive. Alternatively, the magnetic air gaps 257 may be filled with forming resins together with the permanent magnets 254, which will then be integrally fixed. The permanent magnets 254 operates as a field pole of the rotor 250.

The directions of magnetization of the permanent magnets 254 are set along the radial direction of the rotor core 252 and reversed every field pole. That is, assuming that the surface of a permanent magnet 254a on the stator side is an N pole and a surface of the permanent magnet 254a on the axis side is an S pole, a surface of an adjacent permanent magnet 254b on the stator side is an S pole and a surface of the permanent magnet 254b on the axis side is an N pole. The permanent magnets 254a and 254b are arranged alternately in the circumferential direction. In the present embodiment, twelve of such permanent magnets 254 are arranged at regular intervals. Thus, the rotor 250 has twelve poles.

Figure 21A:
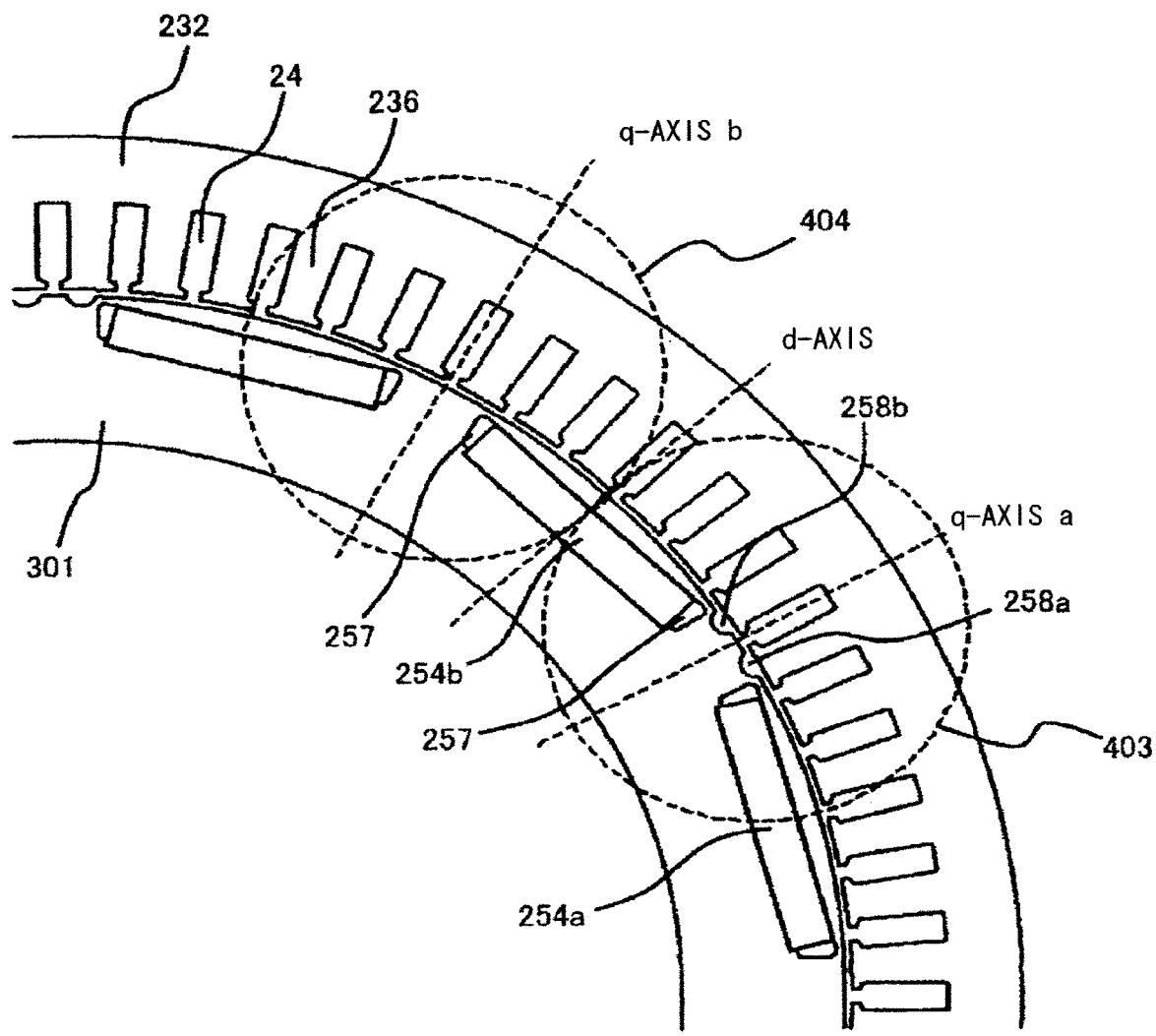
FIG. 21(a) presents an enlarged cross-sectional view near the permanent magnet 254b along the A-A line.

FIG. 21(a) presents an enlarged view of a part of the cross-sectional view shown in FIG. 20(a). The core 301 of the rotor core 252 is provided with grooves that constitute magnetic air gaps 258 on a surface of the rotor 250 in addition to the magnetic air gaps 257 formed on both the sides of the permanent magnets 254. The magnetic air gaps 257 are provided to reduce cogging torque and the magnetic air gaps 258 are provided to reduce torque fluctuations when power is applied. Assuming that as seen from the inner periphery of the rotor 250, a central axis between the permanent magnet 254a and a next magnet on the left side of the permanent magnet 254a is named q-axis a and a central axis between the permanent magnet 254b and a next magnet on the left side of the permanent magnet 254b is named q-axis b, a magnetic air gap 258a is arranged offset to the right with respect to the q-axis a and a magnetic air gap 258b is arranged offset to the left with respect to the q-axis b. There is provided no magnetic air gap on both sides of the q-axis b. The magnetic air gap 258a and the magnetic air gap 258b are arranged symmetric with respect to a d-axis, which is a central axis of magnetic poles.

Figure 21B:
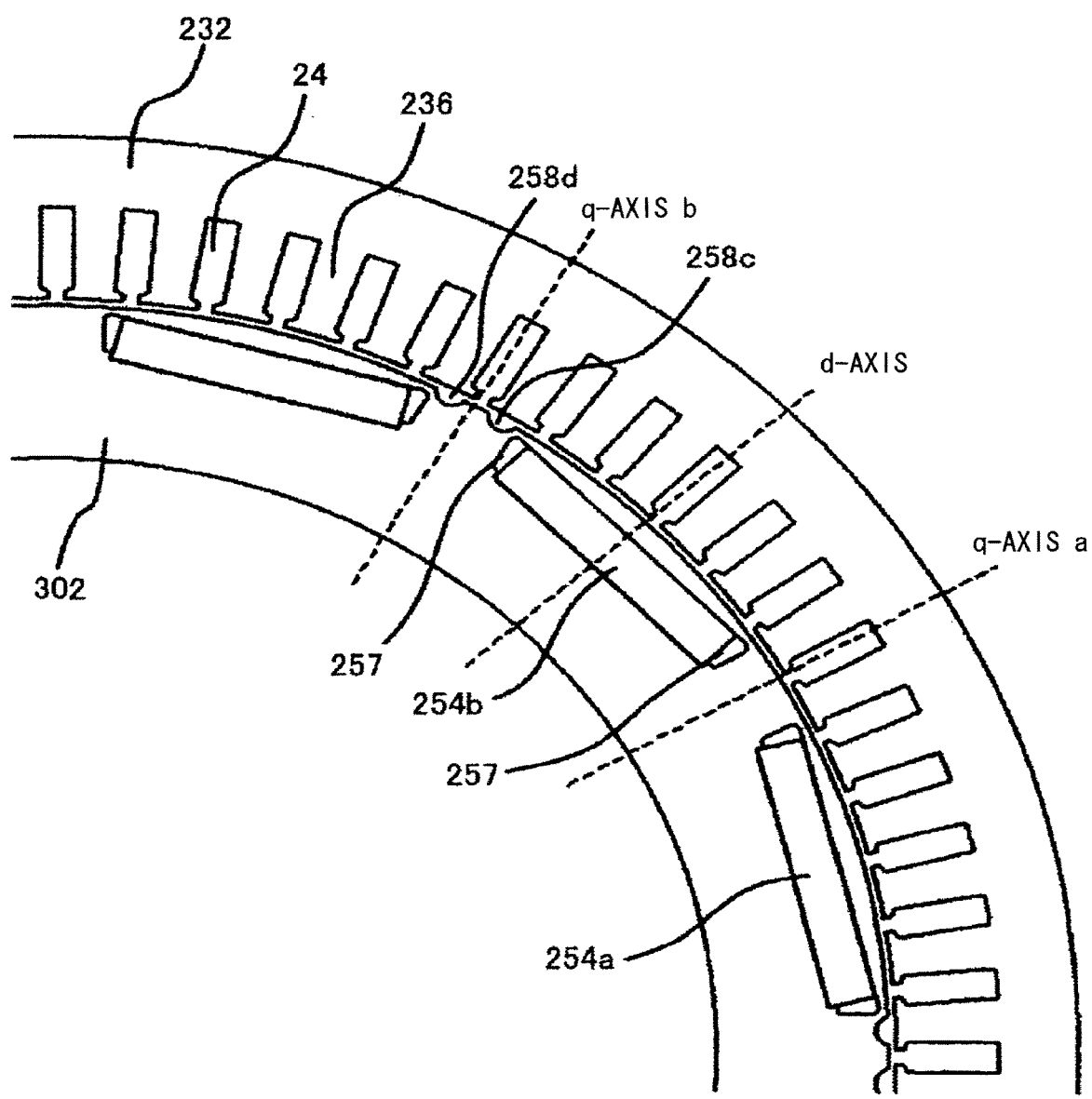
FIG. 21(b) presents an enlarged cross-sectional view near the permanent magnet 254b along the B-B line.

On the other hand, FIG. 21(b) is an enlarged view of a part of the cross-sectional view shown in FIG. 20(b). In case of the core 302 of the rotor core 252, magnetic air gaps 258c and 258d are formed instead of the magnetic air gaps 258a and 258b. As seen from the inner periphery of the rotor 250, the magnetic air gap 258c is arranged offset to the left with respect to the q-axis a and the magnetic air gap 258d is arranged offset to the right with respect to the q-axis b. There is no magnetic air gap on both sides of the q-axis a. From FIGS. 20(a), 20(b), 21(a), and 21(b), it can be seen that the cross-sectional shapes of the cores 301 and 302 are the same except that the positions at which the magnetic air gaps 258a and 258b and the magnetic air gaps 258c and 258d are different, respectively.

The magnetic air gaps 258a and 258d are arranged at positions offset from each other by 180 degrees in electric angle and the magnetic air gaps 258b and 258c are arranged at positions offset from each other by 180 degrees in electric angle. That is, the core 302 can be formed by rotating the core 301 by one pitch of magnetic poles. As a result, the core 301 and the core 302 can be produced using the same mold so that their production cost can be decreased. The circumferential positions of the holes 310 of the cores 301 and 302 correspond to each other without any offset. As a result, the permanent magnet 254 fitted in each hole 310 constitute an integrated magnet penetrating each of the cores 301 and 302 without being divided in the axial direction. Of course, a plurality of divided magnets 254 may be arranged as being stacked in the axial direction of the hole 310.

The rotating electric machine shown in FIG. 21(a) has a construction such that a region 403 and a region 404 are arranged alternately. The region 403 in FIG. 21(a) is equivalent to the region 401 in FIG. 8(a) and the region 404 in FIG. 21(a) is equivalent to the region 402 in FIG. 8(a). The rotating electric machine according to the present embodiment shown in FIG. 21(a) can be said to be electrically and magnetically equivalent to the rotating electric machine according to the embodiment shown in FIG. 6(a) although positions at which the magnetic air gaps 258 are different between the embodiments. That is, also in the present embodiment, different torque fluctuations occur between the regions 403 and 404 and they act so as to cancel each other, so that torque fluctuations can be reduced. Similarly to the first embodiment, the magnetic air gap 258 is formed at the assisted salient pole member 259, it gives substantially no influence on cogging torque. That is, by providing the magnetic air gap 258, the influence of the cogging torque to the fluctuation of torque can be suppressed and torque fluctuations when power is applied can be reduced substantially independently of the cogging torque.

As shown in FIGS. 21(a) and 21(b), the rotating electric machine according to the present embodiment includes the core 302 formed by rotating the core 301 by one pitch of magnetic pole and the axial lengths of the cores 301 and 302 are set to substantially the same as shown in FIG. 19(b), so that voltages generated in respective phase windings of the stator coil 238 facing each pole can be made approximately equal to each other. As a result, substantially no circulation current flows. However, substantially no circulation current flows when the windings of respective phases of the stator coil 238 facing the rotor 250 in the regions 403 and 404 are connected to each other in series. Accordingly, it is no problem to use only the core 301 or only the core 302.

Seventh Embodiment

Figure 22A:
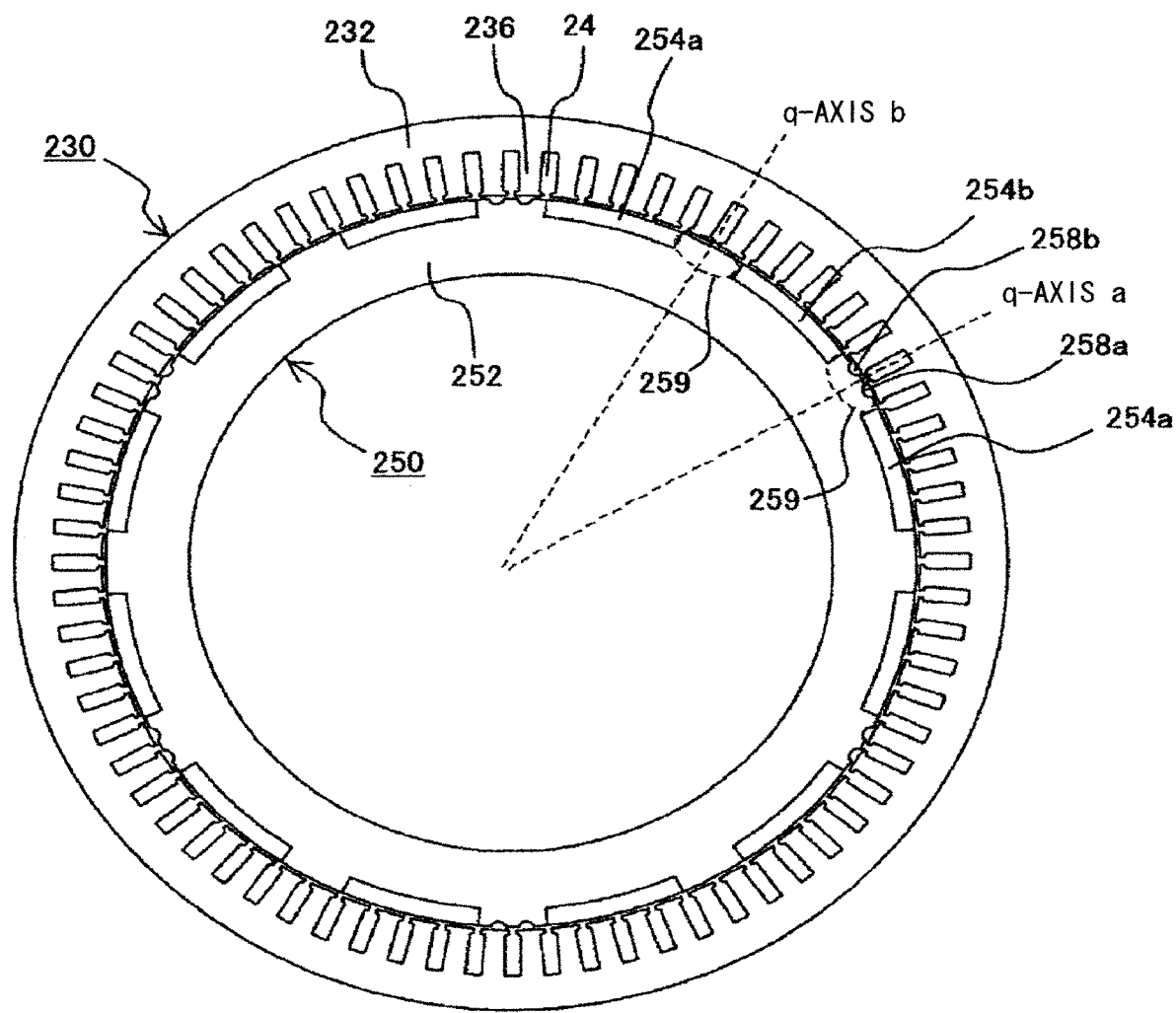
FIG. 22(a) shows a surface magnet-type rotating electric machine according to another embodiment of the present invention.
Figure 22B:
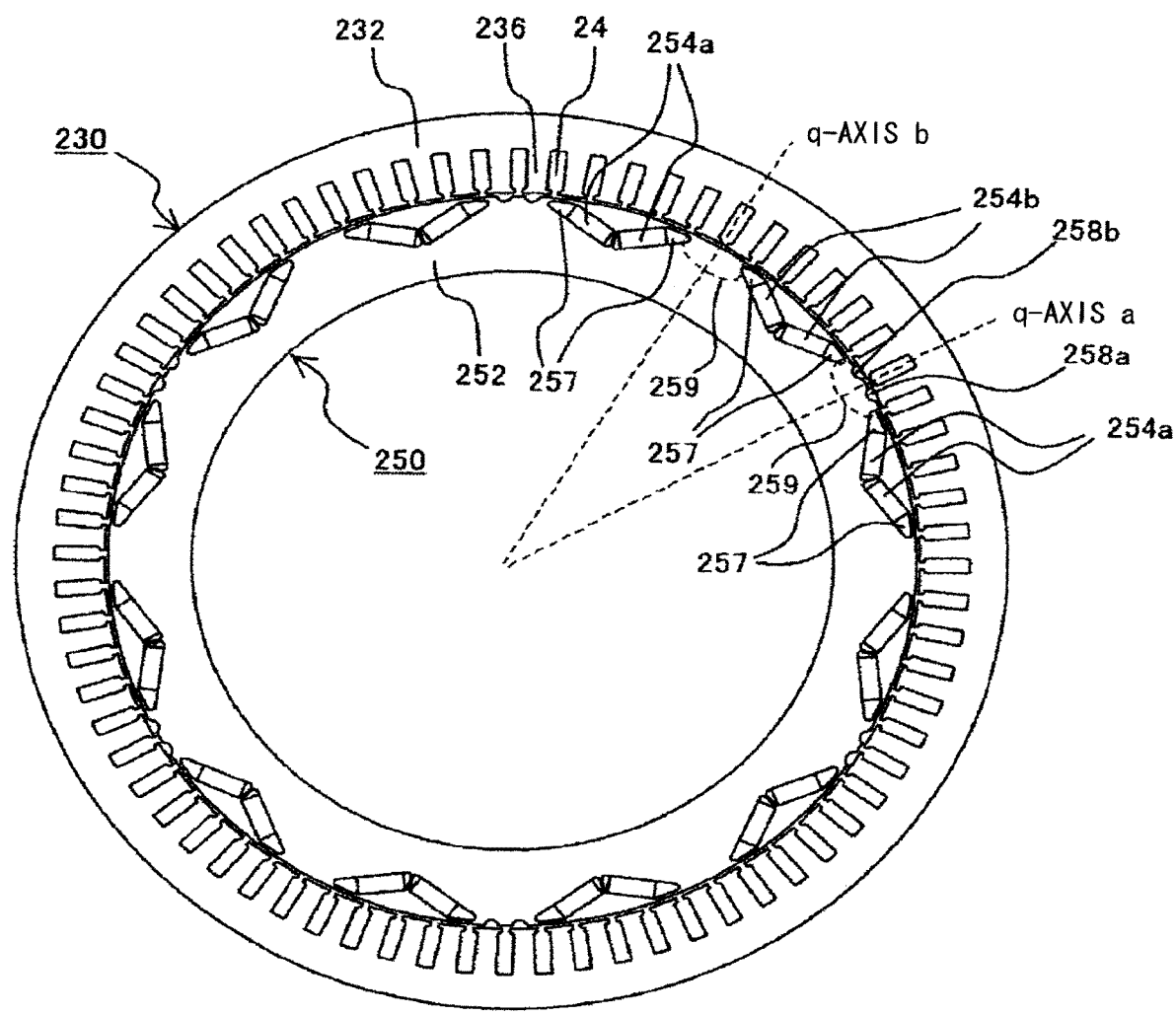
FIG. 22(b) shows a rotating electric machine according to another embodiment of the present invention in which a plurality of magnets is arranged in a V-shape configuration.

FIGS. 22(a) and 22(b) show a rotor according to anther embodiment of the present invention. Other details than the above-mentioned are the same as the above-mentioned embodiments.

FIG. 22(a) shows a rotor of the surface magnet type and FIG. 22(b) shows a rotor of the type in which a plurality of magnets is arranged in a V-shape. In either type of the rotor, the assisted salient pole member 259 is between any two adjacent permanent magnets 254 and the magnetic air gap 258 is arranged in the assisted salient pole member 259. Assuming that as seen from the inner periphery of the rotor 250, a central axis between the permanent magnet 254a and a next magnet on the left side of the permanent magnet 254a is named q-axis a and a central axis between the permanent magnet 254b and a next magnet on the left side of the permanent magnet 254b is named q-axis b, the magnetic air gap 258a is arranged offset to the right with respect to the q-axis a and the magnetic air gap 258b is arranged offset to the left with respect to the q-axis b. There is no magnetic air gap on both sides of the q-axis b. The magnetic air gap 258a and the magnetic air gap 258b are arranged symmetric with respect to a d-axis, which is a central axis of the magnetic pole. FIGS. 22(a) and 22(b) show A-A cross-sections of the rotor. Similarly to the above-mentioned embodiment, the B-B cross-section has a shape formed by rotating the shape of the A-A cross-section by one pitch of magnetic pole. As explained above referring to FIGS. 8(a), 8(b), and 8(c), the reduction of the torque fluctuations in the present embodiment is not affected by the magnetic flux of the magnet, so that it does not depend on the shape of the magnet.

Figure 23:
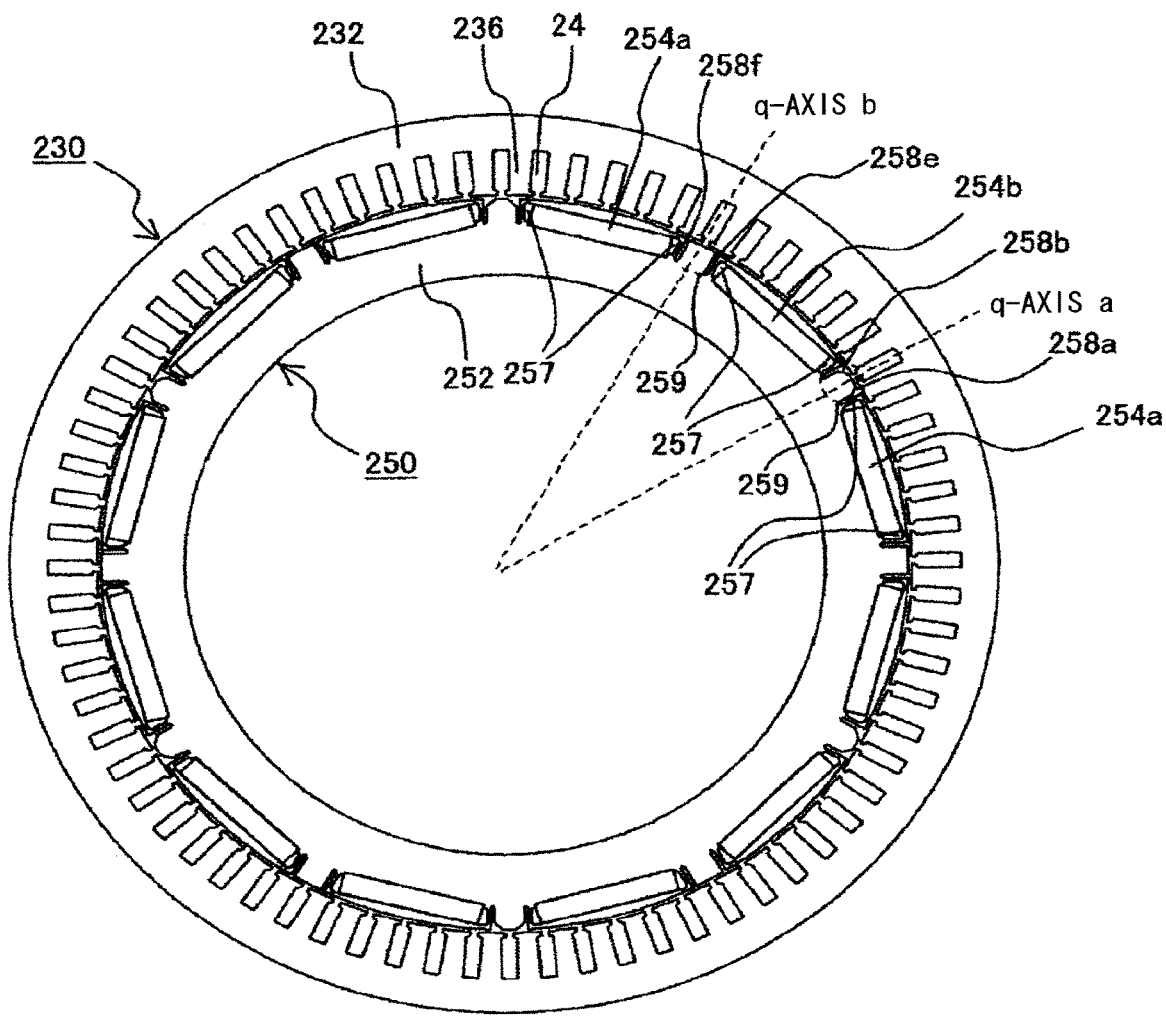
FIG. 23 shows a rotating electric machine provided with two magnetic air gaps 258 for one assisted salient pole 259, showing the stator 230 and the rotor 250 in cross-section.

FIG. 23 illustrates achievement of reduction of torque fluctuations by providing two magnetic air gaps 258 for each assisted salient pole member 259 according to the present embodiment. This shape is as follows. Assuming that as seen from the inner periphery of the rotor 250, a central axis between the permanent magnet 254a and a next magnet on the left side of the permanent magnet 254a is named q-axis a and a central axis between the permanent magnet 254b and a next magnet on the left side of the permanent magnet 254b is named q-axis b, the magnetic air gap 258a on the right side with respect to the q-axis a is larger and the magnetic air gap 258e on the left side with respect to the q-axis b is smaller. The magnetic air gap 258b on the right side with respect to the q-axis b is larger and the magnetic air gap 258f on the left side with respect to the q-axis b is smaller. The magnetic air gaps 258a and 258b and the magnetic air gaps 258e and 258f are arranged symmetric with respect to a d-axis, which is a central axis of the magnetic pole. FIG. 23 shows an A-A cross-section of the rotor. Similarly to the above-mentioned embodiment, the B-B cross-section has a shape formed by rotating the shape of the A-A cross-section by one pitch of magnetic pole.

Eighth Embodiment

Figure 24A:
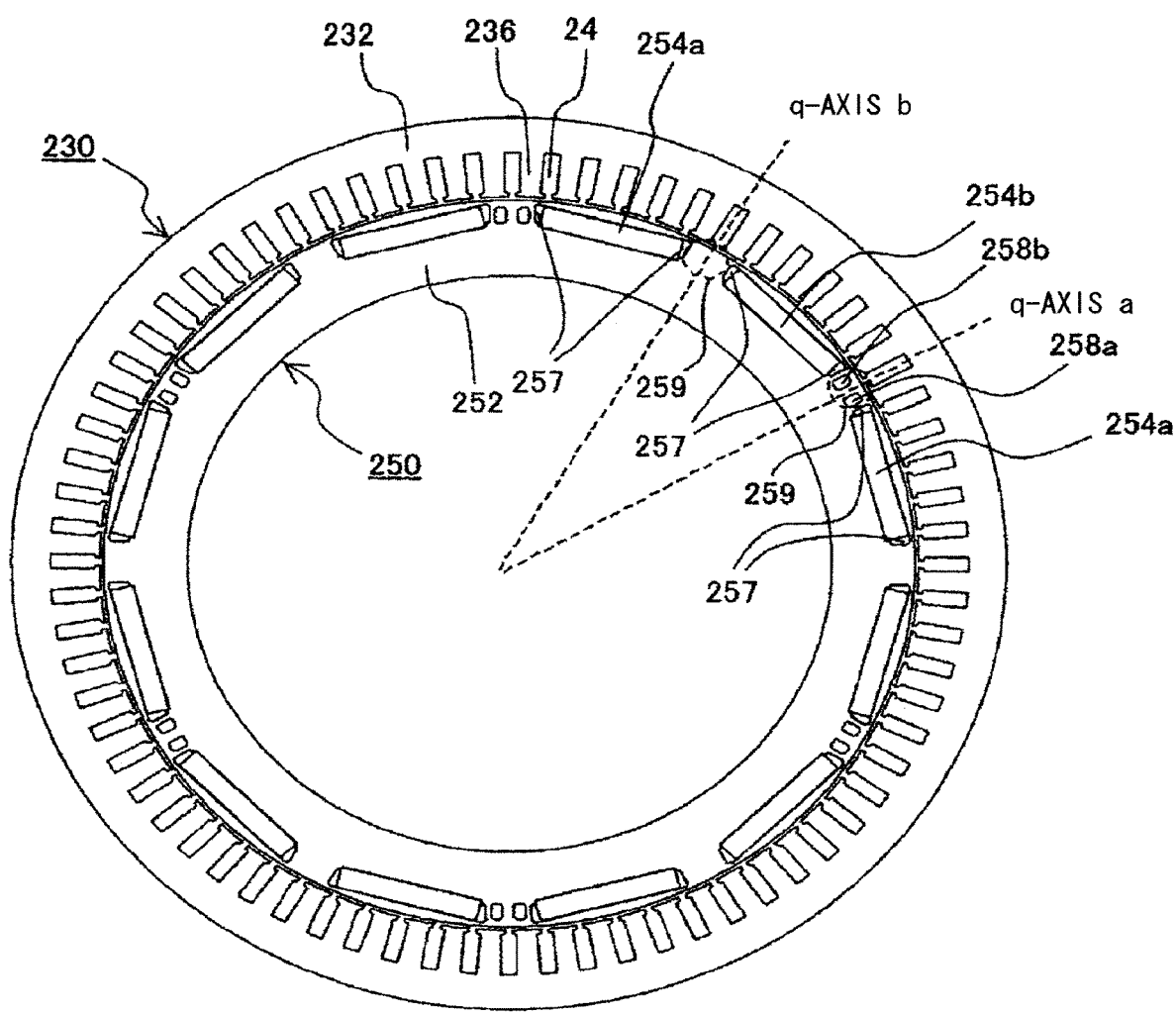
FIG. 24(a) presents a cross-sectional view of the stator 230 and the rotor 250 according to another embodiment of the present invention.
Figure 24B:
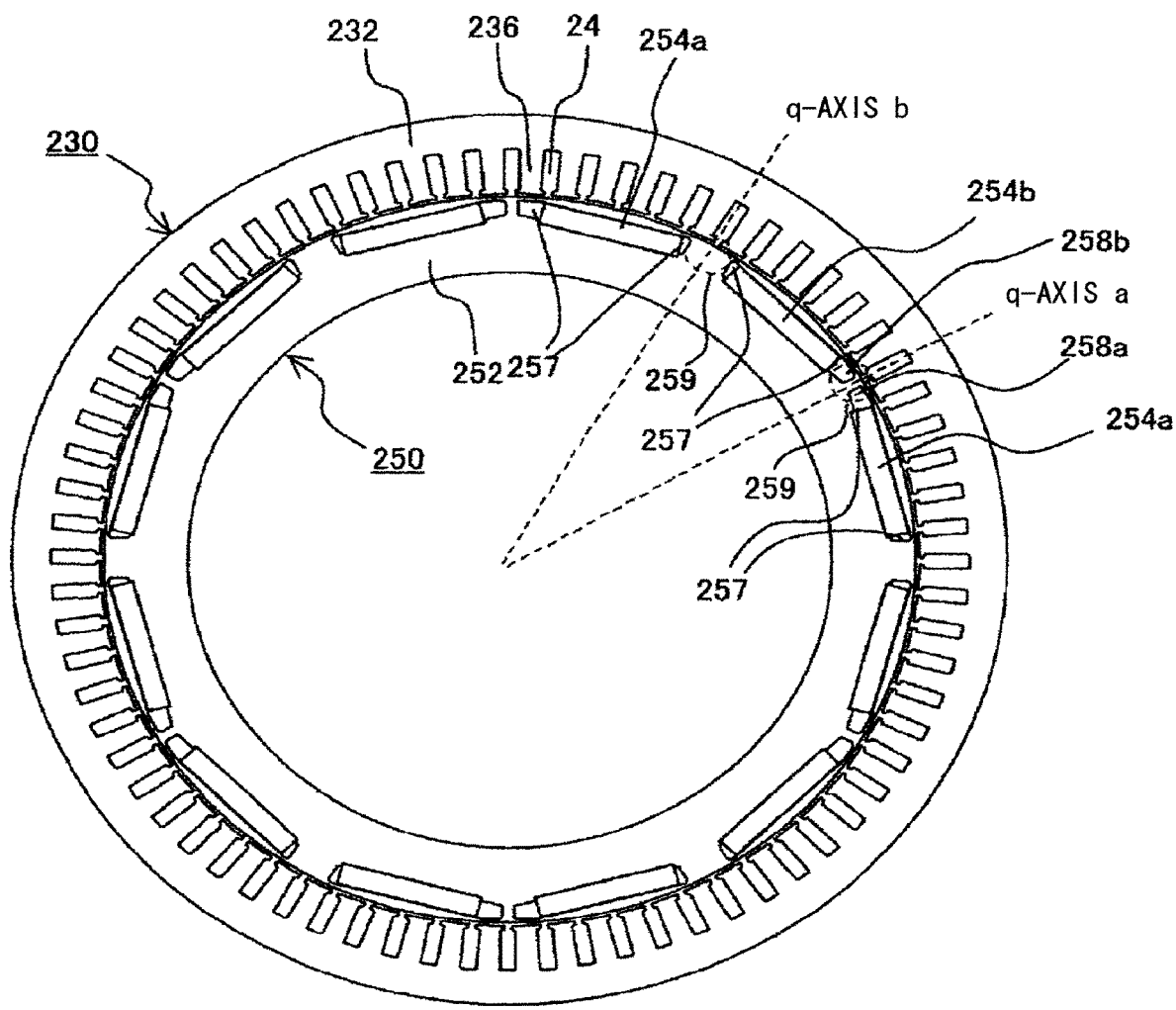
FIG. 24(b) presents a cross-sectional view of the stator 230 and the rotor 250 according to another embodiment of the present invention.
Figure 24C:
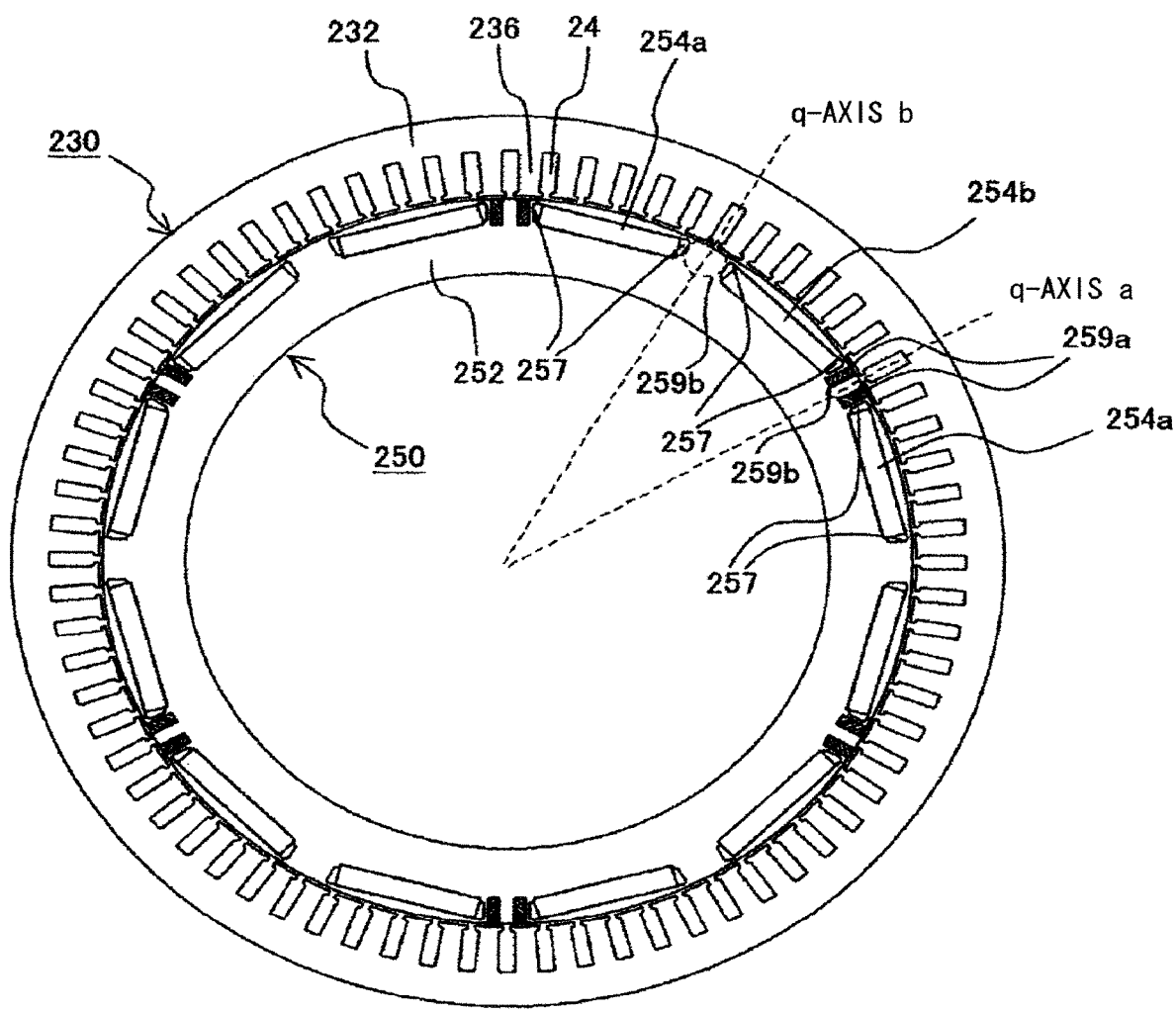
FIG. 24(c) presents a cross-sectional view of the stator 230 and the rotor 250 according to another embodiment of the present invention.

In the examples shown in FIGS. 20(a), 20(b), 22(a), 22(b), and 23, the magnetic air gap 258 is constituted by a groove provided in an outer periphery of the rotor 250. However, the magnetic air gap 258 may be constituted by a hole in the assisted salient pole member 259 as shown in FIG. 24(a). The magnetic air gap 257 and the magnetic air gap 258 may be integrated as shown in FIG. 24(b). The magnetic air gap 258 may be achieved by providing the assisted salient pole member 259 with a region that has a different permeability than the rest as shown in FIG. 24(c). In FIG. 24(c), the permeability of the assisted salient pole member 259a is set to be lower than that of the assisted salient pole member 259b.

Ninth Embodiment

Figure 25:
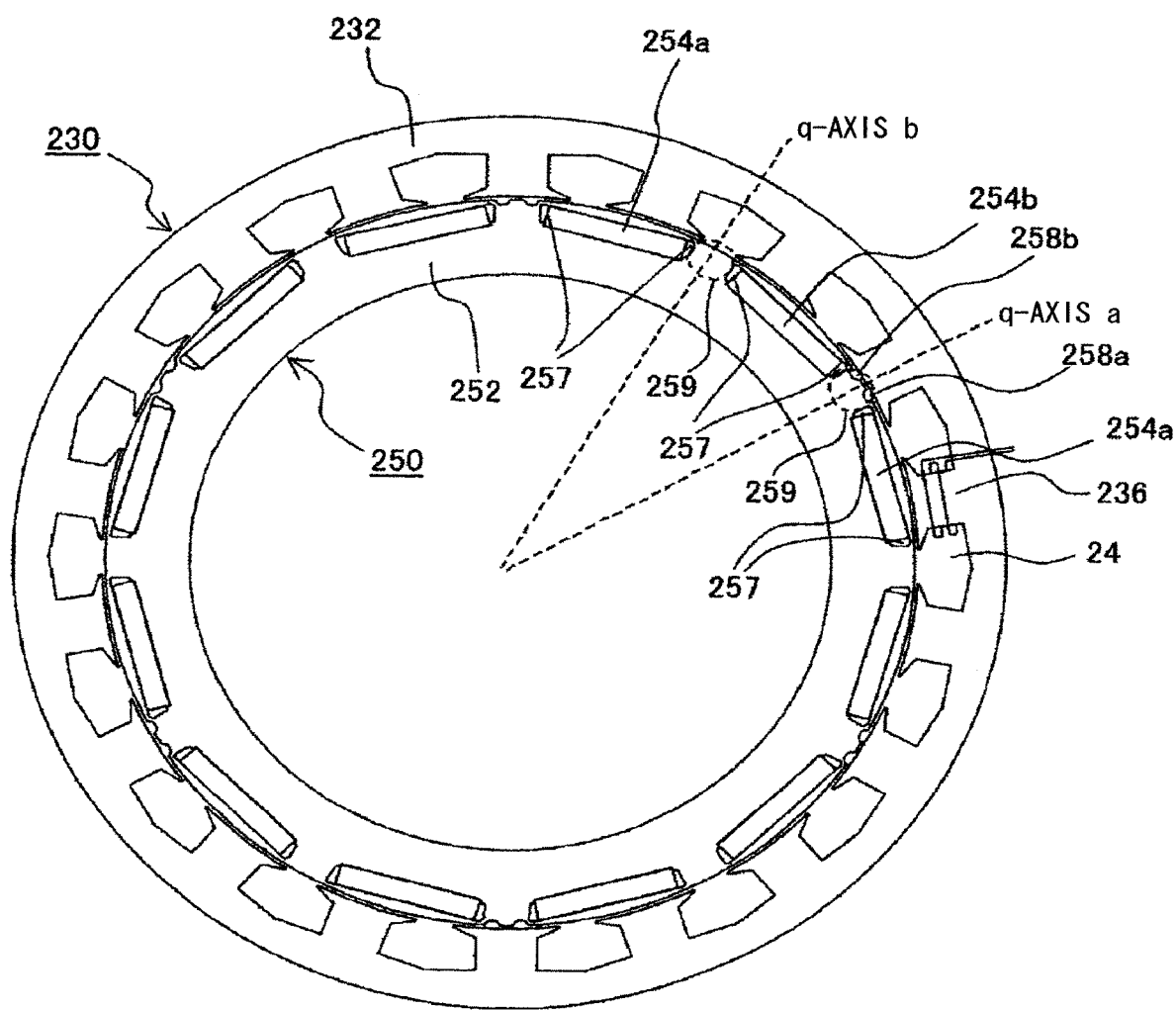
FIG. 25 presents a cross-sectional view of the stator 230 and the rotor 250 in a rotating electric machine with concentrated winding.

FIG. 25 illustrates the case where the stator coil 238 shown in FIG. 20 is made of the concentrated winding type. The torque fluctuations in the present embodiment depends on the shape of the rotor 250 and hence the torque fluctuations can be reduced in the case of the concentrated winding type, which is a different winding method on the stator side, similarly to what is described above.

Various embodiments mentioned above have the following advantageous effects.

(1) The magnetic air gaps 258a and 258b are provided in the assisted salient pole member 259 and the magnetic air gaps 258a and 258b are arranged offset for each assisted salient pole member 259 so that the torque fluctuations when power is applied generated by the magnetic air gaps 258a and 258b cancel each other. As a result, the torque fluctuations of the rotating electric machine when power is applied can be reduced. In particular, when the rotating electric machine according to one of the embodiments that can reduce the torque fluctuations when power is applied is employed in a motor for driving a vehicle such as an electric vehicle or the like, vibrations and noises when accelerating at low speeds can be reduced, so that an electric vehicle that provides comfort ride quality and is highly quiet can be provided.

(2) When power is not applied, the magnetic air gap 258 gives substantially no influence on the magnetic flux of the magnet. Accordingly, a countermeasure to reduce cogging torque due to the magnetic flux of the permanent magnet 254 and a countermeasure to reduce torque fluctuations when power is applied can be separately performed independently of each other. As a result, optimization of magnet torque such that the cogging torque is small and the torque when power is applied is large and a reduction in torque fluctuations when power is applied can be concomitantly achieved. Conventionally, a magnet is configured so that maximum torque can be obtained and then skew or the like is applied so as to reduce cogging torque. This has a defect that the torque (magnet torque) becomes small. In the embodiments of the present invention, however, the reduction in torque accompanying the reduction in torque fluctuations can be avoided.

(3) As mentioned above, the reduction in magnet torque accompanying the reduction in torque fluctuations can be prevented, so that the magnet can be made as small as possible and down-sizing and cost reduction of the rotating electric machine can be achieved.

(4) Since the torque fluctuations when power is applied is reduced by offsetting the positions of the magnetic air gaps 258a and 258b provided in the assisted salient pole member 259, it is unnecessary to divide the permanent magnet 254 into a plurality of pieces in the axial direction or skewing magnetization unlike conventional skewed structures. The permanent magnet 254 includes a rare earth magnet, typically a neodymium magnet. Rare earth magnets are shaped by polishing, improvement of precision of production error directly leads to an increase in cost. Therefore, the present embodiments in which it is unnecessary to divide the magnet in the axial direction allow cost reduction of the rotating electric machine. In addition, there is no fear of an increase in fluctuation of performance or a decrease in yield due to cumulative tolerances of magnets. As mentioned above, according to the embodiments of the present invention, an increase in productivity and a decrease in production cost of the rotating electric machine can be achieved.

According to the above-mentioned embodiments, it is possible to achieve a reduction in cogging torque and a reduction in torque fluctuations when power is applied. The reduction in torque fluctuations can be achieved by making the offset amount of the region of which the magnetoresistance has been varied differ for each magnetically-assisted salient pole member such that the torque fluctuations when power is applied due to the region of which the magnetoresistance has been varied cancel each other.

In the above-mentioned embodiments, the motor for driving a vehicle has been explained as an example. However, the present invention is not limited to motors for driving vehicles but also to various motors. Furthermore, the present invention is not limited to motors and can be applied to various types of rotating electric machines, for example, generators such as alternators. So far as the features of the present invention is not damaged, the present invention is not limited to the above-mentioned embodiments.

The disclosure of the following priority application is incorporated herein by reference: Japanese Patent Application No. 2008-266952 (filed Oct. 16, 2008).

EXPLANATION OF SYMBOLS 100 vehicle,
180 battery,
200, 202 rotating electric machine,
212, 214 housing,
230 stator,
232 stator core,
236 teeth,
238 stator coil,
250 rotor,
252 rotor core,
254 permanent magnet,
257, 258 magnetic air gap,
259 assisted salient pole member,
301, 302 core,
310 hole.

The invention claimed is:

1. A rotor for a rotating electrical machine, comprising:
a plurality of magnets; and
a plurality of magnetically-assisted salient pole members provided at a core portion between the magnets, wherein
the rotor includes insert holes for the magnets;
edges of the magnets and the insert holes form magnetic air gaps at regions overlapped with the magnetically-assisted salient pole members;
the magnetic air gaps include first magnetic air gaps and second magnetic air gaps, each of the second magnetic air gaps being opposite to the first magnetic air gaps across a q-axis passing through a salient pole center of each of the magnetically-assisted salient pole members and being formed smaller than the first magnetic air gaps at the regions overlapped with the magnetically-assisted salient pole members; and
the magnets provided with the first magnetic air gaps at both ends along a circumferential direction and the magnets provided with the second magnetic air gaps at both ends along a circumferential direction are alternately arranged in the rotor.

2. A rotating electrical machine comprising:
the rotor according to claim 1; and
a stator having a stator coil, wherein
the stator coil is wound by distributed winding.

3. An electric vehicle comprising:
a rotating electrical machine according to claim 2;
a battery that supplies direct current power; and
a conversion unit that converts the direct current power of the battery into an alternating current power and supplies the alternating current power to the rotating electric machine, wherein
a torque of the rotating electric machine is utilized as a driving force.

4. A rotor for a rotating electrical machine, comprising:
a plurality of magnets; and a plurality of magnetically-assisted salient pole members provided at a core portion between the magnets, wherein the rotor includes insert holes for the magnets;

edges of the magnets and the insert holes form magnetic air gaps at regions overlapped with the magnetically-assisted salient pole members;

the magnetic air gaps include first magnetic air gaps and second magnetic air gaps, each of the second magnetic air gaps being opposite to the first magnetic air gaps across the magnet and being formed smaller than the first magnetic air gaps at the region overlapped with the magnetically-assisted salient pole member; and the magnetically-assisted salient pole members provided with the first magnetic air gaps and the magnetically-assisted salient pole members provided with the second magnetic air gaps are alternately arranged in the rotor.

5. A rotating electrical machine comprising:

the rotor according to claim 4; and a stator having a stator coil, wherein the stator coil is wound by distributed winding.

6. An electric vehicle comprising:

a rotating electrical machine according to claim 5;

a battery that supplies direct current power; and a conversion unit that converts the direct current power of the battery into an alternating current power and supplies the alternating current power to the rotating electric machine, wherein a torque of the rotating electric machine is utilized as a driving force.

* * * * *